United States Patent
Kamijo et al.

(10) Patent No.: US 10,396,361 B2
(45) Date of Patent: Aug. 27, 2019

(54) NONAQUEOUS LITHIUM-TYPE POWER STORAGE ELEMENT

(71) Applicant: Asahi Kasei Kabushiki Kaisha, Tokyo (JP)

(72) Inventors: Takeshi Kamijo, Tokyo (JP); Keita Kusuzaka, Tokyo (JP); Kazuteru Umetsu, Tokyo (JP); Kimiya Murakami, Tokyo (JP); Nobuhiro Okada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/069,963

(22) PCT Filed: Jan. 20, 2017

(86) PCT No.: PCT/JP2017/002031
§ 371 (c)(1),
(2) Date: Jul. 13, 2018

(87) PCT Pub. No.: WO2017/126697
PCT Pub. Date: Jul. 27, 2017

(65) Prior Publication Data
US 2019/0027754 A1 Jan. 24, 2019

(30) Foreign Application Priority Data

Jan. 22, 2016 (JP) .................. 2016-010895
Aug. 8, 2016 (JP) .................. 2016-155562
(Continued)

(51) Int. Cl.
*H01G 11/32* (2013.01)
*H01M 4/587* (2010.01)
(Continued)

(52) U.S. Cl.
CPC .............. *H01M 4/62* (2013.01); *H01G 11/06* (2013.01); *H01G 11/24* (2013.01); *H01G 11/32* (2013.01);
(Continued)

(58) Field of Classification Search
None
See application file for complete search history.

(56) References Cited

U.S. PATENT DOCUMENTS 5,427,875 A 6/1995 Yamamoto et al.
5,702,843 A 12/1997 Mitate et al.
(Continued)

FOREIGN PATENT DOCUMENTS

EP 2219247 A1 8/2010
JP H04-328278 A 11/1992
(Continued)

OTHER PUBLICATIONS

Barrett et al., "The Determination of Pore Volume and Area Distributions in Porous Substances: Computations from Nitrogen Isotherms," The Journal of the American Chemical Society, 73: 373-380 (1951).
(Continued)

*Primary Examiner* — Jonathan Crepeau
(74) *Attorney, Agent, or Firm* — Morgan, Lewis & Bockius LLP

(57) ABSTRACT

The disclosure provides a nonaqueous lithium power storage element containing a positive electrode, a negative electrode, a separator and a lithium ion-containing nonaqueous electrolytic solution.

31 Claims, 1 Drawing Sheet

(30) Foreign Application Priority Data

| Aug. 8, 2016 | (JP) | ................................ | 2016-155917 |
|---|---|---|---|
| Sep. 30, 2016 | (JP) | ................................ | 2016-192605 |
| Sep. 30, 2016 | (JP) | ................................ | 2016-192692 |

(51) Int. Cl.

| *H01G 11/38* | (2013.01) |
|---|---|
| *H01G 11/50* | (2013.01) |
| *H01M 4/133* | (2010.01) |
| *H01M 4/62* | (2006.01) |
| *H01G 11/06* | (2013.01) |
| *H01M 4/1393* | (2010.01) |
| *H01M 10/052* | (2010.01) |
| *H01M 10/0567* | (2010.01) |
| *H01M 10/0585* | (2010.01) |
| *H01G 11/24* | (2013.01) |
| *H01G 11/70* | (2013.01) |
| *H01M 10/0525* | (2010.01) |
| *H01M 10/42* | (2006.01) |
| *H01G 11/46* | (2013.01) |
| *H02J 9/00* | (2006.01) |

(52) U.S. Cl.
CPC ............ *H01G 11/38* (2013.01); *H01G 11/50* (2013.01); *H01G 11/70* (2013.01); *H01M 4/1393* (2013.01); *H01M 4/587* (2013.01); *H01M 10/052* (2013.01); *H01M 10/0525* (2013.01); *H01M 10/0567* (2013.01); *H01M 10/0585* (2013.01); *H01M 10/4235* (2013.01); *H01G 11/46* (2013.01); *H02J 9/00* (2013.01); *Y02E 60/13* (2013.01); *Y02T 10/7022* (2013.01)

(56) References Cited

U.S. PATENT DOCUMENTS

| 5,928,812 | A | 7/1999 | Xue |
|---|---|---|---|
| 2004/0126659 | A1 | 7/2004 | Graetz et al. |
| 2005/0130043 | A1 | 6/2005 | Gao et al. |
| 2005/0233218 | A1 | 10/2005 | Ogawa et al. |
| 2006/0105242 | A1 | 5/2006 | Sato et al. |
| 2006/0134517 | A1 | 6/2006 | Sawa et al. |
| 2006/0209493 | A1 | 9/2006 | Fujino et al. |
| 2007/0281216 | A1 | 12/2007 | Petrat et al. |
| 2008/0055819 | A1 | 3/2008 | Taguchi et al. |
| 2010/0255377 | A1 | 10/2010 | Tsubata et al. |
| 2011/0159382 | A1 | 6/2011 | Matsui et al. |
| 2012/0050950 | A1 | 3/2012 | Kim et al. |
| 2012/0094177 | A1 | 4/2012 | Honoki et al. |
| 2012/0212186 | A1 | 8/2012 | Fujii et al. |
| 2012/0218683 | A1 | 8/2012 | Kondou et al. |
| 2015/0311002 | A1 | 10/2015 | Okada et al. |
| 2017/0207459 | A1 | 7/2017 | Okada et al. |
| 2017/0244098 | A1 | 8/2017 | Duong et al. |

FOREIGN PATENT DOCUMENTS

| JP | 2001-167767 A | 6/2001 |
|---|---|---|
| JP | 2004-014300 A | 1/2004 |
| JP | 2004-095188 A | 3/2004 |
| JP | 2004-362859 A | 12/2004 |
| JP | 2008-177263 A | 7/2008 |
| JP | 2008-181830 A | 8/2008 |
| JP | 2012-174437 A | 9/2012 |
| JP | 2012-212629 A | 11/2012 |
| JP | 2014-199723 A | 10/2014 |
| JP | 2016-012620 A | 1/2016 |
| WO | 2011/058748 A1 | 5/2011 |
| WO | 2014/088074 A1 | 6/2014 |
| WO | 2016/006632 A1 | 1/2016 |

OTHER PUBLICATIONS

Lippens et al., "Studies on Pore Systems in Catalysts: The t Method," Journal of Catalysts, 4: 319-323 (1965).

Mikhail et al., "Investigations of a Complete Pore Structure Analysis: Analysis of Micropores," Journal of Colloid and Interface Science, 26: 45-53 (1968).

International Search Report issued in corresponding International Patent Application No. PCT/JP2017/002031 dated Apr. 18, 2017.

International Preliminary Report on Patentability and Written Opinion issued in corresponding International Patent Application No. PCT/JP2017/002031 dated Aug. 2, 2018.

Decision to Grant issued in corresponding Japanese Patent Application No. 2017-509066 dated Jan. 16, 2018.

Supplemental European Search Report issued related European Patent Application No. 17741574.2 dated Jan. 4, 2019.

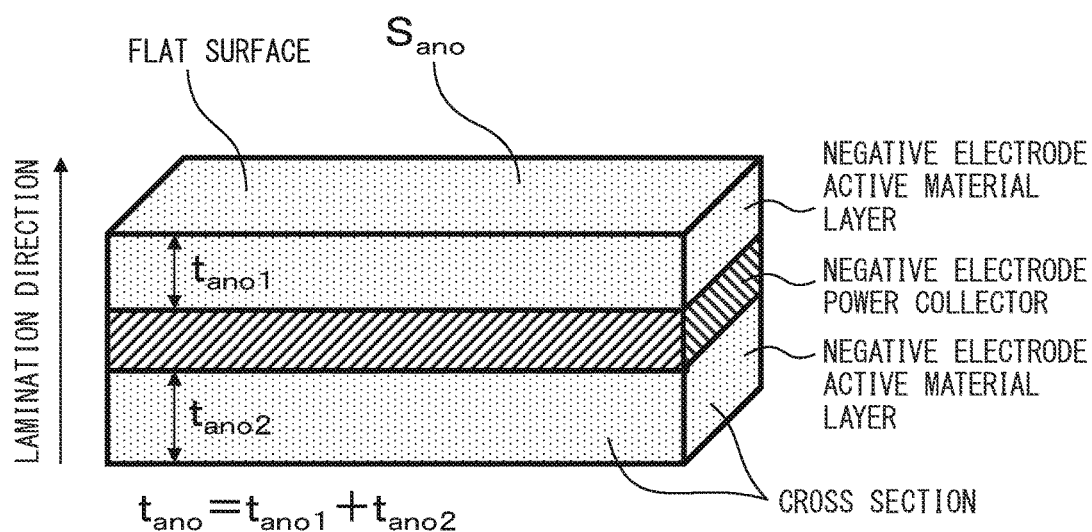

NONAQUEOUS LITHIUM-TYPE POWER STORAGE ELEMENT

FIELD

The present invention relates to a nonaqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is therefore advancing at a rapid pace, as an effective strategy for cells with high energy density that can meet this requirement.

The second requirement is a high output characteristic. A high power discharge characteristic is required for a power storage system during acceleration in, for example, a combination of a high efficiency engine and a power storage system (such as in a hybrid electric vehicle), or a combination of a fuel cell and a power storage system (such as in a fuel cell electric vehicle).

Electrical double layer capacitors and nickel-metal hydride batteries are currently under development as high output power storage devices.

Electrical double layer capacitors that employ activated carbon in the electrodes have output characteristics of about 0.5 to 1 kW/L. Such electrical double layer capacitors have high durability (cycle characteristics and high-temperature storage characteristics), and have been considered optimal devices in fields where the high output mentioned above is required. However, their energy densities are no greater than about 1 to 5 Wh/L. A need therefore exists for even higher energy density.

On the other hand, nickel-metal hydride batteries employed in existing hybrid electric vehicles exhibit high output equivalent to electrical double layer capacitors, and have energy densities of about 160 Wh/L. Still, research is being actively pursued toward further increasing their energy density and output, and increasing their durability (especially stability at high temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of a power storage element). However, the energy density is 100 Wh/L or lower, and the design is such that the high energy density, which is the major feature of a lithium ion battery, is reduced. Also, the durability (especially cycle characteristic and high-temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing durability.

There is a strong demand for implementation of power storage elements exhibiting high energy density, high output characteristics and durability, as mentioned above. Nevertheless, the existing power storage elements mentioned above have their advantages and disadvantages. New power storage elements are therefore desired that can meet these technical requirements. Promising candidates are power storage elements known as lithium ion capacitors, which are being actively developed in recent years.

The energy of a capacitor is represented as $½·C·V^2$ (where C is electrostatic capacitance and V is voltage).

A lithium ion capacitor is a type of power storage element using a nonaqueous electrolytic solution comprising a lithium salt (or, "nonaqueous lithium power storage element"), wherein charge/discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics: when charge/discharge is carried out using a material such as activated carbon as an electrode, by adsorption and desorption of ions on the activated carbon surface (non-Faraday reaction), it is possible to obtain high output and high durability, but with lower energy density (for example, one-fold). On the other hand, when charge/discharge is carried out by Faraday reaction using an oxide or carbon material as the electrode, the energy density is higher (for example, 10 times that of non-Faraday reaction using activated carbon), but then durability and output characteristic become problems.

Electrical double layer capacitors that combine these electrode materials employ activated carbon as the positive electrode and negative electrode (energy density: 1×), and carry out charge/discharge by non-Faraday reaction at both the positive and negative electrodes, and are characterized by having high output and high durability, but also low energy density (positive electrode: one-fold×negative electrode: one-fold=1).

Lithium ion secondary batteries use a lithium transition metal oxide (energy density: 10-fold) for the positive electrode and a carbon material (energy density: 10-fold) for the negative electrode, carrying out charge/discharge by Faraday reaction at both the positive and negative electrodes, but while their energy density is high (positive electrode: 10-fold×negative electrode: 10-fold=100), they have problems in terms of output characteristic and durability. In addition, the depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1×) for the positive electrode and a carbon material (energy density: 10-fold) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. It therefore exhibits high output and high durability, while also having high energy density (positive electrode: 1× negative electrode: 10-fold=10) and requiring no restrictions on depth of discharge as with a lithium ion secondary battery.

The purposes for which lithium ion capacitors are used include power storage elements for railways, construction machines and automobiles, for example. These uses require both a high input/output characteristic and a high-load charge/discharge cycle characteristic.

In PTL 1 there is proposed a lithium ion secondary battery using a positive electrode containing lithium carbonate in the positive electrode, and having a current shielding mechanism that operates in response to increased internal pressure in the battery.

In PTL 2 there is proposed a lithium ion secondary battery employing a lithium complex oxide such as lithium manganate as the positive electrode, and with reduced elution of manganese by including lithium carbonate in the positive electrode.

In PTL 3 there is proposed a method of causing restoration of the capacitance of a deteriorated power storage element by oxidizing different lithium compounds as coated oxides at the positive electrode.

CITATION LIST

Patent Literature

[PTL 1] Japanese Unexamined Patent Publication HEI No. 4-328278
[PTL 2] Japanese Unexamined Patent Publication No. 2001-167767
[PTL 3] Japanese Unexamined Patent Publication No. 2012-174437

SUMMARY

Technical Problem

The present inventors have found that the high-load charge/discharge cycle characteristic can be increased by adding a lithium compound to the positive electrode, as exemplified by PTLs 1 to 3. However, as the lithium compound content of the positive electrode increases, the resistance of the nonaqueous lithium power storage element using it also increases, and this has made it difficult to obtain a satisfactory input/output characteristic.

In light of this situation, the problem to be solved by the present invention is that of providing a nonaqueous lithium power storage element having a high input/output characteristic and a high-load charge/discharge cycle characteristic.

Solution to Problem

As a result of much ardent research and experimentation focused on solving this problem, the present inventors have found that by specifying the range for the ratio b/a, where in the solid $^7$Li-NMR spectrum of the positive electrode active material layer, "a" is the peak area from −40 ppm to 40 ppm obtained by measuring with a repeated latency of 10 seconds, and "b" is the peak area from −40 ppm to 40 ppm obtained by measuring with a repeated latency of 3,000 seconds, it is possible to exhibit a high input/output characteristic and a high-load charge/discharge cycle characteristic, and the present invention has thereupon been completed.

Specifically, the present invention provides the following.

[1]
A nonaqueous lithium power storage element comprising a positive electrode, a negative electrode, a separator and a lithium ion-containing nonaqueous electrolytic solution, wherein the negative electrode has a negative electrode power collector, and a negative electrode active material layer containing a negative electrode active material, provided on one or both sides of the negative electrode power collector, the positive electrode has a positive electrode power collector, and a positive electrode active material layer containing a positive electrode active material, provided on one or both sides of the positive electrode power collector, and in the solid $^7$Li-NMR spectrum of the positive electrode active material layer, the relationship 1.04≤b/a≤5.56 is satisfied, where "a" is the peak area from −40 ppm to 40 ppm obtained by measuring with a repeated latency of 10 seconds, and "b" is the peak area from −40 ppm to 40 ppm obtained by measuring with a repeated latency of 3,000 seconds.

[2]
The nonaqueous lithium power storage element according to [1], wherein the amount of lithium in the positive electrode, as calculated by the peak area from −40 ppm to 40 ppm in the solid $^7$Li-NMR spectrum of the positive electrode active material layer, is 1 mmol/g to 30 mmol/g per unit weight of the positive electrode active material layer.

[3]
The nonaqueous lithium power storage element according to [2], wherein the positive electrode contains one or more compounds selected from the group consisting of compounds represented by the following formulas (1) to (3):

[Chem. 1]

$$LiX^1-OR^1O-X^2Li \quad (1)$$

{in formula (1), $R^1$ is an alkylene group of 1 to 4 carbon atoms or a halogenated alkylene group of 1 to 4 carbon atoms, and $X^1$ and $X^2$ respectively and independently represent —$(COO)_n$ (where n is 0 or 1)},

[Chem. 2]

$$LiX^1-OR^1O-X^2R^2 \quad (2)$$

{in formula (2), $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —$(COO)_n$ (where n is 0 or 1)}, and

[Chem. 3]

$$R^2X^1-OR^1O-X^2R^3 \quad (3)$$

{in formula (3), $R^1$ is an alkylene group of 1 to 4 carbon atoms or a halogenated alkylene group of 1 to 4 carbon atoms, $R^2$ and $R^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —$(COO)_n$ (where n is 0 or 1)}, in an amount of $1.60×10^{-4}$ mol/g to $300×10^{-4}$ mol/g per unit weight of the positive electrode material layer.

[4]
The nonaqueous lithium power storage element according to any one of [1] to [3], wherein the positive electrode comprises a lithium compound other than the positive electrode active material.

[5]
The nonaqueous lithium power storage element according to [4], wherein the mean particle diameter $X_1$ of the lithium compound is 0.1 µm to 10 µm.

[6]
The nonaqueous lithium power storage element according to [5], wherein 2 µm≤$Y_1$≤20 µm and $X_1$<$Y_1$ are satisfied, where $Y_1$ is the mean particle diameter of the positive electrode active material, and the content ratio of the lithium compound in the positive electrode is 1 weight % to 50 weight % based on the total weight of the positive electrode active material layer.

[7]
The nonaqueous lithium power storage element according to any one of [4] to [6], wherein the content ratio of the lithium compound in the positive electrode is 1 weight % to 20 weight % based on the total weight of the positive electrode active material layer.

[8]
The nonaqueous lithium power storage element according to any one of [4] to [7], wherein the lithium compound is one or more types selected from the group consisting of lithium carbonate, lithium oxide and lithium hydroxide.

[9]
The nonaqueous lithium power storage element according to any one of [4] to [8], wherein the mean distance between the centers of gravity of the voids, as obtained by SEM of a cross-section of the negative electrode active material layer, is 1 µm to 10 µm.

[10]
The nonaqueous lithium power storage element according to [9], wherein $r_p/r_a$ is 0.10 to 1.10, where $r_p$ is the mean distance between the centers of gravity of the voids and $r_a$ is the mean particle diameter of the negative electrode active material.

[11]
The nonaqueous lithium power storage element according to any one of [1] to [10], wherein
the negative electrode active material contains a graphite-based carbon material,
the negative electrode active material layer intercalates lithium ion, and
in the solid $^7$Li-NMR spectrum of the negative electrode active material layer, in the spectral range of −10 ppm to 35 ppm, the maximum value of the peaks is between 4 ppm to 30 ppm, and the amount of lithium as calculated by the peak area from 4 ppm to 30 ppm is 0.10 mmol/g to 10.0 mmol/g per unit weight of the negative electrode active material layer.

[12]
The nonaqueous lithium power storage element according to any one of [1] to [11], wherein the BET specific surface area per unit volume of the negative electrode active material layer is 1 m$^2$/cc to 50 m$^2$/cc.

[13]
The nonaqueous lithium power storage element according to any one of [1] to [12], wherein the mean pore size of the negative electrode active material layer is 2 nm to 20 nm.

[14]
The nonaqueous lithium power storage element according to any one of [1] to [13], wherein the mean particle diameter of the negative electrode active material is 1 µm to 10 µm.

[15]
The nonaqueous lithium power storage element according to any one of [1] to [14], wherein the negative electrode active material contains a composite carbon material comprising a graphite material and a carbonaceous material.

[16]
The nonaqueous lithium power storage element according to any one of [1] to [15], wherein the doping amount of lithium ion in the negative electrode active material is 50 mAh/g to 700 mAh/g per unit weight of the negative electrode active material.

[17]
The nonaqueous lithium power storage element according to any one of [1] to [16], wherein the BET specific surface area of the negative electrode active material is 1 m$^2$/g to 50 m$^2$/g.

[18]
The nonaqueous lithium power storage element according to any one of [1] to [8], wherein the doping amount of lithium ion in the negative electrode active material is 530 mAh/g to 2,500 mAh/g per unit weight of the negative electrode active material.

[19]
The nonaqueous lithium power storage element according to any one of [1] to [8] and [18], wherein the BET specific surface area of the negative electrode active material is 100 m$^2$/g to 1,500 m$^2$/g.

[20]
The nonaqueous lithium power storage element according to any one of [1] to [19], wherein the positive electrode active material in the positive electrode active material layer is activated carbon satisfying 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

[21]
The nonaqueous lithium power storage element according to any one of [1] to [19], wherein the positive electrode active material in the positive electrode active material layer is activated carbon satisfying 0.8<$V_1$≤2.5 and 0.8<V≤3.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 2,300 m$^2$/g to 4,000 m$^2$/g, as measured by the BET method.

[22]
The nonaqueous lithium power storage element according to any one of [1] to [21], wherein the positive electrode power collector and the negative electrode power collector are metal foils without through-holes.

[23]
The nonaqueous lithium power storage element according to any one of [1] to [22], wherein the following (a) and (b) are satisfied for the nonaqueous lithium power storage element:
(a) the product of Ra and F, Ra·F, is 0.3 to 3.0,
(b) EN is 15 to 50,
where Ra (Ω) is the initial internal resistance, F (F) is the electrostatic capacitance, E (Wh) is the electrical energy and V (L) is the volume of the power storage element.

[24]
The nonaqueous lithium power storage element according to any one of [1] to [23], wherein, for charge/discharge cycling of the nonaqueous lithium power storage element conducted 60,000 times at an environmental temperature of 25° C. and a rate of 300 C, in a cell voltage range from 2.2 V to 3.8 V, Rb/Ra is 0.9 to 2.0, where Rb (Ω) is the internal resistance after the charge/discharge cycling and Ra (Ω) is the internal resistance before the charge/discharge cycling.

[25]

A power storage module containing a nonaqueous lithium power storage element according to any one of [1] to [24].

[26]

A power regenerating system containing a nonaqueous lithium power storage element according to any one of [1] to [24].

[27]

A power load-leveling system containing a nonaqueous lithium power storage element according to any one of [1] to [24].

[28]

An uninterruptable power source system containing a nonaqueous lithium power storage element according to any one of [1] to [24].

[29]

A non-contact power supply system containing a nonaqueous lithium power storage element according to any one of [1] to [24].

[30]

An energy harvesting system containing a nonaqueous lithium power storage element according to any one of [1] to [24].

[31]

A power storage system containing a nonaqueous lithium power storage element according to any one of [1] to [24].

Advantageous Effects of Invention

The nonaqueous lithium power storage element of the invention exhibits a high input/output characteristic and a high-load charge/discharge cycle characteristic.

BRIEF DESCRIPTION OF DRAWINGS

FIG. 1 is an illustration of the geometric area $S_{ano}$ of the flat section and the total film thickness $t_{ano}$ of a measuring sample, for determining the volume $V_{ano}=S_{ano} \times t_{ano}$ of a negative electrode active material layer.

DESCRIPTION OF EMBODIMENTS

An embodiment of the invention (hereunder referred to as "this embodiment") will now be explained in detail as an example, with the understanding that the invention is not limited to this embodiment. The upper limits and lower limits for the numerical ranges in this embodiment may be combined as desired to constitute any desired numerical ranges.

A nonaqueous lithium power storage element generally comprises a positive electrode, a negative electrode, a separator and an electrolytic solution, as the major constituent elements. The electrolytic solution used is an organic solvent containing lithium ions (hereunder also referred to as "nonaqueous electrolytic solution").

<Positive Electrode>

The positive electrode of this embodiment has a positive electrode power collector and a positive electrode active material layer containing a positive electrode active material, formed on one or both sides thereof.

The positive electrode of this embodiment preferably contains a lithium compound as the positive electrode precursor, prior to assembly of the nonaqueous lithium power storage element. As mentioned above, during the step of assembling the nonaqueous lithium power storage element of this embodiment, preferably the negative electrode is predoped with lithium ion. The predoping method for this embodiment is preferably application of a voltage between the positive electrode precursor and negative electrode, after the nonaqueous lithium power storage element has been assembled using the positive electrode precursor containing a lithium compound, the negative electrode, the separator and the nonaqueous electrolytic solution. The lithium compound may be included in any form in the positive electrode precursor and the positive electrode. For example, the lithium compound may be present between the positive electrode power collector and the positive electrode active material layer, or it may be present on the surface of the positive electrode active material layer. The lithium compound is preferably contained in the positive electrode active material layer formed on the positive electrode power collector of the positive electrode precursor.

Throughout the present specification, "positive electrode precursor" is defined as the positive electrode before the lithium doping step, and "positive electrode" is defined as the positive electrode after the lithium doping step.

In the solid $^7$Li-NMR spectrum of the positive electrode active material layer for this embodiment, the expression $1.04 \leq b/a \leq 5.56$ is satisfied, where "a" is the peak area from −40 ppm to 40 ppm, obtained by measurement with a repeated latency of 10 seconds, and "b" is the peak area from −40 ppm to 40 ppm, obtained by measurement with a repeated latency of 3,000 seconds. The value of b/a is preferably $1.05 \leq b/a \leq 3.79$, more preferably $1.09 \leq b/a \leq 3.32$, even more preferably $1.14 \leq b/a \leq 2.86$ and yet more preferably $1.18 \leq b/a \leq 1.93$. The upper limit and lower limit may be combined as desired.

By adjusting b/a to be within the specified range, it will be possible to maintain a high input/output characteristic while improving the high-load charge/discharge cycle characteristic. While the principle is not completely understood, the following is conjectured. The peak area "a" is believed to be for peaks derived mainly from lithium ion intercalated in the positive electrode active material and the adhering lithium-containing coating film, and presumably it is a relative representation of the positive electrode active material. On the other hand, the peak area "b" is considered to be for peaks derived from lithium compounds that have separated from the positive electrode active material, integrated with the peak area "a". That is, b/a is considered to represent the amount of lithium compound that has separated from the positive electrode active material. The lithium compound that has separated from the positive electrode active material can maintain a high input/output characteristic without inhibiting electron conduction or ion diffusion between the positive electrode active material. Furthermore, the lithium compound adsorbs active products such as fluorine ions that are generated during high-load charge/discharge cycling, thereby improving the high-load charge/discharge cycle characteristic. The term "separated" means a state in which, when the positive electrode active material is an aggregate of activated carbon particles, for example, lithium compound particles are independently dispersed in its interior.

If b/a is 1.04 or greater, the amount of lithium compound with respect to the positive electrode active material will be sufficient, and therefore the lithium compound will adsorb active products such as fluorine ions that are generated during high-load charge/discharge cycling, thereby increasing the high-load charge/discharge cycle characteristic. On the other hand, if b/a is 5.56 or smaller, the lithium compound will be able to maintain a high input/output characteristic without inhibiting electron conduction or ion diffusion between the positive electrode active material.

Throughout the present specification, the area ratio b/a of the peak area "a" in the spectral range of −40 ppm to 40 ppm, with a repeated latency of 10 seconds, and the peak area "b" in the spectral range of −40 ppm to 40 ppm, with a repeated latency of 3,000 seconds, in the solid $^{7}$Li-NMR spectrum of the positive electrode active material layer, can be calculated by the following method.

The measuring apparatus used for solid $^{7}$Li-NMR may be a commercially available apparatus. The spectrum is measured by the single pulse method in a room temperature environment, with a magic-angle spinning rotational speed of 14.5 kHz and an irradiation pulse width set to a 45° pulse. Measurement is performed with repeated latency of 10 seconds and 3,000 seconds, to obtain a solid $^{7}$Li-NMR spectrum. When obtaining the solid $^{7}$Li-NMR spectrum, the measuring conditions other than the repeated latency, such as the number of scans and receiver gain, are all identical. A 1 mol/L aqueous lithium chloride solution is used as the shift reference, and the shift position measured separately as an external standard is defined as 0 ppm. During measurement of the 1 mol/L aqueous lithium chloride solution, the single pulse method is used for spectral measurement with an irradiation pulse width set to a 45° pulse, without rotation of the sample.

The peak areas "a" and "b" in a spectral range of −40 ppm to 40 ppm are read off from the solid $^{7}$Li-NMR spectrum of the positive electrode active material layer obtained by the method described above, and b/a is calculated.

For this embodiment, the amount of lithium in the positive electrode, as calculated by the peak area from −40 ppm to 40 ppm in the solid $^{7}$Li-NMR spectrum of the positive electrode active material layer of the positive electrode, is preferably 1 mmol/g to 30 mmol/g, more preferably 1.2 mmol/g to 28 mmol/g, even more preferably 1.5 mmol/g to 26 mmol/g, yet more preferably 1.7 mmol/g to 24 mmol/g and most preferably 2 mmol/g to 22 mmol/g, per unit weight of the positive electrode active material layer.

The nonaqueous lithium power storage element of this embodiment has charge/discharge cycle durability under high load while maintaining a high input/output characteristic, by adjustment of the amount of lithium in the positive electrode to a specific range. While the principle is not completely understood, and it is not our intention to be limited by theory, the following is conjectured. The amount of lithium is thought to derive from the lithium-containing coating film of the positive electrode active material layer. The lithium-containing coating film, being internally polarized, has high ionic conductivity, and therefore does not notably impair the resistance even when formed in a large amount. Moreover, the lithium-containing coating film can suppress oxidative decomposition of the nonaqueous electrolytic solution. In addition, since a lithium-containing coating film is stably present during the charge/discharge process, compared to organic and inorganic coating film components that do not contain lithium ion, the coating film does not break even when charge/discharge cycling is repeated a very large number of times, and there is minimal new oxidative decomposition of the nonaqueous electrolytic solution. Consequently, the power storage element can exhibit a high high-load charge/discharge cycle characteristic.

If the amount of lithium in the positive electrode is at least 1 mmol/g per unit weight of the positive electrode active material layer, the amount of lithium-containing coating film formed on the positive electrode active material layer will be sufficient, thus suppressing oxidative decomposition of the nonaqueous electrolytic solution during charge/discharge cycling, and allowing a high high-load charge/discharge cycle characteristic to be exhibited. If the amount of lithium in the positive electrode is no greater than 30 mmol/g, increase in resistance due to the lithium-containing coating film will be less likely to occur, and a high input/output characteristic can be exhibited.

Throughout the present specification, the amount of lithium obtained by the solid $^{7}$Li-NMR spectrum of the positive electrode active material layer can be calculated by the following method.

The measuring apparatus used for solid $^{7}$Li-NMR may be a commercially available apparatus. The spectrum is measured by the single pulse method in a room temperature environment, with a magic-angle spinning rotational speed of 14.5 kHz and an irradiation pulse width set to a 45° pulse. The repeated latency during the measurement is set for adequate measurement.

A 1 mol/L aqueous lithium chloride solution is used as the shift reference, and the shift position measured separately as an external standard is defined as 0 ppm. During measurement of the 1 mol/L aqueous lithium chloride solution, the single pulse method is used for spectral measurement with an irradiation pulse width set to a 45° pulse, without rotation of the sample.

The obtained solid $^{7}$Li-NMR spectrum for the positive electrode active material layer obtained by the method described above is used to determine the peak areas for components in the range of −40 ppm to 40 ppm. The peak areas are divided by the peak area for a 1 mol/L aqueous lithium chloride solution, with the same sample height in the measuring rotor as during measurement of the positive electrode active material layer, and further divided by the weight of the positive electrode active material layer used for measurement, to calculate the lithium amount in the positive electrode. The weight of the positive electrode active material layer is the weight of the positive electrode active material layer including the coating film or deposits contained in the positive electrode active material layer.

The positive electrode of this embodiment preferably comprises at least one compound selected from the group consisting of compounds represented by the following formulas (1) to (3), in an amount of $1.60 \times 10^{-4}$ mol/g to $300 \times 10^{-4}$ mol/g per unit weight of the positive electrode active material layer.

[Chem. 4]

$$\text{LiX}^1\text{—OR}^1\text{O—X}^2\text{Li} \tag{1}$$

{In formula (1), $R^1$ is an alkylene group of 1 to 4 carbon atoms or a halogenated alkylene group of 1 to 4 carbon atoms, and $X^1$ and $X^2$ respectively and independently represent —(COO)$_n$ (where n is 0 or 1).}

[Chem. 5]

$$\text{LiX}^1\text{—OR}^1\text{O—X}^2\text{R}^2 \tag{2}$$

{In formula (2), $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —(COO)$_n$ (where n is 0 or 1).}

[Chem. 6]

$$\text{R}^2\text{X}^1\text{—OR}^1\text{O—X}^2\text{R}^3 \tag{3}$$

{In formula (3), $R^1$ is an alkylene group of 1 to 4 carbon atoms or a halogenated alkylene group of 1 to 4 carbon atoms, $R^2$ and $R^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —$(COO)_n$— (where n is 0 or 1).}

Particularly preferred as compounds of formula (1) are the compounds represented by $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$, for example, with no restriction to these.

Particularly preferred as compounds of formula (2) are the compounds represented by $LiOC_2H_4OH$, $LiOC_3H_6OH$, $LiOC_2H_4OCOOH$, $LiOC_3H_6OCOOH$, $LiOCOOC_2H_4OCOOH$, $LiOCOOC_3H_6OCOOH$, $LiOC_2H_4OCH_3$, $LiOC_3H_6OCH_3$, $LiOC_2H_4OCOOCH_3$, $LiOC_3H_6OCOOCH_3$, $LiOCOOC_2H_4OCOOCH_3$, $LiOCOOC_3H_6OCOOCH_3$, $LiOC_2H_4OC_2H_5$, $LiOC_3H_6OC_2H_5$, $LiOC_2H_4OCOOC_2H_5$, $LiOC_3H_6OCOOC_2H_5$, $LiOCOOC_2H_4OCOOC_2H_5$ and $LiOCOOC_3H_6OCOOC_2H_5$, for example, with no restriction to these.

Particularly preferred as compounds of formula (3) are the compounds represented by $HOC_2H_4OH$, $HOC_3H_6OH$, $HOC_2H_4OCOOH$, $HOC_3H_6OCOOH$, $HOCOOC_2H_4OCOOH$, $HOCOOC_3H_6OCOOH$, $HOC_2H_4OCH_3$, $HOC_3H_6OCH_3$, $HOC_2H_4OCOOCH_3$, $HOC_3H_6OCOOCH_3$, $HOCOOC_2H_4OCOOCH_3$, $HOCOOC_3H_6OCOOCH_3$, $HOC_2H_4OC_2H_5$, $HOC_3H_6OC_2H_5$, $HOC_2H_4OCOOC_2H_5$, $HOC_3H_6OCOOC_2H_5$, $HOCOOC_2H_4OCOOC_2H_5$, $HOCOOC_3H_6OCOOC_2H_5$, $CH_3OC_2H_4OCH_3$, $CH_3OC_3H_6OCH_3$, $CH_3OC_2H_4OCOOCH_3$, $CH_3OC_3H_6OCOOCH_3$, $CH_3OCOOC_2H_4OCOOCH_3$, $CH_3OCOOC_3H_6OCOOCH_3$, $CH_3OC_2H_4OC_2H_5$, $CH_3OC_3H_6OC_2H_5$, $CH_3OC_2H_4OCOOC_2H_5$, $CH_3OC_3H_6OCOOC_2H_5$, $CH_3OCOOC_2H_4OCOOC_2H_5$, $CH_3OCOOC_3H_6OCOOC_2H_5$, $C_2H_5OC_2H_4OC_2H_5$, $C_2H_5OC_3H_6OC_2H_5$, $C_2H_5OC_2H_4OCOOC_2H_5$, $C_2H_5OC_3H_6OCOOC_2H_5$, $C_2H_5OCOOC_2H_4OCOOC_2H_5$ and $C_2H_5OCOOC_3H_6OCOOC_2H_5$, for example, with no restriction to these.

For this embodiment, methods for adding a compound of formulas (1) to (3) into the positive electrode active material layer include, for example, a method of mixing a compound of formulas (1) to (3) to the positive electrode active material layer; a method of adsorbing a compound of formulas (1) to (3) onto the positive electrode active material layer; and a method of electrochemically depositing a compound of formulas (1) to (3) onto the positive electrode active material layer.

As a method of adding a compound of formulas (1) to (3) to the positive electrode active material layer, there is preferred a method of adding a precursor that can decompose to produce such compounds, into the nonaqueous electrolytic solution, and decomposing the precursor during the step of fabricating the nonaqueous lithium power storage element, to accumulate the compound in the positive electrode active material layer.

Precursors that decompose to form compounds represented by formulas (1) to (3) include one or more organic solvents selected from the group consisting of ethylene carbonate, propylene carbonate, butylene carbonate, vinylene carbonate and fluoroethylene carbonate, with ethylene carbonate and propylene carbonate being preferred.

The total amount of compounds of formulas (1) to (3) is preferably $1.60 \times 10^{-4}$ mol/g or greater and more preferably $5.0 \times 10^{-4}$ mol/g or greater, per unit weight of the positive electrode active material layer. If the total amount of compounds of formulas (1) to (3) is $1.60 \times 10^{-4}$ mol/g or greater per unit weight of the positive electrode active material layer, then the nonaqueous electrolytic solution will be less likely to come into contact with the positive electrode active material, and oxidative decomposition of the nonaqueous electrolytic solution can be more effectively suppressed.

The total amount of compounds of formulas (1) to (3) is preferably no greater than $300 \times 10^{-4}$ mol/g, more preferably no greater than $150 \times 10^{-4}$ mol/g and even more preferably no greater than $100 \times 10^{-4}$ mol/g, per unit weight of the positive electrode active material layer. If the total amount of compounds of formulas (1) to (3) is no greater than $300 \times 10^{-4}$ mol/g per unit weight of the positive electrode active material layer, diffusion of lithium ions will be less inhibited and higher input/output characteristic can be exhibited.

[Positive Electrode Active Material Layer]

The positive electrode active material layer contains a positive electrode active material, but it may additionally contain optional components such as a conductive filler, binder and dispersion stabilizer, as necessary.

(Positive Electrode Active Material)

The positive electrode active material preferably contains a carbon material. The carbon material is preferably carbon nanotubes, a conductive polymer or a porous carbon material, and more preferably activated carbon. The positive electrode active material may also contain two or more different materials in admixture, and it may even contain a material other than a carbon material such as, for example, a complex oxide of lithium and a transition metal.

The content of the carbon material with respect to the total weight of the positive electrode active material is preferably 50 weight % or greater and more preferably 70 weight % or greater. The carbon material content may be 100 weight %, but from the viewpoint of obtaining a satisfactory effect by combined use with other materials, it is preferably no greater than 90 weight % or no greater than 80 weight %, for example.

When activated carbon is used as the positive electrode active material, there are no particular restrictions on the type of activated carbon or its starting material. However, preferably the pores of the activated carbon are optimally controlled to obtain both a high input/output characteristic and high energy density. Specifically, if $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, then:

(1) in order to obtain a high input/output characteristic, activated carbon satisfying $0.3 < V_1 \leq 0.8$ and $0.5 \leq V_2 \leq 1.0$ and exhibiting a specific surface area of 1,500 m²/g to 3,000 m²/g as measured by the BET method (hereunder also referred to as "activated carbon 1") is preferred, and (2) in order to obtain high energy density, activated carbon satisfying $0.8 < V_1 \leq 2.5$ and $0.8 < V_2 \leq 3.0$ and exhibiting a specific surface area of 2,300 m²/g to 4,000 m²/g as measured by the BET method (hereunder also referred to as "activated carbon 2"), is preferred.

The (1) activated carbon 1 and (2) activated carbon 2 will now be described.

(Activated Carbon 1)

The mesopore volume $V_1$ of activated carbon 1 is preferably a value larger than 0.3 cc/g, from the viewpoint of a greater input/output characteristic when the positive electrode material has been incorporated into a nonaqueous lithium power storage element. On the other hand, $V_1$ for activated carbon 1 is also preferably no greater than 0.8 cc/g from the viewpoint of minimizing reduction in the bulk density of the positive electrode. $V_1$ for activated carbon 1 is more preferably 0.35 cc/g to 0.7 cc/g and even more preferably 0.4 cc/g to 0.6 cc/g.

The micropore volume $V_2$ of activated carbon 1 is preferably 0.5 cc/g or greater in order to increase the specific surface area of the activated carbon and increase capacitance. On the other hand, from the viewpoint of minimizing the bulk of the activated carbon, increasing the density as an electrode and increasing the capacitance per unit volume, $V_2$ for activated carbon 1 is preferably no larger than 1.0 cc/g. $V_2$ for activated carbon 1 is more preferably 0.6 cc/g to 1.0 cc/g and even more preferably 0.8 cc/g to 1.0 cc/g.

The ratio of the mesopore volume $V_1$ to the micropore volume $V_2$ for activated carbon 1 ($V_1/V_2$) is preferably in the range of $0.3 \leq V_1/V_2 \leq 0.9$. That is, $V_1/V_2$ for activated carbon 1 is preferably 0.3 or greater from the viewpoint of increasing the ratio of the mesopore volume to the micropore volume to a degree allowing reduction in the output characteristic to be minimized while maintaining high capacitance. On the other hand, $V_1/V_2$ for activated carbon 1 is preferably no greater than 0.9 from the viewpoint of increasing the ratio of the micropore volume with respect to the mesopore volume, to a degree allowing a high output characteristic to be maintained while minimizing reduction in capacitance. The range of $V_1/V_2$ for activated carbon 1 is more preferably $0.4 \leq V_1/V_2 \leq 0.7$ and even more preferably $0.55 \leq V_1/V_2 \leq 0.7$.

The mean pore size of activated carbon 1 is preferably 17 Å or greater, more preferably 18 Å or greater and even more preferably 20 Å or greater, from the viewpoint of increasing the output of the obtained nonaqueous lithium power storage element. From the viewpoint of increasing capacitance, the mean pore size of activated carbon 1 is preferably no greater than 25 Å.

The BET specific surface area of activated carbon 1 is preferably 1,500 $m^2/g$ to 3,000 $m^2/g$, and more preferably 1,500 $m^2/g$ to 2,500 $m^2/g$. If the BET specific surface area of activated carbon 1 is 1,500 $m^2/g$ or greater it will be easier to obtain satisfactory energy density, while if the BET specific surface area of activated carbon 1 is 3,000 $m^2/g$ or lower there will be no need to add large amounts of a binder to maintain the strength of the electrode, and therefore the performance per volume of the electrode will be higher.

The activated carbon 1 having such features can be obtained, for example, using the starting material and treatment method described below.

For this embodiment, the carbon source to be used as the starting material for activated carbon 1 is not particularly restricted. Examples of carbon sources for activated carbon 1 include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for mass-production and of cost, the starting materials preferred among these are plant-based starting materials such as coconut shell and wood dust, and their carbides, with coconut shell carbides being particularly preferred.

The system used for carbonization and activation from these starting materials to produce the activated carbon 1 may be a known system such as, for example, a fixed bed system, moving bed system, fluidized bed system, slurry system or rotary kiln system.

The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for calcination at 400 to 700° C. and preferably 450 to 600° C., over a period of about 30 minutes to 10 hours.

The activation method for a carbide obtained by the carbonization method is preferably a gas activation method in which an activating gas such as water vapor, carbon dioxide or oxygen is used for calcination. A method using water vapor or carbon dioxide as the activating gas is more preferred.

In this activation method, the activating gas is supplied at a rate of 0.5 to 3.0 kg/h and preferably 0.7 to 2.0 kg/h, while the carbide is raised to 800 to 1,000° C. for 3 to 12 hours, preferably 5 to 11 hours and more preferably 6 to 10 hours, for activation.

The carbide may be subjected to a primary activation before activation treatment of the carbide. In the primary activation, a method of calcinating the carbon material at a temperature of below 900° C. using an activating gas such as water vapor, carbon dioxide or oxygen for gas activation, is usually preferred.

By appropriate combinations for the calcination temperature and calcination time for the carbonization method, and the activating gas supply rate, temperature-elevating rate and maximum activation temperature in the activation method, it is possible to produce activated carbon 1 having the features described above, which is preferred for this embodiment.

The mean particle diameter of the activated carbon 1 is preferably 2 to 20 μm. If the mean particle diameter of the activated carbon 1 is 2 μm or greater, the capacitance per electrode volume will tend to be higher due to the higher density of the active material layer. If the mean particle diameter of the activated carbon 1 is small, the durability may be reduced, but the durability is unlikely to be reduced if the mean particle diameter is 2 μm or greater. A mean particle diameter of the activated carbon 1 of no larger than 20 μm will tend to be more suitable for high-speed charge/discharge. The mean particle diameter of activated carbon 1 is more preferably 2 to 15 μm and even more preferably 3 to 10 μm.

(Activated Carbon 2)

The mesopore volume $V_1$ of activated carbon 2 is preferably a value larger than 0.8 cc/g, from the viewpoint of a greater input/output characteristic when the positive electrode material has been incorporated into a nonaqueous lithium power storage element. On the other hand, it is preferably no greater than 2.5 cc/g from the viewpoint of minimizing reduction in the capacitance of the nonaqueous lithium power storage element. V for activated carbon 2 is more preferably 1.00 cc/g to 2.0 cc/g and even more preferably 1.2 cc/g to 1.8 cc/g.

The micropore volume $V_2$ of activated carbon 2 is preferably a value larger than 0.8 cc/g in order to increase the specific surface area of the activated carbon and increase capacitance. From the viewpoint of increasing the density of the activated carbon as an electrode and increasing the capacitance per unit volume, the $V_2$ value of activated carbon 2 is preferably no greater than 3.0 cc/g, more preferably greater than 1.0 cc/g and no greater than 2.5 cc/g, and even more preferably 1.5 cc/g to 2.5 cc/g.

Activated carbon 2 having the mesopore volume and micropore volume described above has a higher BET specific surface area than activated carbon used in conventional electrical double layer capacitors or lithium ion capacitors. The specific value of the BET specific surface area of activated carbon 2 is preferably 2,300 m$^2$/g to 4,000 m$^2$/g. The lower limit for the BET specific surface area is more preferably 3,000 m$^2$/g or greater and even more preferably 3,200 m$^2$/g or greater. The upper limit for the BET specific surface area is more preferably no greater than 3,800 m$^2$/g. If the BET specific surface area of activated carbon 2 is 2,300 m$^2$/g or greater it will be easier to obtain satisfactory energy density, and if the BET specific surface area of activated carbon 2 is 4,000 m$^2$/g or lower there will be no need to add large amounts of a binder to maintain the strength of the electrode, and therefore the performance per volume of the electrode will tend to be higher.

Activated carbon 2 having such features can be obtained, for example, using the starting material and treatment method described below.

The carbon source used as the starting material for activated carbon 2 is not particularly restricted so long as it is a carbon source commonly used as a starting material for activated carbon, and examples include plant-based starting materials such as wood, wood dust and coconut shell; petroleum-based starting materials such as petroleum pitch and coke; and various synthetic resins such as phenol resins, furan resins, vinyl chloride resins, vinyl acetate resins, melamine resins, urea resins and resorcinol resins. Of these starting materials, phenol resins and furan resins are especially preferred, being suitable for fabrication of activated carbon 2 with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. The carbonization temperature is preferably 400 to 700° C. The lower limit for the carbonization temperature is preferably 450° C. or higher and more preferably 500° C. or higher. The upper limit for the carbonization temperature is preferably no higher than 650° C. The carbonization time is preferably calcination of the starting materials for about 0.5 to 10 hours.

The activation method for the carbide after carbonization may be a gas activation method in which calcination is accomplished using an activating gas such as water vapor, carbon dioxide or oxygen, or an alkali metal activation method in which heat treatment is carried out after mixture with an alkali metal compound. An alkali metal activation method is preferred to produce activated carbon with a high specific surface area.

In this activation method, preferably a carbide and an alkali metal compound such as KOH or NaOH are mixed so that the weight ratio is 1:≥1 (the amount of the alkali metal compound being equal to or greater than the amount of the carbide), after which heat treatment is carried out in a range of 600 to 900° C. and preferably 650° C. to 850° C. for 0.5 to 5 hours under an inert gas atmosphere, and then the alkali metal compound is subjected to cleaning removal with an acid or water, and drying is performed.

A greater amount of alkali metal compound with respect to carbide will tend to increase the mesopore volume, with a drastic increase in the pore volume near a weight ratio of 1:3.5, and therefore the amount of alkali metal compound is preferably larger than a carbide:alkali metal compound weight ratio of 1:3, while also being preferably 1:≤5.5. Although the pore volume increases as the alkali metal compound increases with respect to the carbide, it is preferably 1:≤5.5 in consideration of the efficiency of subsequent treatment procedures such as washing.

In order to increase the micropore volume and not increase the mesopore volume, the amount of carbide may be increased during activation, and mixed with KOH. In order to increase both the micropore volume and mesopore volume, a large amount of KOH may be used. In order to increase mainly the mesopore volume, steam-activation is preferably carried out after alkaline activation treatment.

The mean particle diameter of activated carbon 2 is preferably 1 μm to 30 μm, more preferably 2 μm to 20 μm and even more preferably 3 μm to 10 μm.

(Aspect Using Activated Carbon)

When activated carbon is to be used for the positive electrode active material, activated carbons 1 and 2 may each be a single type of activated carbon or a mixture of two or more different types of activated carbon, such that the mixture as a whole exhibits the characteristic values described above.

Either of activated carbon 1 or 2 may be selected for use, or both may be used in admixture.

The positive electrode active material may also include materials other than activated carbons 1 and 2, such as activated carbon without the specified $V_1$ and/or $V_2$ values, or materials other than activated carbon, such as complex oxides of lithium and transition metals. In the exemplary aspect, the content of activated carbon 1, or the content of activated carbon 2, or the total content of activated carbons 1 and 2, are preferably greater than 50 weight %, more preferably 70 weight % or greater, even more preferably 90 weight % or greater and yet more preferably 100 weight %, of the total positive electrode active material.

The content ratio of the positive electrode active material in the positive electrode is preferably 35 weight % to 95 weight % based on the total weight of the positive electrode active material layer in the positive electrode precursor. The lower limit for the content ratio of the positive electrode active material is more preferably 45 weight % or greater and even more preferably 55 weight % or greater. On the other hand, the upper limit for the content ratio of the positive electrode active material is more preferably no greater than 90 weight % and even more preferably no greater than 85 weight %. A suitable charge/discharge characteristic is exhibited by adjusting the content ratio of the positive electrode active material to within this range.

(Lithium Compound)

Through the present specification, "lithium compound" refers to a lithium compound that is not the positive electrode active material and not a compound of formulas (1) to (3).

The lithium compound may be one or more selected from the group consisting of lithium carbonate, lithium oxide, lithium hydroxide, lithium fluoride, lithium chloride, lithium bromide, lithium iodide, lithium nitride, lithium oxalate and lithium acetate, that can decompose at the positive electrode in the lithium doping step described below, releasing lithium ion. Preferred among these are lithium carbonate, lithium oxide and lithium hydroxide, with lithium carbonate being more preferred, from the viewpoint of being handleable in air and having low hygroscopicity. Such lithium compounds decompose upon application of a voltage, to function as a dopant source for lithium doping in the negative electrode, while also forming a satisfactory coating film on the positive electrode active material layer, and thus allowing a positive electrode to be formed that exhibits a high high-load charge/discharge cycle characteristic.

The lithium compound is preferably in particulate form. The mean particle diameter of the particulate lithium compound is preferably 0.1 μm to 10 μm. If the mean particle diameter of the lithium compound is 0.1 μm or larger, the volume of pores remaining after oxidation reaction of the lithium compound at the positive electrode will be sufficiently large to hold the nonaqueous electrolytic solution, and the high-load charge/discharge cycle characteristic will therefore be improved. If the mean particle diameter of the particulate lithium compound is no larger than 10 μm, the surface area of the lithium compound will not be excessively reduced, and the speed of the oxidation reaction of the lithium compound can be ensured.

Various methods may be used for micronization of the lithium compound. For example, a pulverizer such as a ball mill, bead mill, ring mill, jet mill or rod mill may be used.

The content ratio of the lithium compound in the positive electrode is preferably 1 weight % to 20 weight % and more preferably 2 weight % to 18 weight %, based on the total weight of the positive electrode active material layer at the positive electrode. If the content ratio of the lithium compound in the positive electrode is 1 weight % or greater, a sufficient amount of lithium compound will be present to trap active products such as fluorine ions formed in the high-load charge/discharge cycling, and therefore the high-load charge/discharge cycle characteristic will be improved. If the content ratio of the lithium compound in the positive electrode is no greater than 20 weight %, it will be possible to increase the energy density of the nonaqueous lithium power storage element.

The content ratio of the lithium compound in the positive electrode precursor is preferably 10 weight % to 60 weight % and more preferably 20 weight % to 50 weight %, based on the total weight of the positive electrode active material layer in the positive electrode precursor. By adjusting the content ratio of the lithium compound in the positive electrode precursor to be 10 weight % to 60 weight %, a suitable function is exhibited as a dopant source in the negative electrode, a suitable degree of porosity can be imparted to the positive electrode and a satisfactory coating film can be formed, thereby allowing a nonaqueous lithium power storage element with an excellent high-load charge/discharge cycle characteristic to be obtained.

[Method of Identifying Lithium Compound in Positive Electrode]

The method of identifying a lithium compound in the positive electrode is not particularly restricted, and it may be identification by the following methods, for example. For identification of a lithium compound, it is preferred to carry out the identification by combining the different analysis methods described below.

For measurement by SEM-EDX, Raman spectroscopy or XPS described below, preferably the nonaqueous lithium power storage element is disassembled in an argon box, the positive electrode is removed, and measurement is performed after washing the electrolytic adhering to the positive electrode surface. The solvent used to wash the positive electrode only needs to wash off the electrolyte adhering to the positive electrode surface, and a carbonate solvent such as dimethyl carbonate, ethylmethyl carbonate or diethyl carbonate may be suitably used. The washing method may be, for example, immersion of the positive electrode for 10 minutes or longer in a diethyl carbonate solvent in an amount of 50 to 100 times the weight of the positive electrode, and subsequent reimmersion of the positive electrode after exchange of the solvent. The positive electrode is then removed from the diethyl carbonate and vacuum dried, and then subjected to SEM-EDX, Raman spectroscopy and XPS analysis. The vacuum drying conditions are conditions such that the diethyl carbonate residue in the positive electrode is no greater than 1 weight % under the conditions of a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a predrawn calibration curve.

In ion chromatography, described below, the water after washing of the positive electrode with distilled water is analyzed to allow identification of the anion.

When the lithium compound cannot be identified by this analysis method, solid $^7$Li-NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry) or the like may be used as an alternative analysis method to identify the lithium compound.

(Energy Dispersive X-Ray Analysis (SEM-EDX))

The oxygen-containing lithium compound and positive electrode active material can be discriminated by oxygen mapping with an SEM-EDX image of the positive electrode surface measured at an observational magnification of 1,000-4,000×. The SEM-EDX image can be measured with an acceleration voltage of 10 kV, an emission current of 10 μA and a measuring pixel count of 256×256 pixels, and a number of scans of 50. In order to prevent electrification of the sample, the sample may be surface treated with gold, platinum, osmium or the like by a method such as vacuum vapor deposition or sputtering. For the SEM-EDX image measuring method, preferably the luminance and contrast are adjusted so that the brightness has no pixel reaching the maximum luminance, and the mean value of the brightness falls within the range of 40% to 60% of the luminance. In the obtained oxygen mapping, particles containing a bright portion equal to 50% or more of the area thereof when binarized based on the mean value of brightness with respect to the resulting oxygen mapping were considered to be the lithium compound.

(Raman Spectroscopy)

The lithium compound comprising carbonate ion, and the positive electrode active material can be discriminated by Raman imaging of the positive electrode surface measured at an observational magnification of 1,000-4,000×. The measuring conditions may be, for example, an excitation light of 532 nm, an excitation light intensity of 1%, 50-fold long working of objective lens, a diffraction grating of 1,800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1,071 to 1,104 cm$^{-1}$, a value positive from the baseline is considered a carbonate ion peak, and the area is calculated and the frequency is integrated. The frequency with respect to the carbonate ion peak area with the noise component approximated by a Gaussian function is subtracted from the carbonate ion frequency distribution.

(X-Ray Photoelectron Spectroscopy (XPS))

The electronic state of lithium can be analyzed by XPS to discriminate the bonded state of the lithium. The measuring conditions may be, for example, monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$).

In the obtained XPS spectrum, the following assignments may be made: a peak having Li1s bonding energy of 50 to 54 eV as a $LiO_2$ or Li—C bond, a peak of 55 to 60 eV as LiF, $Li_2CO_3$, $Li_xPO_yF_z$ (where x, y and z are each an integer of 1 to 6); a peak having C1s bonding energy of 285 eV as a C—C bond, a peak of 286 eV as a C—O bond, a peak of 288 eV as COO, a peak of 290 to 292 eV as $CO_3^{2-}$ and C—F bonds; a peak having O1s bonding energy of 527 to 530 eV as $O^{2-}$ ($Li_2O$), a peak of 531 to 532 eV as CO, $CO_3$, OH, $PO_x$ (where x is an integer of 1 to 4), $SiO_x$ (where x is an integer of 1 to 4), a peak of 533 eV as C—O or $SiO_x$ (where x is an integer of 1 to 4); a peak having F1s bonding energy of 685 eV as LiF, a peak of 687 eV as a C—F bond, $Li_xPO_yF_z$ (where x, y and z are integers of 1 to 6), $PF_6^-$; and for P2p bonding energy, a peak of 133 eV as $PO_x$ (where x is an integer of 1 to 4), a peak of 134 to 136 eV as $PF_x$ (where x is an integer of 1 to 6); a peak having Si2p bonding energy of 99 eV as Si or silicide, a peak of 101 to 107 eV as $Si_xO_y$ (where x and y are each an arbitrary integer).

When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

(Ion Chromatography)

Anion species eluted in water can be identified by washing the positive electrode with distilled water and analyzing the water after washing, by ion chromatography. The columns used may be an ion-exchange type, ion exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Since measurement can also be carried out by combining a mass spectrometer or charged particle detector with the detector, it is preferred to combine an appropriate column and detector, depending on the lithium compound identified from the results of analysis by SEM-EDX, Raman spectroscopy or XPS.

The sample holding time will depend on the conditions such as the column and eluent used and is the same for each ion species component, while the size of the peak response differs for each ion species but is proportional to the concentration of the ion species. By premeasuring a standard solution of known concentration with ensured traceability, it is possible to qualitatively and quantitatively analyze the ion species components.

[Method of Quantifying Lithium Compound]

A method of quantifying the lithium compound in the positive electrode will now be described.

The positive electrode may be washed with an organic solvent and subsequently washed with distilled water, and the lithium compound quantified from the change in positive electrode weight before and after the washing with distilled water. The area of the positive electrode to be measured is not particularly restricted, but from the viewpoint of reducing measurement variation it is preferably 5 $cm^2$ to 200 $cm^2$ and more preferably 25 $cm^2$ to 150 $cm^2$. Measurement reproducibility can be ensured if the area is at least 5 $cm^2$. The handleability of the sample will be excellent if the area is no greater than 200 $cm^2$. Washing with an organic solvent is sufficient if it can remove decomposition products of the nonaqueous electrolytic solution that have accumulated on the positive electrode surface, and therefore while the organic solvent is not particularly restricted, elution of the lithium compound can be suppressed by using an organic solvent with a solubility of no greater than 2% for the lithium compound, and it is therefore preferred. For example, a polar solvent such as methanol or acetone may be used.

The method of washing the positive electrode is thorough immersion of the positive electrode for 3 days or longer in a methanol solution at a 50- to 100-fold amount with respect to the weight of the positive electrode. During the procedure, certain measures are preferred such as capping of the vessel so that the methanol does not volatilize off. The positive electrode is then removed from the methanol and subjected to vacuum drying (under conditions such that the methanol residue in the positive electrode is no greater than 1 weight % with a temperature of 100 to 200° C., a pressure of 0 to 10 kPa and a time of 5 to 20 hours. The methanol residue can be quantified by GC/MS measurement of water after distilled water washing, based on a predrawn calibration curve, as described below.), and the weight of the positive electrode at that time is recorded as $M_0$ (g). The positive electrode is thoroughly immersed for 3 days or longer in distilled water at a 100-fold amount (100 $M_0$ (g)) with respect to the weight of the positive electrode. During the procedure, certain measures are preferred such as capping of the vessel so that the distilled water does not volatilize off. After immersion for 3 days or longer, the positive electrode is removed from the distilled water (for the aforementioned ion chromatography measurement, the liquid volume is adjusted so that the amount of distilled water is 100 $M_0$ (g)), and vacuum drying is performed in the same manner as for the methanol washing described above. The weight of the positive electrode at this time is recorded as $M_1$ (g), and then the positive electrode active material layer is removed from the power collector using a spatula, brush, bristles or the like, for measurement of the weight of the obtained positive electrode power collector. If the weight of the obtained positive electrode power collector is represented as $M_2$ (g), the ratio Z (weight %) of the lithium compound in the positive electrode can be calculated by the following formula.

$$Z=100\times[1-(M_1-M_2)/(M_0-M_2)]$$

[Mean Particle Diameter of Lithium Compound and Positive Electrode Active Material]

Preferably, the expression 0.1 μm≤$X_1$≤10 μm is satisfied where $X_1$ is the mean particle diameter of the lithium compound and the expressions 2 μm≤$Y_1$≤20 μm and $X_1$<$Y_1$ are satisfied, where $Y_1$ is the mean particle diameter of the positive electrode active material. More preferably, $X_1$ satisfies 0.5 μm≤$X_1$≤5 μm, and $Y_1$ satisfies 3 μm≤$Y_1$≤10 μm. If $X_1$ is 0.1 μm or greater, it will be possible to have lithium compound remaining in the positive electrode after predoping of lithium, and therefore the high-load charge/discharge cycle characteristic will be increased by adsorption of fluorine ions produced by high-load charge/discharge cycling. If $X_1$ is no greater than 10 μm, on the other hand, the reaction area with the fluorine ions generated by the high-load charge/discharge cycling will increase, thus allowing the fluorine ions to be adsorbed more efficiently. If $Y_1$ is 2 μm or greater, it will be possible to ensure electron conductivity between the positive electrode active materials. If $Y_1$ is no greater than 20 μm, on the other hand, the reaction area with the electrolytic ion will increase, allowing a high input/output characteristic to be obtained. If $X_1<Y_1$, then the lithium compound will fill in the gaps formed between the positive electrode active material, thus allowing the electron conductivity between the positive electrode active material to be ensured while increasing the energy density.

The method of measuring $X_1$ and $Y_1$ is not particularly restricted, and they may be calculated from an SEM image and SEM-EDX image of the positive electrode cross-section. The method of forming the positive electrode cross-section may employ BIB processing in which an Ar beam is irradiated from above the positive electrode, and a smooth cross-section is created along the edges of a masking shield set directly above the sample. When the positive electrode comprises lithium carbonate, the carbonate ion distribution can be determined by measurement with Raman imaging of the positive electrode cross-section.

[Method of Discriminating Lithium Compound and Positive Electrode Active Material]

The lithium compound and positive electrode active material can be discriminated by oxygen mapping with an SEM-EDX image of the positive electrode cross-section measured at an observational magnification of 1000-4000x. For the SEM-EDX image measuring method, preferably the luminance and contrast are adjusted so that the brightness has no pixel reaching the maximum luminance, and the mean value of the brightness is a luminance in the range of 40% to 60%. In the obtained oxygen mapping, particles containing a bright portion equal to 50% or more of the area thereof when binarized based on the mean value of brightness with respect to the resulting oxygen mapping were considered to be lithium compound.

[Method of Calculating $X_1$ and $Y_1$]

$X_1$ and $Y_1$ can be determined by analysis of an image obtained from positive electrode cross-sectional SEM-EDX, measured in the same visual field as the positive electrode cross-sectional SEM mentioned above. The cross-sectional area S is determined for all of the particles X and Y observed in the cross-sectional SEM image, X being lithium compound particles discriminated in the SEM image of the positive electrode cross-section, and Y being the other particles which are particles of the positive electrode active material, and the particle diameter d is determined by the following formula (where π is the circular constant).

$$d=2\times(S/\pi)^{1/2}$$

Each obtained particle diameter d is used to determine the volume-average particle diameters $X_0$ and $Y_0$, by the following formula.

$$X_0(Y_0)=\Sigma[4/3\pi\times(d/2)^3\times d]/\Sigma[4/3\pi\times(d/2)^3]$$

Measurement is performed at five or more locations varying the visual field of the positive electrode cross-section, and the mean values of $X_0$ and $Y_0$ are recorded as the mean particle diameters $X_1$ and $Y_1$.

(Optional Components)

If necessary, the positive electrode active material layer of this embodiment may also contain optional components such as a conductive filler, binder and dispersion stabilizer, in addition to the positive electrode active material and lithium compound.

The conductive filler is not particularly restricted, and for example, acetylene black, Ketchen black, vapor grown carbon fibers, graphite, carbon nanotubes, and mixtures thereof, may be used. The amount of conductive filler used is preferably 0 parts by weight to 30 parts by weight, more preferably 0 parts by weight to 20 parts by weight and even more preferably 1 part by weight to 15 parts by weight, with respect to 100 parts by weight of the positive electrode active material. If the amount of conductive filler used is no greater than 30 parts by weight, the content ratio of the positive electrode active material in the positive electrode active material layer will be increased, allowing the energy density per volume of the positive electrode active material layer to be ensured.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 3 parts by weight to 27 parts by weight and even more preferably 5 parts by weight to 25 parts by weight, with respect to 100 parts by weight of the positive electrode active material. If the amount of binder used is 1 part by weight or greater, adequate electrode strength will be exhibited. If the amount of binder used is no greater than 30 parts by weight, on the other hand, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably 0 parts by weight to 10 parts by weight, with respect to 100 parts by weight of the positive electrode active material. If the amount of dispersion stabilizer used is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector of this embodiment is not particularly restricted so long as it is a material with high electron conductivity, and resistance to degradation by elution into the nonaqueous electrolytic solution or reaction with the electrolyte or ion, but a metal foil is preferred. The positive electrode power collector in the nonaqueous lithium power storage element of this embodiment is most preferably an aluminum foil.

The metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

Among these, the positive electrode power collector of this embodiment is preferably a metal foil without through-holes. Having no through-holes is cheaper in terms of production cost and facilitates thin-film formation, and can thus contribute to higher energy density, while also lowering the power collector resistance and allowing a high input/output characteristic to be obtained.

The thickness of the positive electrode power collector is not particularly restricted so long as it allows the shape and strength of the positive electrode to be maintained, but 1 to 100 μm, for example, is preferred.

[Production of Positive Electrode Precursor]

According to this embodiment, the positive electrode precursor that is to be the positive electrode of the nonaqueous lithium power storage element can be produced by a known production technique for electrodes for lithium ion batteries or electrical double layer capacitors. For example, the positive electrode active material and lithium compound, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the film thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding, after which a conductive adhesive is used for attachment to the positive electrode power collector.

The coating solution of the positive electrode precursor may also be prepared by dry blending all or a portion of each of the starting materials containing the positive electrode active material, and then adding water or an organic solvent, and/or a liquid or slurry-like substance comprising a binder or dispersion stabilizer dissolved or dispersed in them. The coating solution may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and lithium compound, and a conductive filler if necessary, and the low-conductivity lithium compound is coated with the conductive material. This will help the lithium compound to decompose by the positive electrode precursor in the lithium doping step described below. When water is used as the solvent for the coating solution, the coating solution may be rendered alkaline by addition of the lithium compound, and therefore a pH regulator may be added as necessary.

The method of dissolution or dispersion is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and re-aggregation will be reduced.

The degree of dispersion of the coating solution is preferably to a granularity of 0.1 μm to 100 μm, as measured with a fineness gauge. The upper limit for the degree of dispersion is more preferably to a granularity of no greater than 80 μm, and more preferably to a granularity of no greater than 50 μm. A granularity of 0.1 μm or greater means that each of the material powders containing positive electrode active materials are not excessively crushed during preparation of the coating solution. In addition, if the granularity is no greater than 100 μm, there will be less clogging during discharge of the coating solution and less formation of streaks in the coating film, allowing more stable coating.

The viscosity (ηb) of the coating solution of the positive electrode precursor is preferably 1,000 mPa·s to 20,000 mPa·s, more preferably 1,500 mPa·s to 10,000 mPa·s and even more preferably 1,700 mPa·s to 5,000 mPa·s. If the viscosity (ηb) of the coating solution of the positive electrode precursor is 1,000 mPa·s or higher, liquid dripping during formation of the coating film will be suppressed, and the coating film width and thickness can be satisfactorily controlled. If the viscosity (ηb) of the coating solution of the positive electrode precursor is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution of the positive electrode precursor is preferably 1.1 or greater, more preferably 1.2 or greater and even more preferably 1.5 or greater. If the TI value of the coating solution of the positive electrode precursor is 1.1 or greater, it will be possible to satisfactorily control the coating film width and thickness.

The method of forming a coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound content differs within each layer of the coating film. The coating speed is preferably 0.1 m/min to 100 m/min, more preferably 0.5 m/min to 70 m/min and even more preferably 1 m/min to 50 m/min. If the coating speed is 0.1 m/min or greater then stable coating will be possible, and if it is no greater than 100 m/min then coating precision can be adequately ensured.

The method of drying the coating film of the positive electrode precursor is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the positive electrode power collector or positive electrode active material layer.

The method of pressing the positive electrode precursor is not particularly restricted, and a pressing machine such as a hydraulic press or vacuum pressing machine may be suitably used. The film thickness, bulk density and electrode strength of the positive electrode active material layer can be adjusted by the pressing pressure, the gap, and the surface temperature of the pressed portion, as described below.

The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkling will be unlikely to occur in the positive electrode precursor, and adjustment of the positive electrode active material layer to the desired film thickness and bulk density will be easier.

The gap between the press rolls may be set to a desired value depending on the film thickness of the dried positive electrode precursor, so that the desired film thickness and bulk density of the positive electrode active material layer is obtained.

The pressing speed may also be set to the desired speed, so as to reduce distortion and wrinkling in the positive electrode precursor. The surface temperature of the pressed portion may be room temperature, or it may be heated instead, if necessary.

In the case of heating, the lower limit for the surface temperature of the pressed portion is preferably at least the melting point of the binder minus 60° C., more preferably at least the melting point of the binder minus 45° C., and even more preferably at least the melting point of the binder minus 30° C. The upper limit for the surface temperature of the pressed portion in the case of heating is also preferably no higher than the melting point of the binder used plus 50° C., more preferably no higher than the melting point of the binder plus 30° C., and even more preferably no higher than the melting point of the binder plus 20° C. For example, when PVdF (polyvinylidene fluoride: melting point=150° C.) is used as the binder, heating of the surface of the pressed portion is to preferably between 90° C. and 200° C., more preferably between 105° C. and 180° C. and even more preferably between 120° C. and 170° C. When a styrene-butadiene copolymer (melting point=100° C.) is used as the binder, heating of the surface of the pressed portion is to preferably between 40° C. and 150° C., more preferably between 55° C. and 130° C. and even more preferably between 70° C. and 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The film thickness of the positive electrode active material layer is preferably 20 μm to 200 μm for each side of the positive electrode power collector, more preferably 25 μm to 100 μm for each side, and even more preferably 30 μm to 80 μm. If the film thickness of the positive electrode active material layer is 20 μm or greater, sufficient charge/discharge capacity can be exhibited. If the film thickness of the positive electrode active material layer is no greater than 200 μm, low ion diffusion resistance can be maintained in the electrode. Therefore, if the film thickness of the positive electrode power collector layer is 20 μm to 200 μm, it will be possible to obtain an adequate output characteristic, while also reducing the volume of the nonaqueous lithium power storage element, thereby allowing the energy density to be increased. The film thickness of the positive electrode active material layer, when the positive electrode power collector has through-holes or ruggedness, is the mean value of the film thickness of the positive electrode active material layer for each side at the sections of the positive electrode power collector without through-holes or ruggedness.

[Positive Electrode]

The bulk density of the positive electrode active material layer at the positive electrode after the lithium doping step described below is in the range of preferably 0.50 g/cm$^3$ or greater and more preferably 0.55 g/cm$^3$ to 1.3 g/cm$^3$. If the bulk density of the positive electrode active material layer is 0.50 g/cm$^3$ or greater, it will be possible to exhibit high energy density and to reduce the size of the nonaqueous lithium power storage element. If the bulk density of the positive electrode active material layer is no higher than 1.3 g/cm$^3$, on the other hand, diffusion of the nonaqueous electrolytic solution in the pores in the positive electrode active material layer will be adequate, and a high output characteristic will be obtained.

<Negative Electrode>

The negative electrode of this embodiment has a negative electrode power collector and a negative electrode active material layer containing a negative electrode active material, formed on one or both sides thereof.

For the negative electrode of this embodiment, in the solid $^7$Li-NMR spectrum of the negative electrode active material layer containing a graphite-based carbon material as the negative electrode active material, in the spectral range of −10 ppm to 35 ppm, the maximum value of the peaks is between 4 ppm to 30 ppm, and the amount of lithium per unit weight of the negative electrode active material layer that has intercalated lithium ion (hereunder also referred to as "amount of lithium in the negative electrode active material layer"), as calculated by the peak area from 4 ppm to 30 ppm, is preferably 0.10 mmol/g to 10.0 mmol/g, more preferably 0.30 mmol/g to 9.0 mmol/g, even more preferably 0.50 mmol/g to 8.0 mmol/g, yet more preferably 0.80 mmol/g to 7.5 mmol/g and most preferably 1.0 mmol/g to 7.0 mmol/g.

If the negative electrode of this embodiment contains a graphite-based carbon material as the negative electrode active material, and in the solid $^7$Li-NMR spectrum of the negative electrode active material layer, in the spectral range of −10 ppm to 35 ppm, the maximum value of the peaks is between 4 ppm to 30 ppm, and also if the amount of lithium per unit weight of the negative electrode active material layer that has intercalated lithium ion, as calculated by the peak area from 4 ppm to 30 ppm, is within the range specified above, then a nonaqueous lithium power storage element using the negative electrode will exhibit a high input/output characteristic and a high-load charge/discharge cycle characteristic. While the principle is not completely understood, and it is not our intention to be limited by theory, the following is conjectured.

For solid $^7$Li-NMR of the negative electrode active material layer, the spectrum observed from 30 ppm to 60 ppm is due to lithium ions intercalated within the carbon hexagonal mesh surface of the graphite portion of the graphite-based carbon material. Since lithium ion in the intercalated state strongly interacts with the carbon hexagonal mesh surface, a large amount of energy is necessary to release the lithium ion, and the resistance is increased.

On the other hand, the spectrum observed from 4 ppm to 30 ppm in solid $^7$Li-NMR of the negative electrode active material layer is thought to be derived from lithium ions intercalated in the amorphous portion of the graphite-based carbon material, the boundary between the graphite portion and the amorphous portion, and within the carbon hexagonal mesh surface layer of the graphite portion near the boundary, which are either mutually exchanged or mutually interacting. Since such lithium ions in the intercalated state weakly interact with carbon atoms, a large amount of energy is not necessary to release the lithium ions. Moreover, intercalation and release of lithium ions between the negative electrode and the nonaqueous electrolytic solution is thought to take place through the amorphous portion, which has more reaction sites for the intercalated lithium ions than the graphite portion. Therefore, it is believed, adjusting the maximum value of the peaks in the spectral range of −10 ppm to 35 ppm in the solid $^7$Li-NMR spectrum of the negative electrode active material layer to between 4 ppm to 30 ppm, and the amount of lithium, as calculated by the peak area from 4 ppm to 30 ppm, to within the range specified above, it is possible to reduce the input/output resistance and exhibit a high input/output characteristic for a nonaqueous lithium power storage element using the negative electrode. In addition, lithium ion in the intercalated state can adequately respond even during high-load charge/discharge cycling in which high current charge/discharge is repeated, for the reason described above, and a satisfactory high-load charge/discharge cycle characteristic can be exhibited.

If the amount of lithium in the negative electrode active material layer is 0.10 mmol/g or greater, for the reason explained above, a nonaqueous lithium power storage element using a negative electrode containing the negative electrode active material layer can exhibit a high input/output characteristic and a high-load charge/discharge cycle characteristic. On the other hand, if the amount of lithium in the negative electrode active material layer is no greater than 10.0 mmol/g, then it will be possible to suppress self-discharged release of lithium ions that have been intercalated in the negative electrode active material. Thus, in the negative electrode of this embodiment, it is possible to suppress reaction of lithium ions released by self-discharge, with the nonaqueous electrolytic solution in the negative electrode active material layer, and increase in the coating film or deposit, thereby allowing a nonaqueous lithium power storage element using the negative electrode to exhibit a high high-load charge/discharge cycle characteristic.

Throughout the present specification, the amount of lithium per unit weight of the negative electrode active material layer that has intercalated lithium ions, as obtained by the solid $^7$Li-NMR spectrum of the negative electrode active material layer (the amount of lithium in the negative electrode active material layer), can be calculated by the following method.

The measuring apparatus used for solid $^7$Li-NMR may be a commercially available apparatus. The spectrum is measured by the single pulse method in a room temperature environment, with a magic-angle spinning rotational speed of 14.5 kHz and an irradiation pulse width set to a 45° pulse. The repeated latency during the measurement is set for adequate measurement.

A 1 mol/L aqueous lithium chloride solution is used as the shift reference, and the shift position measured separately as an external standard is defined as 0 ppm. During measurement of the 1 mol/L aqueous lithium chloride solution, the single pulse method is used for spectral measurement with an irradiation pulse width set to a 45° pulse, without rotation of the sample.

The obtained solid $^7$Li-NMR spectrum for the negative electrode active material layer obtained by the method described above is used to determine the peak areas for components in the range of 4 ppm to 30 ppm. The peak areas may then be divided by the peak area for a 1 mol/L aqueous lithium chloride solution, with the same sample height in the measuring rotor as during measurement of the negative electrode active material layer, and further divided by the weight of the negative electrode active material layer used for measurement, to calculate the amount of lithium in the negative electrode active material layer. Throughout the present specification, the "weight of the negative electrode active material layer" is the weight of the negative electrode active material layer including lithium ion intercalated in the negative electrode active material layer and/or the coating film or accumulated deposit on the negative electrode active material layer.

For this embodiment, the mean distance between the centers of gravity of the voids (hereunder also, "$r_p$") obtained by SEM of the cross-section of the negative electrode active material layer, is preferably 1 μm to 10 μm, more preferably between 1.3 μm and 8 μm, inclusive, even more preferably between 1.5 μm and 6 μm, inclusive, yet more preferably between 1.7 μm and 5 μm, inclusive and most preferably between 1.9 μm and 4 μm, inclusive.

The nonaqueous lithium power storage element of this embodiment, using a positive electrode containing a lithium compound other than the positive electrode active material, and a negative electrode having the mean distance between the centers of gravity of the voids, obtained by SEM of a cross-section of the negative electrode active material layer, adjusted to within a specified range, exhibits a high input/output characteristic and a high-load charge/discharge cycle characteristic. While the principle is not completely understood, and it is not our intention to be limited by theory, the following is conjectured. It is believed that the mean distance between the centers of gravity of the voids, obtained by SEM of a cross-section of the negative electrode active material layer, represents the distribution of the nonaqueous electrolytic solution held in the negative electrode active material layer. Consequently, by adjusting the mean distance between the centers of gravity of the voids obtained by SEM of a cross-section of the negative electrode active material layer to be within an appropriate range, it is possible hold a suitable amount of the nonaqueous electrolytic solution around the negative electrode active material. It is therefore possible to avoid lithium ion deficiency surrounding the negative electrode active material even during high current charge/discharge or high-load charge/discharge cycling, and to exhibit a high input/output characteristic and a high-load charge/discharge cycle characteristic. By using a negative electrode wherein the mean distance between the centers of gravity of the voids, obtained by SEM of a cross-section of the negative electrode active material layer, is adjusted to 1 μm or greater, active products such as fluorine ions (HF, for example) generated at the positive electrode during high-load charge/discharge cycling will easily diffuse in the negative electrode active material layer. Therefore, the active products such as fluorine ions react with the lithium ions intercalated in the negative electrode active material and with the nonaqueous electrolytic solution, in the negative electrode active material layer, thus increasing the coating film and accumulated deposit resulting from reductive decomposition of the nonaqueous electrolytic solution. This results in deterioration of the high-load charge/discharge cycle characteristic. However, by adding a lithium compound other than the positive electrode active material to the positive electrode, the lithium compound traps such active products such as fluorine ions, allowing increase in the coating film and accumulated deposit in the negative electrode active material layer to be suppressed, and allowing a satisfactory high-load charge/discharge cycle characteristic to be exhibited.

If the mean distance between the centers of gravity of the voids obtained by SEM of a cross-section of the negative electrode active material layer is 1 µm or greater, the sizes of the voids will increase and a sufficient amount of nonaqueous electrolytic solution will be able to be retained in the voids, thereby allowing a high input/output characteristic and a high-load charge/discharge cycle characteristic to be exhibited, for the reason explained above. If the mean distance between the centers of gravity of the voids obtained by SEM of a cross-section of the negative electrode active material layer is no greater than 10 µm, a suitable amount of nonaqueous electrolytic solution will be dispersed in the negative electrode active material layer, thereby allowing a high input/output characteristic and a high-load charge/discharge cycle characteristic to be exhibited, for the reason explained above.

Throughout the present specification, the mean distance between the centers of gravity of the voids obtained by SEM of a cross-section of the negative electrode active material layer can be calculated by the following method.

The sample used for measurement may be the negative electrode before it is incorporated into the nonaqueous lithium power storage element (hereunder also referred to as "negative electrode before use"), or it may be the negative electrode incorporated in the nonaqueous lithium power storage element (hereunder also referred to as "negative electrode after use").

When the negative electrode incorporated in the nonaqueous lithium power storage element is to be used as the measuring sample, the following method, for example, is preferably used as pretreatment of the measuring sample.

First, the nonaqueous lithium power storage element is disassembled under an inert atmosphere such as argon, and the negative electrode is removed. The removed negative electrode is immersed in a linear carbonate (such as methyl ethyl carbonate or dimethyl carbonate), the nonaqueous electrolytic solution and lithium salt are removed and air-drying is carried out. Next, the following method (1), (2) or (3) is preferably used.

(1) The obtained negative electrode is immersed in a mixed solvent composed of methanol and isopropanol to inactivate the lithium ion intercalated in the negative electrode active material, and air-drying is carried out. Next, using vacuum drying or the like, the linear carbonate and organic solvent in the obtained negative electrode are removed to obtain a measuring sample.

(2) Using the obtained negative electrode as the working electrode and metal lithium as the counter electrode and reference electrode, they are immersed in the nonaqueous electrolytic solution under an inert atmosphere such as argon, to fabricate an electrochemical cell. A charger-discharger is used for adjustment of the obtained electrochemical cell, so that the negative electrode potential (vs. Li/Li$^+$) is in the range of 1.5 V to 3.5 V. Next, the negative electrode is removed from the electrochemical cell under an inert atmosphere such as argon and immersed in a linear carbonate to remove the nonaqueous electrolytic solution and lithium salt, and air-drying is carried out. Next, vacuum drying or the like is used to remove the linear carbonate in the obtained negative electrode, to obtain a measuring sample.

(3) The obtained negative electrode may be used directly as the measuring sample. In this case, the formation of the cross-section of the negative electrode active material layer and the SEM observation described below are preferably carried out under an inert atmosphere such as argon.

Next, when a horizontal plane with respect to the direction of lamination of the negative electrode power collector and negative electrode active material layer is to be the cross section, and a plane crossing perpendicular to the horizontal plane is to be the flat section, as shown in FIG. 1, the measuring sample obtained as explained above is used to form a cross-section of the negative electrode active material layer. The method of forming the cross-section of the negative electrode active material layer is not particularly restricted so long as it is a method that can minimize damage to the cross-section of the negative electrode active material layer by formation or processing of the cross-section, but it is preferred to use a processing method using an ion beam (for example, BIB (Broad Ion Beam) processing or FIB (Focused Ion Beam) processing), or to use a precision machining polisher, ultramicrotome or the like. From the viewpoint of minimizing damage by formation and processing of the cross-section of the negative electrode active material layer it is particularly preferred to use BIB processing with an argon ion beam. A method of forming a cross-section of a negative electrode active material layer using BIB processing is as follows. An argon ion beam is irradiated from above the flat section of the negative electrode, and a cross-section of the negative electrode active material layer perpendicular to the flat section of the negative electrode is created along the edge of a masking shield (mask) set directly above the flat section of the negative electrode.

The formed negative electrode active material layer cross-section is observed with a scanning electron microscope (SEM) to obtain an SEM image of the cross-section of the negative electrode active material layer. If necessary, a lower detector capable of lowering the detection sensitivity for the internal structure of the negative electrode active material layer that is observed between the negative electrode active material may be used, from the viewpoint of facilitating image analysis such as binarization, described below.

The obtained cross-section of the negative electrode active material layer SEM image is then subjected to image analysis. The image analysis tool is not particularly restricted so long as it can carry out the processing described below, and an IP-1000 by Asahi Kasei Corp. (software: A-Zou Kun), or ImageJ, may be used.

A region for image analysis is extracted from a cross-section of the negative electrode active material layer in an SEM image at an observational magnification of 1,000× to 10,000×, and preferably 3,000×. If necessary, before performing the binarization described below, a median filter or the like may be used for the extracted region to remove trace noise included in the image. A median filter, for the purpose of the present specification, is the procedure of substituting the luminance of a pixel of interest with the median luminance of the peripheral 9 pixels (3 pixels×3 pixels).

Next, the extracted region is subjected to binarization processing, in which an image with contrast is converted to two-tone (for example, black and white). Binarization is performed by adjusting the contrast so that the minimum and maximum values in a luminance histogram of the extracted region are included, and sections of the extracted region corresponding to voids are dark while the sections corresponding to the negative electrode active material are light. In the binarization, with the color tone positioned at the bottom of the valley of the luminance histogram in the extracted region as the cutoff value, gradation 1 (for example, white) is assigned if the luminance of each pixel is above the cutoff value, while gradation 2 is assigned if it is below (for example, black). In this case, gradation 2 (for example, black) corresponds to a void.

The sections with gradation 2 in the binarized image are treated as voids, and the mean distance between the centers of gravity of the voids is calculated by the following method. Voids having larger areas than 0.2 $\mu m^2$ are used in order to eliminate the effect of fine voids arising from the conductive filler, for example, and the centers of gravity of adjacent voids are connected with straight lines, calculating the mean value of the lengths of the line segments (distances between centers of gravity) as the mean distance between the centers of gravity of the voids. The method of connecting the centers of gravity is not randomly, but in a pattern known as a Delaunay diagram or Delaunay triangulation. Connecting the centers of gravity forms polygons, which are triangular except in special cases.

[Negative Electrode Active Material Layer]

The negative electrode active material layer contains the negative electrode active material, but it may also contain optional components such as a conductive filler, binder and dispersion stabilizer, as necessary.

(Negative Electrode Active Material)

The negative electrode active material used may be a substance capable of intercalating and releasing lithium ions. Negative electrode active materials include, specifically, carbon materials, titanates, silicon, silicon oxides, silicon alloys, silicon compounds, tin and tin compounds. The content of the carbon material with respect to the total weight of the negative electrode active material is preferably 50 weight % or greater and more preferably 70 weight % or greater. The carbon material content may be 100 weight %, but from the viewpoint of obtaining a satisfactory effect by combined use with other materials, it is preferably, for example, no greater than 90 weight %, and may even be 80 weight % or lower.

The negative electrode active material is preferably doped with lithium ion. The lithium ion doped in the negative electrode active material, for this embodiment, includes three major forms.

The first form is lithium ion that is intercalated in advance in the negative electrode active material, as a design value, before fabrication of the nonaqueous lithium power storage element.

The second form is lithium ion intercalated in the negative electrode active material during fabrication and shipping of the nonaqueous lithium power storage element.

The third form is lithium ion intercalated in the negative electrode active material after the nonaqueous lithium power storage element has been used as a device.

By doping the negative electrode active material with lithium ion it is possible to satisfactorily control the capacitance and operating voltage of the obtained nonaqueous lithium power storage element.

Examples of carbon materials include non-graphitizable carbon materials (hard carbon); easily graphitizable carbon materials (soft carbon); carbon black; carbon nanoparticles; activated carbon; graphite-based carbon materials; amorphous carbonaceous materials such as polyacene-based materials; carbonaceous materials obtained by heat treatment of carbonaceous material precursors such as petroleum-based pitch, coal-based pitch, mesocarbon microbeads, coke and synthetic resins (for example, phenol resins); thermal decomposition products of furfuryl alcohol resins or novolac resins; fullerenes; carbon nanohorns; and carbon materials that are composites of the foregoing.

Examples of graphite-based carbon materials include graphite materials such as artificial graphite, natural graphite, low crystal graphite, graphitized mesophase carbon microspheres, graphite whiskers and high specific surface area graphite, as well as carbon materials obtained by subjecting these graphite materials to the amorphous portion-forming method described below.

The method of forming the amorphous portion of the graphite-based carbon material is not particularly restricted, and may be a method of compositing the graphite material and the carbonaceous material described below; a method of carrying out physical surface modification of the graphite material by laser, plasma, corona treatment or the like; a method of immersing the graphite material in an acid or alkali solution and heating for chemical surface modification of the graphite material; or a method of forming graphite and amorphous materials in a random (vitreous) fashion by a calcination pattern during graphitization of the starting material for the graphite-based carbon material, such as needle coke (for example, rapid temperature increase in the range of 2,000° C. to 3,000° C., followed by rapid temperature lowering to 100° C. or below). The amorphous portion may be formed on the surface of the graphite-based carbon material or it may be formed inside the graphite-based carbon material, but preferably it is formed on the surface of the graphite-based carbon material for the reason explained above.

Preferred among these, from the viewpoint of lowering the resistance of the negative electrode, is a composite carbon material which is obtained by heat treating one or more of the aforementioned carbon materials (hereunder referred to as "base material") in the copresence of the carbonaceous material precursor, to form a composite of the base material with the carbonaceous material derived from the carbonaceous material precursor. The carbonaceous material precursor is not particularly restricted so long as it is converted to a carbonaceous material by heat treatment, but petroleum-based pitch or coal-based pitch is especially preferred. Before the heat treatment, the base material and the carbonaceous material precursor may be mixed at a temperature higher than the melting point of the carbonaceous material precursor. The heat treatment temperature may be any temperature such that the components generated when the carbonaceous material precursor that is used volatilizes or thermally decomposes, form a carbonaceous material, and it is preferably 400° C. to 2,500° C., more preferably 500° C. to 2,000° C., and even more preferably 550° C. to 1,500° C. The atmosphere for heat treatment is not particularly restricted, but is preferably a non-oxidizing atmosphere.

Preferred examples for the composite carbon material are composite carbon materials 1 and 2 described below. Either of these may be selected for use, or both may be used in combination.

(Composite Carbon Material 1)

In the present specification, composite carbon material 1 is a composite carbon material using at least one type of carbon material with a BET specific surface area of 100 $m^2$/g to 3,000 $m^2$/g as the base material. The base material of composite carbon material 1 is not particularly restricted so long as it has a BET specific surface area of 100 $m^2$/g to 3,000 $m^2$/g, and activated carbon, carbon black, molded porous carbon, high specific surface area graphite or carbon nanoparticles may be suitably used.

The BET specific surface area of the composite carbon material 1 is preferably 100 m$^2$/g to 1,500 m$^2$/g, more preferably 150 m$^2$/g to 1,100 m$^2$/g, and even more preferably 180 m$^2$/g to 550 m$^2$/g. If the BET specific surface area of the composite carbon material 1 is 100 m$^2$/g or greater, suitable pores will be maintained and diffusion of lithium ions in the nonaqueous electrolytic solution will be satisfactory, and therefore a high input/output characteristic can be exhibited and reaction sites between lithium ions in the nonaqueous electrolytic solution can be adequately increased, thereby allowing a high input/output characteristic to be exhibited. If the BET specific surface area of the composite carbon material 1 is no greater than 1,500 m$^2$/g, the lithium ion charge/discharge efficiency will be increased and excessive reductive decomposition of the nonaqueous electrolytic solution can be suppressed, so that impairment of the high-load charge/discharge cycle characteristic can be minimized.

The weight ratio of the carbonaceous material with respect to the base material in composite carbon material 1 is preferably 10 weight % to 200 weight %, more preferably 12 weight % to 180 weight %, even more preferably 15 weight % to 160 weight % and most preferably 18 weight % to 150 weight %. If the weight ratio of the carbonaceous material is 10 weight % or greater, it will be possible to suitably fill the micropores of the base material with the carbonaceous material, and the lithium ion charge/discharge efficiency will be increased, therefore allowing a high-load charge/discharge cycle characteristic to be exhibited. If the weight ratio of the carbonaceous material with respect to the base material is no greater than 200 weight %, it will be possible to suitably maintain the pores and the lithium ion diffusion will be satisfactory, and therefore a high input/output characteristic can be exhibited.

The lithium ion doping amount per unit weight of composite carbon material 1 is preferably 530 mAh/g to 2,500 mAh/g, more preferably 620 mAh/g to 2,100 mAh/g, even more preferably 760 mAh/g to 1,700 mAh/g and yet more preferably 840 mAh/g to 1,500 mAh/g.

Doping lithium ion in the negative electrode will lower the potential of the negative electrode. Thus, when a negative electrode containing composite carbon material 1 doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the lithium ion doping amount per unit weight of the composite carbon material 1 is 530 mAh/g or greater, lithium ion in the composite carbon material 1 will be satisfactorily doped even at irreversible sites where lithium ion cannot be desorbed after once being inserted, and it will also be possible to reduce the amount of composite carbon material 1 per amount of lithium. The film thickness of the negative electrode can therefore be reduced and high energy density can be obtained. As the doping amount increases, the negative electrode potential decreases and the input/output characteristic, energy density and durability increase.

If the lithium ion doping amount per unit weight of the composite carbon material 1 is no greater than 2,500 mAh/g, side-effects of lithium metal deposition and the like will be less likely to occur.

Composite carbon material 1a using activated carbon as the base material will now be described as a preferred example of composite carbon material 1.

Composite carbon material 1a preferably satisfies $0.010 \leq V_{m1} \leq 0.300$, $0.001 \leq V_{m2} \leq 0.650$, where $V_{m1}$ (cc/g) is the mesopore volume due to pores with diameters of 20 Å to 500 Å, as calculated by the BJH method, and $V_{m2}$ (cc/g) is the micropore volume due to pores with diameters of smaller than 20 Å as calculated by the MP method.

The mesopore volume $V_{m1}$ more preferably satisfies $0.010 \leq V_{m1} \leq 0.225$ and even more preferably $0.010 \leq V_{m1} \leq 0.200$. The micropore volume $V_{m2}$ more preferably satisfies $0.001 \leq V_{m2} \leq 0.200$, even more preferably $0.001 \leq V_{m2} \leq 0.150$ and most preferably $0.001 \leq V_{m2} \leq 0.100$.

If the mesopore volume $V_{m1}$ is no greater than 0.300 cc/g it will be possible to increase the BET specific surface area and increase the lithium ion doping amount, while also increasing the bulk density of the negative electrode. As a result, the negative electrode can be made into a thin-film. If the micropore volume $V_{m2}$ is no greater than 0.650 cc/g, it will be possible to maintain high charge/discharge efficiency for lithium ions. On the other hand, if the mesopore volume $V_{m1}$ and micropore volume $V_{m2}$ satisfy $0.010 \leq V_{m1}$ and $0.001 \leq V_{m2}$, then a high input/output characteristic can be obtained.

The BET specific surface area of composite carbon material 1a is preferably 100 m$^2$/g to 1,500 m$^2$/g, more preferably 150 m$^2$/g to 1,100 m$^2$/g, and even more preferably 180 m$^2$/g to 550 m$^2$/g. If the BET specific surface area of the composite carbon material 1a is 100 m$^2$/g or greater, suitable pores will be maintained and diffusion of lithium ions in the nonaqueous electrolytic solution will be satisfactory, and therefore a high input/output characteristic can be exhibited and reaction sites between lithium ions in the nonaqueous electrolytic solution can be adequately increased, thereby allowing a high input/output characteristic to be exhibited. If the BET specific surface area of the composite carbon material 1a is no greater than 1,500 m$^2$/g, the lithium ion charge/discharge efficiency will be increased and excessive reductive decomposition of the nonaqueous electrolytic solution can be suppressed, so that impairment of the high-load charge/discharge cycle characteristic can be minimized.

The mean pore size of composite carbon material 1a is preferably 20 Å or larger, more preferably 25 Å or larger and even more preferably 30 Å or larger, from the viewpoint of obtaining a high input/output characteristic. The mean pore size of composite carbon material 1a is preferably no larger than 65 Å and more preferably no larger than 60 Å, from the viewpoint of obtaining high energy density.

The mean particle diameter of composite carbon material 1a is preferably 1 μm to 10 μm, the lower limit being more preferably 2 μm or larger and even more preferably 2.5 μm or larger, and the upper limit being more preferably no larger than 6 μm and even more preferably no larger than 4 μm. If the mean particle diameter of composite carbon material 1a is 1 μm to 10 μm, then satisfactory durability will be maintained.

For composite carbon material 1a, the atomic ratio of hydrogen/carbon atom (H/C) is preferably 0.05 to 0.35 and more preferably 0.05 to 0.15. If H/C for composite carbon material 1a is 0.35 or smaller, the structure of the carbonaceous material adhering to the activated carbon surface, which is typically a polycyclic aromatic conjugated structure, will satisfactorily develop and the capacitance (energy density) and charge/discharge efficiency will increase. If H/C for composite carbon material 1a is 0.05 or larger, there will be no excessive carbonization, and therefore satisfactory energy density will be obtained. The H/C ratio is measured with an elemental analyzer.

Composite carbon material 1a has an amorphous structure derived from the activated carbon of the base material, but it simultaneously also has a crystal structure derived mainly from the coated carbonaceous material. Based on wide-angle X-ray diffraction, in the composite carbon material 1a, preferably the plane spacing $d_{002}$ of the (002) plane is 3.60 Å to 4.00 Å, and the crystallite size Lc in the c-axis direction obtained from the half width of the peak is 8.0 Å to 20.0 Å; and more preferably $d_{002}$ is 3.60 Å to 3.75 Å, and the crystallite size Lc in the c-axis direction obtained from the half width of the peak is 11.0 Å to 16.0 Å.

The activated carbon used as the base material for composite carbon material 1a is not particularly restricted so long as the obtained composite carbon material 1a exhibits the desired properties. For example, it is possible to use a commercially available product obtained from a petroleum-based, coal-based, plant-based or polymer-based starting material as the activated carbon of composite carbon material 1a. It is particularly preferred to use activated carbon powder having a mean particle diameter of 1 μm to 15 μm. The mean particle diameter of the activated carbon powder is more preferably 2 μm to 10 μm.

In order to obtain composite carbon material 1a having the pore distribution range specified for this embodiment, the pore distribution of the activated carbon used as the base material is important.

The activated carbon used as the base material for composite carbon material 1a preferably satisfies $0.050 \leq V_1 \leq 0.500$, $0.005 \leq V_2 \leq 1.000$ and $0.2 \leq V_1/V_2 \leq 20.0$, where $V_1$ (cc/g) is the mesopore volume due to pores with diameters of 20 Å to 500 Å, as calculated by the BJH method, and $V_2$ (cc/g) is the micropore volume due to pores with diameters of smaller than 20 Å as calculated by the MP method.

The mesopore volume $V_1$ more preferably satisfies $0.050 \leq V_1 \leq 0.350$ and more preferably $0.100 \leq V_1 \leq 0.300$. The micropore volume $V_2$ more preferably satisfies $0.005 \leq V_2 \leq 0.850$ and more preferably $0.100 \leq V_2 \leq 0.800$. The mesopore volume/micropore volume ratio satisfies preferably $0.22 \leq V_1/V_2 \leq 15.0$ and more preferably $0.25 \leq V_1/V_2 \leq 10.0$. When the mesopore volume $V_1$ of the activated carbon is 0.500 or smaller and the micropore volume $V_2$ is 1.000 or smaller, coating a suitable amount of carbonaceous material will be adequate for obtaining a pore structure for the composite carbon material 1a according to this embodiment, and it will therefore tend to be easier to control the pore structure. When the mesopore volume $V_1$ of the activated carbon is 0.050 or greater and the micropore volume $V_2$ is 0.005 or greater, the desired pore structure can be easily obtained if $V_1/V_2$ is 0.2 or greater and $V_1/V_2$ is no greater than 20.0.

A carbonaceous material precursor to be used as a starting material for composite carbon material 1a is a solid, liquid or solvent-soluble organic material that can be coated as a carbonaceous material onto activated carbon by heat treatment. The carbonaceous material precursor may be, for example, pitch, mesocarbon microbeads, coke or a synthetic resin such as a phenol resin, for example. Among such carbonaceous material precursors, the use of inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

When pitch is used, composite carbon material 1a can be obtained by heat treatment of the pitch in the co-presence of activated carbon, causing thermal reaction of the volatile components and thermal decomposition components of the pitch on the surface of the activated carbon to coat the carbonaceous material onto the activated carbon. In this case, coating of the volatile components or thermal decomposition components of the pitch inside the pores of the activated carbon proceeds at a temperature of about 200 to 500° C., and the coated components undergo reaction to form a carbonaceous material at about 400° C. or higher. The peak temperature during heat treatment (maximum ultimate temperature) may be appropriately set depending on the properties of the composite carbon material 1a to be obtained, the thermal reaction pattern and the thermal reaction atmosphere, but it is preferably 400° C. or higher, more preferably 450° C. to 1,000° C. and even more preferably about 500 to 800° C. The time for which the peak temperature is maintained during heat treatment is preferably 30 minutes to 10 hours, more preferably 1 hour to 7 hours and even more preferably 2 hours to 5 hours. For example, with heat treatment at a peak temperature of about 500 to 800° C. over a period of 2 hours to 5 hours, the carbonaceous material that has been coated onto the activated carbon surface is potentially converted to polycyclic aromatic hydrocarbons.

The softening point of the pitch is preferably between 30° C. and 250° C., and more preferably between 60° C. and 130° C. Pitch with a softening point of 30° C. or higher will allow precise charging to be carried out without impairing the handleability. Pitch with a softening point of no higher than 250° C. comprises a relatively large number of low molecular compounds, and therefore using pitch with a softening point of no higher than 250° C. will allow coating even to the relatively fine pores in the activated carbon.

The specific method for producing composite carbon material 1a may be, for example, a method in which activated carbon is heat treated in an inert atmosphere containing a hydrocarbon gas volatilized from the carbonaceous material precursor, and coated with the carbonaceous material in a gas phase. It may instead be a method in which the activated carbon and carbonaceous material precursor are pre-mixed and then heat treated, or the carbonaceous material precursor dissolved in a solvent is coated onto the activated carbon and dried, and then heat treated.

The weight ratio of the carbonaceous material with respect to the activated carbon in composite carbon material 1a is preferably 10 weight % to 100 weight % and more preferably 15 weight % to 80 weight %. If the weight ratio of the carbonaceous material is 10 weight % or greater, it will be possible to suitably fill the micropores of the activated carbon with the carbonaceous material, and the charge/discharge efficiency of lithium ions will be increased, thus resulting in less impairment of the high-load charge/discharge cycle characteristic. If the weight ratio of the carbonaceous material is no greater than 100 weight %, the pores in the composite carbon material 1a will be suitably conserved and a high specific surface area will be maintained. The lithium ion doping amount can therefore be increased, allowing high output density and high durability to be maintained even if the negative electrode is a thin-film.

(Composite Carbon Material 2)

In the present specification, composite carbon material 2 is a composite carbon material using at least one type of carbon material with a BET specific surface area of 0.5 m²/g to 80 m²/g as the base material. The base material of composite carbon material 2 is not particularly restricted so long as it has a BET specific surface area of 0.5 m²/g to 80 m²/g, and graphite materials, hard carbon, soft carbon, carbon black or the like may be suitably used.

The BET specific surface area of composite carbon material 2 is preferably 1 m²/g to 50 m²/g, more preferably 1.5 m²/g to 40 m²/g and even more preferably 2 m²/g to 25 m²/g. If the BET specific surface area of composite carbon material 2 is 1 m²/g or greater, it will be possible to ensure an adequately large number of reaction sites with lithium ions in the nonaqueous electrolytic solution, thereby allowing a high input/output characteristic to be exhibited. If the BET specific surface area of composite carbon material 2 is no greater than 50 m²/g, the lithium ion charge/discharge efficiency will be increased and decomposition reaction of the nonaqueous electrolytic solution during charge/discharge will be inhibited, thus allowing a high high-load charge/discharge cycle characteristic to be exhibited.

The mean particle diameter of composite carbon material 2 is preferably 1 μm to 10 μm, more preferably 2 μm to 8 μm and even more preferably 3 μm to 6 μm. If the mean particle diameter of composite carbon material 2 is 1 μm or larger it will be possible to increase the lithium ion charge/discharge efficiency, and to thus exhibit a high high-load charge/discharge cycle characteristic. If the mean particle diameter of composite carbon material 2 is no larger than 10 μm, the number of reaction sites between composite carbon material 2 and lithium ions in the nonaqueous electrolytic solution will increase, allowing a high input/output characteristic to be exhibited.

The weight ratio of the carbonaceous material with respect to the base material in composite carbon material 2 is preferably 1 weight % to 30 weight %, more preferably 1.2 weight % to 25 weight % and even more preferably 1.5 weight % to 20 weight %. If the weight ratio of the carbonaceous material is 1 weight % or greater, the number of reaction sites with lithium ion in the nonaqueous electrolytic solution can be adequately increased by the carbonaceous material, and desolvation of the lithium ion will be facilitated, thus allowing a high input/output characteristic to be exhibited. If the weight ratio of the carbonaceous material is no greater than 20 weight %, on the other hand, it will be possible to satisfactorily maintain solid diffusion of lithium ions between the carbonaceous material and base material, and therefore a high input/output characteristic can be exhibited. In addition, the lithium ion charge/discharge efficiency can be increased, and consequently a high high-load charge/discharge cycle characteristic can be exhibited.

The lithium ion doping amount per unit weight of composite carbon material 2 is preferably 50 mAh/g to 700 mAh/g, more preferably 70 mAh/g to 650 mAh/g, even more preferably 90 mAh/g to 600 mAh/g and yet more preferably 100 mAh/g to 550 mAh/g.

Doping lithium ion in the negative electrode will lower the potential of the negative electrode. Thus, when a negative electrode containing composite carbon material 2 doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the lithium ion doping amount per unit weight of composite carbon material 2 is 50 mAh/g or greater, lithium ion will be satisfactorily doped even at irreversible sites where lithium ion in the composite carbon material 2 cannot be desorbed after once being inserted, and therefore high energy density can be obtained. As the doping amount increases, the negative electrode potential decreases and the input/output characteristic, energy density and durability increase.

If the lithium ion doping amount per unit weight of the composite carbon material 2 is no greater than 700 mAh/g, side-effects of lithium metal deposition and the like will be less likely to occur.

Composite carbon material 2a using a graphite material as the base material will now be explained as a preferred example of composite carbon material 2a.

The BET specific surface area of composite carbon material 2a is preferably 1 m²/g to 50 m²/g, more preferably 1 m²/g to 20 m²/g and even more preferably 1 m²/g to 15 m²/g. If the BET specific surface area of composite carbon material 2a is 1 m²/g or greater, it will be possible to ensure an adequately large number of reaction sites with lithium ions in the nonaqueous electrolytic solution, thereby allowing a high input/output characteristic to be exhibited. If the BET specific surface area of composite carbon material 2a is no greater than 50 m²/g, the lithium ion charge/discharge efficiency will be increased and decomposition reaction of the nonaqueous electrolytic solution during charge/discharge will be inhibited, thus allowing a high high-load charge/discharge cycle characteristic to be exhibited.

The mean pore size of composite carbon material 2a is preferably 1.5 nm to 25 nm, more preferably 2 nm to 22 nm, even more preferably 3 nm to 20 nm and most preferably 3.5 nm to 18 nm. If the mean pore size of composite carbon material 2a is 1.5 nm or greater, there will be more pores with sizes larger than lithium ion solvated in the nonaqueous electrolytic solution (approximately 0.9 nm to 1.2 nm), and therefore diffusion of the solvated lithium ion in the composite carbon material 2a will be satisfactory, and a nonaqueous lithium power storage element using it can exhibit a high input/output characteristic. On the other hand, if the mean pore size of the composite carbon material is no larger than 25 nm, the bulk density of the negative electrode active material layer using it can be sufficiently increased, and therefore high energy density can be exhibited.

The mean particle diameter of composite carbon material 2a is preferably 1 μm to 10 μm, more preferably 2 μm to 8 μm and even more preferably 3 μm to 6 μm. If the mean particle diameter of composite carbon material 2a is 1 μm or larger it will be possible to increase the lithium ion charge/discharge efficiency, and to thus exhibit a high high-load charge/discharge cycle characteristic. If the mean particle diameter of composite carbon material 2a is no larger than 10 μm, the number of reaction sites with lithium ions in the nonaqueous electrolytic solution will increase, allowing a high input/output characteristic to be exhibited.

The weight ratio of the carbonaceous material with respect to the graphite material in composite carbon material 2a is preferably 1 weight % to 20 weight %, more preferably 1.2 weight % to 15 weight %, even more preferably 1.5 weight % to 10 weight % and most preferably 2 weight % to 5 weight %. If the weight ratio of the carbonaceous material is 1 weight % or greater, the number of reaction sites with lithium ion in the nonaqueous electrolytic solution can be adequately increased by the carbonaceous material, and desolvation of the lithium ion will be facilitated, thus allowing a high input/output characteristic to be exhibited. If the weight ratio of the carbonaceous material is no greater than 20 weight %, it will be possible to satisfactorily maintain solid diffusion of lithium ions between the carbonaceous material and graphite material, and therefore a high input/output characteristic can be exhibited. In addition, the lithium ion charge/discharge efficiency can be increased, and consequently a high high-load charge/discharge cycle characteristic can be exhibited.

The lithium ion doping amount per unit weight of composite carbon material 2a is preferably 50 mAh/g to 700 mAh/g, more preferably 70 mAh/g to 650 mAh/g, even more preferably 90 mAh/g to 600 mAh/g and yet more preferably 100 mAh/g to 550 mAh/g.

Doping lithium ion in the negative electrode will lower the potential of the negative electrode. Thus, when a negative electrode containing composite carbon material 2a doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the lithium ion doping amount per unit weight of composite carbon material 2a is 50 mAh/g or greater, lithium ion will be satisfactorily doped even at irreversible sites where lithium ion in the composite carbon material 2a cannot be desorbed after once being inserted, and therefore high energy density can be obtained. As the doping amount increases, the negative electrode potential decreases and the input/output characteristic, energy density and durability increase.

If the lithium ion doping amount per unit weight of the composite carbon material 2a is no greater than 700 mAh/g, side-effects of lithium metal deposition and the like will be less likely to occur.

The BET specific surface area of the graphite material used in composite carbon material 2a is preferably 0.5 m$^2$/g to 80 m$^2$/g, more preferably 1 m$^2$/g to 70 m$^2$/g and even more preferably 1.5 m$^2$/g to 60 m$^2$/g. If the BET specific surface area of the graphite material used in composite carbon material 2a is within this range, it will be possible to adjust the BET specific surface area of composite carbon material 2a to within the range specified above.

The mean particle diameter of the graphite material used in composite carbon material 2a is preferably 1 μm to 10 μm and more preferably 2 μm to 8 μm. If the mean particle diameter of the graphite material used in composite carbon material 2a is in the range of 1 μm to 10 μm, it will be possible to adjust the mean particle diameter of composite carbon material 2a to within the range specified above.

A carbonaceous material precursor to be used as a starting material for composite carbon material 2a is a solid, liquid or solvent-soluble organic material that allows the carbonaceous material to be composited with a graphite material by heat treatment. The carbonaceous material precursor may be, for example, pitch, mesocarbon microbeads, coke or a synthetic resin such as a phenol resin, for example. Among such carbonaceous material precursors, the use of inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

(Optional Components)

The negative electrode active material layer of this embodiment may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably 0 parts by weight to 30 parts by weight, more preferably 0 parts by weight to 20 parts by weight and even more preferably 0 parts by weight to 15 parts by weight, with respect to 100 parts by weight of the negative electrode active material.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 2 parts by weight to 27 parts by weight and even more preferably 3 parts by weight to 25 parts by weight, with respect to 100 parts by weight of the negative electrode active material. If the amount of binder used is 1 part by weight or greater, adequate electrode strength will be exhibited. If the amount of binder used is no greater than 30 parts by weight, a high input/output characteristic will be exhibited without inhibiting movement of lithium ions into the negative electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably 0 parts by weight to 10 parts by weight, with respect to 100 parts by weight of the negative electrode active material. If the amount of dispersion stabilizer used is no greater than 10 parts by weight, a high input/output characteristic will be exhibited without inhibiting movement of lithium ions into the negative electrode active material.

[Negative Electrode Power Collector]

The material composing the negative electrode power collector of this embodiment is preferably a metal foil with high electron conductivity, and with resistance to degradation by elution into the nonaqueous electrolytic solution or reaction with the electrolyte or ion. There are no particular restrictions on such metal foils, and examples include aluminum foils, copper foils, nickel foils and stainless steel foils. The negative electrode power collector in the nonaqueous lithium power storage element of this embodiment is preferably a copper foil.

The metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

Among these, the negative electrode power collector of this embodiment is preferably a metal foil without through-holes. Having no through-holes is cheaper in terms of production cost and facilitates thin-film formation, and can thus contribute to higher energy density, while also lowering the power collector resistance and allowing a high input/output characteristic to be obtained.

The thickness of the negative electrode power collector is not particularly restricted so long as it allows the shape and strength of the negative electrode to be maintained, but 1 to 100 μm, for example, is preferred. Incidentally, when the negative electrode power collector has through-holes or ruggedness, the thickness of the negative electrode power collector is measured based on the sections where no through-holes or ruggedness are present.

[Production of Negative Electrode]

The negative electrode comprises a negative electrode active material layer on one or both sides of a negative electrode power collector. Typically, the negative electrode active material layer is anchored to one or both sides of the negative electrode power collector.

The negative electrode can be produced by a known electrode production technique for lithium ion batteries or electrical double layer capacitors. For example, different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the film thickness or bulk density of the negative electrode active material layer. As an alternative method, various materials containing negative electrode active materials may also be dry-mixed without using a solvent, and the obtained mixture press-molded and then attached to a negative electrode power collector using a conductive adhesive.

The coating solution may also be prepared by dry blending all or a portion of each of the starting materials containing the negative electrode active material, and then adding water or an organic solvent, and/or a liquid or slurry-like substance comprising a binder or dispersion stabilizer dissolved or dispersed in them. The coating solution may also be prepared by adding various starting powders containing the negative electrode active material, to a liquid or slurry-like substance comprising a binder or dispersion stabilizer dissolved or dispersed in water or an organic solvent.

The method of dissolution or dispersion is not particularly restricted, and a disperser such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and reaggregation will be reduced.

The viscosity ($\eta$b) of the coating solution of the negative electrode is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta$b) of the coating solution of the negative electrode is 1,000 mPa·s or higher, liquid dripping during formation of the coating film will be suppressed, and the coating film width and thickness can be satisfactorily controlled. If the viscosity ($\eta$b) of the coating solution of the negative electrode is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution of the negative electrode is preferably 1.1 or greater, more preferably 1.2 or greater and even more preferably 1.5 or greater. If the TI value of the coating solution of the negative electrode is 1.1 or greater, it will be possible to satisfactorily control the coating film width and thickness.

The method of forming a coating film of the negative electrode is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater then stable coating will be possible, and if it is no greater than 100 m/min then coating precision can be adequately ensured.

The method of drying the coating film of the negative electrode is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the negative electrode power collector or negative electrode active material layer.

The method of pressing the negative electrode is not particularly restricted, and a pressing machine such as a hydraulic press or vacuum pressing machine may be suitably used. The film thickness, bulk density and electrode strength of the negative electrode active material layer can be adjusted by the pressing pressure, the gap, and the surface temperature of the pressed portion, as described below.

The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkling will be unlikely to occur in the negative electrode, and adjustment of the negative electrode active material layer to the desired film thickness and bulk density will be easier.

The gap between the press rolls may be set to a desired value depending on the film thickness of the dried negative electrode, so that the desired film thickness and bulk density of the negative electrode active material layer is obtained.

The pressing speed may also be set to the desired speed, so as to reduce distortion and wrinkling in the negative electrode. The surface temperature of the pressed portion may be room temperature, or it may be heated instead, if necessary.

In the case of heating, the lower limit for the surface temperature of the pressed portion is preferably at least the melting point of the binder −60° C., more preferably at least the melting point of the binder −45° C., and even more preferably at least the melting point of the binder −30° C. The upper limit for the surface temperature of the pressed portion in the case of heating is also preferably no higher than the melting point of the binder used +50° C., more preferably no higher than the melting point of the binder +30° C., and even more preferably no higher than the melting point of the binder +20° C. For example, when PVdF (polyvinylidene fluoride: melting point=150° C.) is used as the binder, heating of the surface of the pressed portion is to preferably between 90° C. and 200° C., more preferably between 105° C. and 180° C. and even more preferably between 120° C. and 170° C. When a styrene-butadiene copolymer (melting point=100° C.) is used as the binder, heating of the surface of the pressed portion is to preferably between 40° C. and 150° C., more preferably between 55° C. and 130° C. and even more preferably between 70° C. and 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The film thickness of the negative electrode active material layer is preferably 5 µm to 100 µm, for each side of the negative electrode power collector. The lower limit for the film thickness of the negative electrode active material layer is more preferably 7 µm or greater and even more preferably 10 µm or greater. The upper limit for the film thickness of the negative electrode active material layer is more preferably no greater than 80 µm and even more preferably no greater than 60 µm. If the film thickness of the negative electrode active material layer is 5 µm or greater, the coatability will be excellent with less tendency to produce streaks during coating of the negative electrode active material layer. If the film thickness of the negative electrode active material layer is no greater than 100 µm, high energy density can be exhibited, due to reduced volume of the nonaqueous lithium power storage element. The film thickness of the negative electrode active material layer, when the negative electrode power collector has through-holes or ruggedness, is the mean value of the film thickness of the negative electrode active material layer for each side at the sections of the negative electrode power collector without through-holes or ruggedness.

The bulk density of the negative electrode active material layer is preferably 0.30 g/cm³ to 1.8 g/cm³, more preferably 0.40 g/cm³ to 1.5 g/cm³ and even more preferably 0.45 g/cm³ to 1.3 g/cm³. If the bulk density of the negative electrode active material layer is 0.30 g/cm³ or greater, sufficient strength can be obtained and sufficient conductivity can be exhibited between the negative electrode active materials. If the bulk density of the negative electrode active material layer is 1.8 g/cm³ or lower, it will be possible to ensure pores through which the ions can be sufficiently diffused in the negative electrode active material layer.

The BET specific surface area per unit volume of the negative electrode active material layer is preferably 1 m²/cc to 50 m²/cc, more preferably 2 m²/cc to 40 m²/cc, even more preferably 3 m²/cc to 35 m²/cc, yet more preferably 4 m²/cc to 30 m²/cc and most preferably 5 m²/cc to 20 m²/cc.

If the BET specific surface area per unit volume of the negative electrode active material layer is 1 m²/cc or greater, the reaction sites between the lithium ions in the nonaqueous electrolytic solution and the negative electrode active material layer can be adequately increased per unit volume of the negative electrode active material layer, and therefore the nonaqueous lithium power storage element using it can exhibit a high input/output characteristic and high-load charge/discharge cycle characteristic. On the other hand, if the BET specific surface area per unit volume of the negative electrode active material layer is no greater than 50 m²/cc, excessive reductive decomposition of the nonaqueous electrolytic solution in the negative electrode active material layer can be suppressed, and therefore a nonaqueous lithium power storage element employing it can exhibit a high high-load charge/discharge cycle characteristic.

The mean pore size of the negative electrode active material layer is preferably 2 nm to 20 nm, more preferably 3 nm to 18 nm, even more preferably 3.5 nm to 16 nm and most preferably 4 nm to 15 nm.

If the mean pore size of the negative electrode active material layer is 2 nm or greater, there will be more pores in the negative electrode active material layer having sizes larger than lithium ion solvated in the nonaqueous electrolytic solution (approximately 0.9 nm to 1.2 nm), and therefore diffusion of the solvated lithium ion in the negative electrode active material layer will be satisfactory, and a nonaqueous lithium power storage element using it can exhibit a high input/output characteristic. On the other hand, if the mean pore size of the negative electrode active material layer is no larger than 20 nm, the bulk density of the negative electrode active material layer can be sufficiently increased, and therefore a nonaqueous lithium power storage element employing it can exhibit high energy density.

There are no particular restrictions on the methods for adjusting the BET specific surface area per unit volume of the negative electrode active material layer and the mean pore size of the negative electrode active material layer to within the ranges specified above for this embodiment, and they can be adjusted by the type of negative electrode active material in the negative electrode active material layer, or the types of conductive filler and binder, as well as their weight ratio in the negative electrode active material layer. For example, they can be adjusted by using a negative electrode active material or conductive filler having a BET specific surface area of 1 m²/g or greater and a mean pore size of 1.5 nm or greater, and using a binder having a linear structure such as PVdF (polyvinylidene fluoride) that can easily fill pores of 2 nm and smaller. They can also be adjusted by the coverage of the coating film or accumulation due to reductive decomposition of the nonaqueous electrolytic solution in the negative electrode active material layer, which is adjusted by the composition of the nonaqueous electrolytic solution and the production conditions for the nonaqueous lithium power storage element.

For the purpose of the present specification, the BET specific surface area per unit volume of the negative electrode active material layer, and the mean pore size of the negative electrode active material layer, can be calculated by the following methods.

The sample used for measurement may be the negative electrode before it is incorporated into the nonaqueous lithium power storage element (hereunder also referred to as "negative electrode before use"), or it may be the negative electrode incorporated in the nonaqueous lithium power storage element (hereunder also referred to as "negative electrode after use").

When the negative electrode incorporated in the nonaqueous lithium power storage element is to be used as the measuring sample, the following method, for example, is preferably used as pretreatment of the measuring sample.

First, the nonaqueous lithium power storage element is disassembled under an inert atmosphere such as argon, and the negative electrode is removed. The removed negative electrode is immersed in a linear carbonate (such as methyl ethyl carbonate or dimethyl carbonate), the nonaqueous electrolytic solution and lithium salt are removed and air-drying is carried out. Next, the following method (1), (2) or (3) is preferably used.

(1) The obtained negative electrode is immersed in a mixed solvent comprising methanol and isopropanol to inactivate the lithium ion intercalated in the negative electrode active material, and air-drying is carried out. Next, using vacuum drying or the like, the linear carbonate and organic solvent in the obtained negative electrode are removed to obtain a measuring sample.

(2) Using the obtained negative electrode as the working electrode and metal lithium as the counter electrode and reference electrode, they are immersed in the nonaqueous electrolytic solution under an inert atmosphere such as argon, to fabricate an electrochemical cell. A charger-discharger is used for adjustment of the obtained electrochemical cell, so that the negative electrode potential (vs. $Li/Li^+$) is in the range of 1.5 V to 3.5 V. Next, the negative electrode is removed from the electrochemical cell under an inert atmosphere such as argon and immersed in a linear carbonate to remove the nonaqueous electrolytic solution and lithium salt, and air-drying is carried out. Next, vacuum drying or the like is used to remove the linear carbonate in the obtained negative electrode, to obtain a measuring sample.

(3) The obtained negative electrode may be used directly as the measuring sample.

The volume $V_{ano}$ (cc) of the negative electrode active material layer of the measuring sample obtained as described above is measured, as shown in FIG. 1. The volume of the negative electrode active material layer can be calculated by $V_{ano}=S_{ano} \times t_{ano}$, where $S_{ano}$ is the geometric area of the flat section of the measuring sample, when the cross-section is on a horizontal plane with respect to the direction of lamination of the negative electrode power collector and negative electrode active material layer and the flat section is on a plane crossing perpendicular to the horizontal surface, and $t_{ano}$ is the total film thickness of the negative electrode active material layer.

Using the obtained measuring sample, the adsorption/desorption isotherm is measured with nitrogen or argon as the adsorbate. Using the obtained isotherm on the adsorption side, the BET specific surface area is calculated by the multipoint BET method or single point BET method, and divided by $V_{ano}$ to calculate the BET specific surface area per unit volume of the negative electrode active material layer. The mean pore size of the negative electrode active material layer is calculated by dividing the total pore volume calculated by the measurement described above, by the BET specific surface area.

The ratio $r_p/r_a$ of the mean distance between the centers of gravity of the voids obtained by SEM of a cross-section of the negative electrode active material layer $r_p$ and the mean particle diameter $r_a$ of the negative electrode active material is preferably 0.10 to 1.10, more preferably 0.20 to 1.00, even more preferably 0.25 to 0.80 and most preferably 0.30 to 0.60. If $r_p/r_a$ is 0.10 or greater, the sizes of the voids will be sufficiently large with respect to the negative electrode active material and a sufficient amount of nonaqueous electrolytic solution will be able to be retained in the voids surrounding the negative electrode active material, thereby allowing a nonaqueous lithium power storage element to be obtained that exhibits a high input/output characteristic and a high-load charge/discharge cycle characteristic. If $r_p/r_a$ is no greater than 1.10, the nonaqueous electrolytic solution will be suitably dispersed around the negative electrode active material, thereby allowing a nonaqueous lithium power storage element to be obtained that exhibits a high input/output characteristic and a high-load charge/discharge cycle characteristic.

The BET specific surface area, mesopore volume and micropore volume for this embodiment are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mean pore size is calculated by dividing the total pore volume per weight by the BET specific surface area, the mesopore volume is calculated by the BJH method, and the micropore volume is calculated by the MP method.

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

The MP method is a method in which the "t-plot method" (B. C. Lippens, J. H. de Boer, J. Catalysis, 4319(1965)) is utilized to determine micropore volume, micropore area and micropore distribution, and it is the method proposed by R. S. Mikhail, Brunauer and Bodor (R. S. Mikhail, S. Brunauer, E. E. Bodor, J. Colloid Interface Sci., 26, 45 (1968)).

The mean particle diameter for this embodiment is the particle diameter at the point where, when the particle size distribution is measured using a particle size distribution analyzer, and a cumulative curve with 100% as the total volume is determined, the cumulative curve is at 50% (that is, the 50% diameter (median diameter)). The mean particle diameter can be measured using a commercially available laser diffraction particle size distribution analyzer.

The doping amount of lithium ion in the negative electrode active material (mAh/g) of the nonaqueous lithium power storage element, during shipping and after use, according to this embodiment, can be determined in the following manner, for example.

First, after washing the negative electrode active material layer of this embodiment with ethyl methyl carbonate or dimethyl carbonate and air-drying it, it is extracted with a mixed solvent comprising methanol and isopropanol, to obtain the extract and the extracted negative electrode active material layer. The extraction will typically be carried out in an Ar box at an environmental temperature of 23° C.

The lithium amounts in the extract obtained in this manner and the extracted negative electrode active material layer are each quantified using ICP-MS (Inductively Coupled Plasma-Mass Spectrometry), for example, and the total is calculated to determine the lithium ion doping amount in the negative electrode active material. The obtained value may be compared to the amount of negative electrode active material supplied for extraction, to calculate the lithium ion doping amount (mAh/g).

The primary particle diameter according to this embodiment can be obtained by a method in which the powder is photographed with an electron microscope in several visual fields, the particle diameters are calculated for 2,000 to 3,000 particles in the visual fields using a fully automatic image processing device, and the value of the arithmetic mean is recorded as the primary particle diameter.

The degree of dispersion for this embodiment is the value determined based on a dispersion evaluation test using a fineness gauge conforming to JIS K5600. Specifically, a sufficient amount of sample is allowed to flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 30° within 3 seconds after the pulling has ended, and the depth at which particles appear in the groove of the fineness gauge is read off.

The viscosity (ηb) and TI value for this embodiment are the values determined by the following respective methods. First, an E-type viscometer is used to determine the viscosity (ηa) stabilized after measurement for 2 minutes or longer under conditions with a temperature of 25° C. and a shear rate of 2 s$^{-1}$. Next, the viscosity (ηb) is determined as measured under the same conditions except for changing the shear rate to 20 s$^{-1}$. The viscosity values as obtained above are used to calculate the TI value as: TI value=ηa/ηb. When increasing the shear rate from 2 s$^{-1}$ to 20 s$^{-1}$, it may be increased in a single stage, or the shear rate may be increased in stages within the range specified above, while appropriately determining the viscosity at each shear rate.

<Nonaqueous Electrolytic Solution>

The electrolytic solution for this embodiment is a lithium ion-containing nonaqueous electrolytic solution. Specifically, the nonaqueous electrolytic solution contains a nonaqueous solvent as described below. The nonaqueous electrolytic solution preferably comprises a lithium salt at a concentration of 0.5 mol/L or greater based on the total volume of the nonaqueous electrolytic solution. That is, the nonaqueous electrolytic solution contains lithium ion as an electrolyte.

Examples of lithium salts include (LiN(SO$_2$F)$_2$), LiN(SO$_2$CF$_3$)$_2$, LiN(SO$_2$C$_2$F$_5$)$_2$, LiN(SO$_2$CF$_3$)(SO$_2$C$_2$F$_5$), LiN(SO$_2$CF$_3$)(SO$_2$C$_2$F$_4$H), LiC(SO$_2$F)$_3$, LiC(SO$_2$CF$_3$)$_3$, LiC(SO$_2$C$_2$F$_5$)$_3$, LiCF$_3$SO$_3$, LiC$_4$F$_9$SO$_3$, LiPF$_6$ and LiBF$_4$, which may be used alone or in mixtures of two more. The lithium salt also preferably contains LiPF$_6$ and/or LiN(SO$_2$F)$_2$, since these will allow high conductivity to be exhibited.

The lithium salt concentration in the nonaqueous electrolytic solution is preferably 0.5 mol/L or greater, and more preferably in the range of 0.5 to 2.0 mol/L. If the lithium salt concentration is 0.5 mol/L or greater, anions will be sufficiently present to allow sufficiently high capacitance of the nonaqueous lithium power storage element. The lithium salt concentration is preferably no higher than 2.0 mol/L, because this can prevent precipitation of the undissolved lithium salt in the nonaqueous electrolytic solution and prevent the viscosity of the nonaqueous electrolytic solution from becoming too high, and will help avoid lowering of the conductivity or reduction in the output characteristic as well.

The nonaqueous electrolytic solution of this embodiment preferably comprises a cyclic carbonate and linear carbonate as nonaqueous solvents. If the nonaqueous electrolytic solution comprises a cyclic carbonate and a linear carbonate, this is advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, methyl ethyl carbonate, dipropyl carbonate and dibutyl carbonate. A dialkyl carbonate compound will typically be unsubstituted.

The total content of the cyclic carbonate and linear carbonate is preferably 50 weight % or greater and more preferably 65 weight % or greater, and preferably no greater than 95 weight % and more preferably no greater than 90 weight %, based on the total weight of the nonaqueous electrolytic solution. If the total content of the cyclic carbonate and linear carbonate is 50 weight % or greater it will be possible to dissolve the desired concentration of lithium salt, allowing high lithium ion conductivity to be exhibited. If the total concentration of the cyclic carbonate and linear carbonate is no greater than 95 weight %, the nonaqueous electrolytic solution will be able to further comprise the additives mentioned below.

The nonaqueous electrolytic solution of this embodiment may also further comprise additives. The additives are not particularly restricted, and for example, they include sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

Examples of sultone compounds include sultone compounds represented by the following formulas (5) to (7). Such sultone compounds can be used alone or in mixtures of two or more.

[Chem. 7]

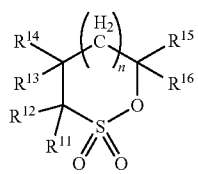

(5)

{In formula (5), R$^{11}$ to R$^{16}$ represent hydrogen atoms, halogen atoms, alkyl groups of 1 to 12 carbon atoms or halogenated alkyl groups of 1 to 12 carbon atoms, and may be the same or different; and n is an integer of 0 to 3.}

[Chem. 8]

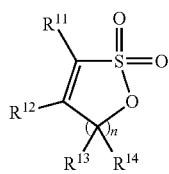

(6)

{In formula (6), R$^{11}$ to R$^{14}$ represent hydrogen atoms, halogen atoms, alkyl groups of 1 to 12 carbon atoms or halogenated alkyl groups of 1 to 12 carbon atoms, and may be the same or different; and n is an integer of 0 to 3.}

[Chem. 9]

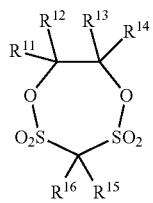

(7)

{In formula (7), R$^{11}$ to R$^{16}$ represent hydrogen atoms, halogen atoms, alkyl groups of 1 to 12 carbon atoms or halogenated alkyl groups of 1 to 12 carbon atoms, and may be the same or different.}

For this embodiment, from the viewpoint of minimal adverse effect on resistance, and reducing decomposition of the nonaqueous electrolytic solution at high temperature to minimize gas generation, sultone compounds represented by formula (5) are preferably 1,3-propanesultone, 2,4-butanesultone, 1,4-butanesultone, 1,3-butanesultone and 2,4-pentanesultone; sultone compounds represented by formula (6) are preferably 1,3-propenesultone and 1,4-butenesultone; sultone compounds represented by formula (7) are preferably 1,5,2,4-dioxadithiepane 2,2,4,4-tetraoxide; and other sultone compounds are preferably methylenebis(benzenesulfonic acid), methylenebis(phenylmethanesulfonic acid), methylenebis(ethanesulfonic acid), methylenebis(2,4,6, trimethylbenzenesulfonic acid) and methylenebis(2-trifluoromethylbenzenesulfonic acid), with one or more selected from among these groups being preferred.

The total content of sultone compounds in the nonaqueous electrolytic solution of the nonaqueous lithium power storage element of this embodiment is preferably 0.5 weight % to 15 weight %, based on the total weight of the nonaqueous electrolytic solution. If the total content of sultone compounds in the nonaqueous electrolytic solution is 0.5 weight % or greater, it will be possible to suppress decomposition of the nonaqueous electrolytic solution at high temperature and to reduce gas generation. If the total content of sultone compounds is no greater than 15 weight %, on the other hand, it will be possible to lower the ionic conductance of the nonaqueous electrolytic solution, and to maintain a high input/output characteristic. The total content of sultone compounds in the nonaqueous electrolytic solution of the nonaqueous lithium power storage element is preferably 1 weight % to 10 weight % and more preferably 3 weight % to 8 weight %, from the viewpoint of obtaining both a high input/output characteristic and high durability.

Examples of cyclic phosphazenes include ethoxypentafluorocyclotriphosphazene, diethoxytetrafluorocyclotriphosphazene and phenoxypentafluorocyclotriphosphazene, and preferably one or more selected from these groups is used.

The content of the cyclic phosphazene in the nonaqueous electrolytic solution is preferably 0.5 weight % to 20 weight % based on the total weight of the nonaqueous electrolytic solution. If the cyclic phosphazene content is 0.5 weight % or greater, it will be possible to minimize decomposition of the nonaqueous electrolytic solution at high temperature and to reduce gas generation. If the cyclic phosphazene content is no greater than 20 weight %, it will be possible to lower the ionic conductance of the nonaqueous electrolytic solution, and to maintain a high input/output characteristic. For these reasons, the cyclic phosphazene content is preferably 2 weight % to 15 weight % and more preferably 4 weight % to 12 weight %.

These cyclic phosphazenes may be used alone, or two or more may be used in admixture.

Examples of acyclic fluoroethers include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, among which $HCF_2CF_2OCH_2CF_2CF_2H$ is preferred from the viewpoint of electrochemical stability.

The content of the acyclic fluoroether is preferably 0.5 weight % to 15 weight %, and more preferably 1 weight % to 10 weight %, based on the total weight of the nonaqueous electrolytic solution. If the acyclic fluoroether content is 0.5 weight % or higher, the stability of the nonaqueous electrolytic solution against oxidative decomposition will be increased and a nonaqueous lithium power storage element with high durability during high temperature will be obtained. If the acyclic fluoroether content is 15 weight % or lower, on the other hand, the electrolyte salt solubility will be kept satisfactory and high ionic conductance of the nonaqueous electrolytic solution will be maintained, thus allowing a high input/output characteristic to be exhibited.

The acyclic fluoroether used may be a single type or a mixture of two or more types.

A fluorinated cyclic carbonate is preferably at least one selected from the group consisting of fluoroethylene carbonate (FEC) and difluoroethylene carbonate (dFEC), from the viewpoint of compatibility with other nonaqueous solvents.

The content of the fluorinated cyclic carbonate is preferably 0.5 weight % to 10 weight %, and more preferably 1 weight % to 5 weight %, with respect to the total weight of the nonaqueous electrolytic solution. If the fluorinated cyclic carbonate is 0.5 weight % or higher, it will be possible to form a satisfactory coating film on the negative electrode, and reductive decomposition of the nonaqueous electrolytic solution on the negative electrode will be minimized, to obtain a nonaqueous lithium power storage element with high durability at high temperature. If the fluorinated cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

A fluorinated cyclic carbonate may be used alone, or two or more may be used as a mixture.

The cyclic carbonate is preferably vinylene carbonate. The cyclic carbonate content is preferably 0.5 weight % to 10 weight % and more preferably 1 weight % to 5 weight %, with respect to the total weight of the nonaqueous electrolytic solution. If the cyclic carbonate content is 0.5 weight % or higher, it will be possible to form a satisfactory coating film on the negative electrode, and reductive decomposition of the nonaqueous electrolytic solution on the negative electrode will be suppressed, to obtain a nonaqueous lithium power storage element with high durability at high temperature. If the cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic due to improved lithium ion dissociation.

The cyclic carboxylate content is preferably 0.5 weight % to 15 weight % and more preferably 1 weight % to 5 weight %, with respect to the total weight of the nonaqueous electrolytic solution. If the cyclic carboxylate content is 0.5 weight % or higher, it will be possible to form a satisfactory coating film on the negative electrode, and reductive decomposition of the nonaqueous electrolytic solution on the negative electrode will be suppressed, to obtain a nonaqueous lithium power storage element with high durability at high temperature. If the cyclic carboxylate content is 5 weight % or lower, the electrolyte salt solubility will be kept satisfactory and high ionic conductance of the nonaqueous electrolytic solution will be maintained, thus allowing a high input/output characteristic to be exhibited.

A cyclic carboxylate may be used alone, or two or more may be used in admixture.

The cyclic acid anhydride is preferably one or more selected from the group consisting of succinic anhydride, maleic anhydride, citraconic anhydride and itaconic anhydride. Selection is most preferably made from succinic anhydride and maleic anhydride, from the viewpoint of ready industrial availability to reduce production cost of the nonaqueous electrolytic solution, and from the viewpoint of easier dissolution in the nonaqueous electrolytic solution.

The content of the cyclic acid anhydride is preferably 0.5 weight % to 15 weight %, and more preferably 1 weight % to 10 weight %, with respect to the total weight of the nonaqueous electrolytic solution. If the cyclic acid anhydride content is 0.5 weight % or higher, it will be possible to form a satisfactory coating film on the negative electrode, and reductive decomposition of the nonaqueous electrolytic solution on the negative electrode will be suppressed, to obtain a nonaqueous lithium power storage element with high durability during periods of high temperature. If the cyclic acid anhydride content is 10 weight % or lower, the electrolyte salt solubility will be kept satisfactory and high ionic conductance of the nonaqueous electrolytic solution will be maintained, thus allowing a high input/output characteristic to be exhibited.

These cyclic acid anhydrides may be used alone, or two or more may be used in admixture.

<Separator>

The positive electrode precursor and negative electrode will usually be laminated or wound via a separator, to form an electrode laminated body or wound electrode comprising a positive electrode precursor, negative electrode and separator.

The separator used may be a polyethylene microporous film or polypropylene microporous film used in lithium ion secondary batteries, or a cellulose nonwoven sheet used in electrical double layer capacitors. A film composed of organic or inorganic microparticles may also be laminated on one or both sides of these separators. Organic or inorganic microparticles may also be included inside a separator.

The thickness of the separator is preferably 5 μm to 35 μm. The thickness of the separator is preferably 5 μm or greater, as this will tend to reduce self-discharge due to internal microshorts. The thickness of the separator is also preferably no greater than 35 μm, as this will tend to result in a higher input/output characteristic of the nonaqueous lithium power storage element.

The thickness of a film composed of organic or inorganic microparticles is preferably 1 μm to 10 μm. The thickness of a film composed of organic or inorganic microparticles is preferably 1 μm or greater, as this will tend to reduce self-discharge due to internal microshorts. The thickness of a film composed of organic or inorganic microparticles is also preferably no greater than 10 μm, as this will tend to result in a higher output characteristic of the nonaqueous lithium power storage element.

<Production of Nonaqueous Lithium Power Storage Element>

The nonaqueous lithium power storage element of this embodiment is typically constructed with an electrode laminated body or wound electrode, as described below, housed in a casing together with a nonaqueous electrolytic solution.

With the nonaqueous lithium power storage element of the invention, a plurality of nonaqueous lithium power storage elements may be connected in series or in parallel to create a power storage module, for example. The nonaqueous lithium power storage element and power storage module of the invention may be suitably utilized in a power regenerating system of an automobile hybrid drive system, a power load-leveling system for natural power generation such as solar power generation or wind power generation, or in a microgrid, an uninterruptable power source system for factory production equipment or the like, a non-contact power supply system designed for leveling of voltage fluctuation in microwave power transmission or electrolytic resonance, or energy storage, or an energy harvesting system designed for utilization of electric power generated by vibration or the like, which are purposes that require a high-load charge/discharge cycle characteristic.

The nonaqueous lithium power storage element of the invention is preferably applied in a lithium ion capacitor or lithium ion secondary battery, for example, where the effect of the invention will be maximally exhibited.

[Assembly]

In the assembly step, for example, a positive electrode terminal and negative electrode terminal are connected to a laminated body formed by laminating a positive electrode precursor and negative electrode cut into the shape of a sheet, via a separator, to fabricate an electrode laminated body. Alternatively, a positive electrode terminal and negative electrode terminal are connected to a wound body formed by laminating or winding a positive electrode precursor and negative electrode via a separator, to fabricate a wound electrode. The shape of the wound electrode may be cylindrical or flat.

The method of connecting the positive electrode terminal and negative electrode terminal is not particularly restricted, and it may be carried out by a method such as resistance welding or ultrasonic welding.

[Casing]

The casing used may be a metal can or laminated package. A metal can is preferably made of aluminum. The laminated package is preferably a laminated film of a metal foil and a resin film, an example of which is a laminated package comprising a three-layer structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the nonaqueous electrolytic solution housed inside while also providing a melt seal during heat sealing of the casing, and a polyolefin or acid-modified polyolefin may be suitably used.

[Housing in Casing]

The dried electrode laminated body or wound electrode is preferably stored in a casing, which is typically a metal can or laminated package, and sealed, leaving only one of the openings. The method of sealing the casing is not particularly restricted, but when using a laminated package, a method such as heat sealing or impulse sealing may be employed.

[Drying]

The electrode laminated body or wound electrode housed in the casing is preferably dried to remove the residual solvent. The drying method is not restricted, and drying may be carried out by vacuum drying or the like. The residual solvent is preferably no greater than 1.5 weight % based on the weight of the positive electrode active material layer or negative electrode active material layer. It is not preferred if the residual solvent is greater than 1.5 weight %, because the solvent will remain in the system and may impair the self-discharge property or cycle characteristic.

[Filling, Impregnation and Sealing Step]

Upon completion of the assembly step, the electrode laminated body or wound electrode housed in the casing is filled with a nonaqueous electrolytic solution. After filling, impregnation is again carried out and the positive electrode, negative electrode and separator are preferably thoroughly wetted with the nonaqueous electrolytic solution. If the nonaqueous electrolytic solution has not wetted at least a portion of the positive electrode precursor, negative electrode and separator, then in the lithium doping step described below, lithium doping will proceed in a non-uniform manner, resulting in increased resistance or lower durability of the obtained nonaqueous lithium power storage element. The method of impregnation is not particularly restricted, and for example, the method used may be setting the filled electrode laminated body or wound electrode in a pressure reduction chamber with the casing in an opened state, using a vacuum pump to bring the interior of the chamber to a reduced pressure state, and then restoring it to atmospheric pressure. After impregnation, the electrode laminated body or wound electrode having the casing in an open state may be closed by sealing under reduced pressure.

[Lithium Doping Step]

In the lithium doping step, preferably a voltage is applied between the positive electrode precursor and the negative electrode, thereby decomposing the lithium compound in the positive electrode precursor and releasing lithium ions, and reducing the lithium ions at the negative electrode so that the negative electrode active material layer is predoped with lithium ions.

During the lithium doping step, gas such as $CO_2$ is generated with oxidative decomposition of the lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

[Aging Step]

After the lithium doping step, the electrode laminated body or wound electrode is preferably aged. In the aging step, the solvent in the nonaqueous electrolytic solution is decomposed at the negative electrode, and a lithium ion-permeable solid polymer coating film is formed on the negative electrode surface.

The method of aging is not particularly restricted, and for example, a method of reacting the solvent in the nonaqueous electrolytic solution in a high-temperature environment may be used.

[Degassing Step]

After the aging step, preferably degassing is further carried out to reliably remove the gas remaining in the nonaqueous electrolytic solution, positive electrode and negative electrode. Any gas remaining in at least portions of the nonaqueous electrolytic solution, positive electrode and negative electrode will interfere with ion conduction, thus increasing the resistance of the obtained nonaqueous lithium power storage element.

The method of degassing is not particularly restricted, and for example, the method used may be setting the electrode laminated body or wound electrode in a pressure reduction chamber with the casing in an opened state, and using a vacuum pump to bring the interior of the chamber to a reduced pressure state. After degassing, the casing may be sealed to close the casing, and fabricate a nonaqueous lithium power storage element.

<Evaluation of Properties of Nonaqueous Lithium Power Storage Elements>

[Electrostatic Capacitance]

Throughout the present specification, the electrostatic capacitance F (F) is the value obtained by the following method.

First, in a thermostatic bath set to 25° C., the nonaqueous lithium power storage element is subjected to constant-current charge at the 2 C current value until 3.8 V is reached, and then constant-voltage charge is carried out for 30 minutes with application of a constant voltage of 3.8 V. Next, the capacitance after constant-current discharge to 2.2 V at the 2 C current value is recorded as Q. The obtained value of Q is used to determine the value calculated by F=Q/(3.8−2.2), as the electrostatic capacitance F (F).

[Electrical Energy]

Throughout the present specification, the electrical energy E (Wh) is the value obtained by the following method.

The value calculated by $F \times (3.8^2 - 2.2^2)/2/3600$, using the electrostatic capacitance F (F) calculated by the method described above, is the electrical energy E (Wh).

[Volume]

The volume of the nonaqueous lithium power storage element is the volume of the portion of the electrode laminated body or wound electrode in which the region where the positive electrode active material layer and negative electrode active material layer are stacked is housed by the casing.

For example, in the case of an electrode laminated body or wound electrode housed by a laminated film, typically the region of the electrode laminated body or wound electrode where the positive electrode active material layer and negative electrode active material layer are present is housed in a cup-shaped laminated film. The volume ($V_1$) of the nonaqueous lithium power storage element is calculated by $V_1 = l_1 \times w_1 \times t_1$, using the outer length ($l_1$) and outer width ($w_1$) of the cup-shaped section, and the thickness ($t_1$) of the nonaqueous lithium power storage element including the laminated film.

In the case of an electrode laminated body or wound electrode housed in a rectilinear metal can, the volume of the outer dimensions of the metal can are simply used as the volume of the nonaqueous lithium power storage element. That is, the volume ($V_2$) of the nonaqueous lithium power storage element is calculated by $V_2 = l_2 \times w_2 \times t_2$, based on the outer length ($l_2$) and outer width ($w_2$), and outer thickness ($t_2$), of the rectilinear metal can.

Even in the case of a wound electrode housed in a cylindrical metal can, the volume of the outer dimensions of the metal can is used as the volume of the nonaqueous lithium power storage element. That is, the volume ($V_3$) of the nonaqueous lithium power storage element is calculated by $V_3 = 3.14 \times r \times r \times l_3$, using the outer radius (r) and outer length ($l_3$) of the bottom face or top face of the cylindrical metal can.

[Energy Density]

Throughout the present specification, the energy density is the value obtained by the formula $E/V_i$ (Wh/L), using the charge E and volume $V_i$ (i=1, 2, 3) of the nonaqueous lithium power storage element.

$E/V_i$ is preferably 15 or greater from the viewpoint of exhibiting sufficient charge capacity and service capacity. It is preferred if $E/V_i$ is 15 or greater, because it will be possible to obtain a nonaqueous lithium power storage element with excellent volume energy density, and therefore when a power storage system using the nonaqueous lithium power storage element is used in combination with an automobile engine, for example, the power storage system can be installed in the narrow limited space inside the automobile. The upper limit for $E/V_i$ is preferably no greater than 50.

[Internal Resistance]

Throughout the present specification, the internal resistance Ra (Ω) is the value obtained by the following method.

First, in a thermostatic bath set to 25° C., the nonaqueous lithium power storage element is subjected to constant-current charge at the 20 C current value until 3.8 V is reached, and then constant-voltage charge is carried out for 30 minutes with application of a constant voltage of 3.8 V. Next, constant-current discharge is carried out to 2.2 V with the 20 C current value, to obtain a discharge curve (time-voltage). From the discharge curve, with a voltage of $E_o$ at discharge time=0 seconds, obtained by extrapolating by linear approximation from the voltage values at discharge times of 2 seconds and 4 seconds, the value calculated from voltage drop $\Delta E=3.8-E_o$ and Ra=$\Delta E$/(20 C (current value A)) is the internal resistance Ra (Ω).

Ra·F is preferably no greater than 3.0, more preferably no greater than 2.5 and even more preferably no greater than 2.2, from the viewpoint of exhibiting sufficient charge capacity and service capacity for high current. If Ra·F is no greater than 3.0, it will be possible to obtain a nonaqueous lithium power storage element having an excellent input/output characteristic. This is therefore preferred since, by combining a power storage system using the nonaqueous lithium power storage element with a high efficiency engine, for example, it will be possible to adequately withstand the high load applied to the nonaqueous lithium power storage element. The lower limit for Ra·F is preferably 0.3 or greater.

[High-Load Charge/Discharge Cycle Test]

For the present specification, the resistance increase rate after a high-load charge/discharge cycling test is measured by the following method.

First, the nonaqueous lithium power storage element is subjected to constant-current charge in a thermostatic bath set to 25° C., until reaching 3.8 V at the 300 C current value, and then constant-current discharge is carried out until reaching 2.2 V at the 300 C current value. High-load charge/discharge cycling is repeated 60,000 times, and the internal resistance is measured by the same method as for the internal resistance Ra (Ω) described above, before start of the test and after completion of the test, recording the internal resistance before start of the test as Ra (Ω), and the internal resistance after completion of the test as Rb (Ω). The resistance increase rate after the high-load charge/discharge cycle test with respect to before start of the test is calculated as Rb/Ra.

The resistance increase rate Rb/Ra after the high-load charge/discharge cycle test is preferably no greater than 2.0, more preferably no greater than 1.5 and even more preferably no greater than 1.2. If the resistance increase rate after the high-load charge/discharge cycle test is no greater than 2.0, the properties of the nonaqueous lithium power storage element will be maintained even with repeated charge/discharge. Consequently, it will be possible to stably obtain an excellent input/output characteristic for long periods, thus helping to prolong the usable life of the nonaqueous lithium power storage element. The lower limit for Rb/Ra is preferably 0.9 or greater.

EXAMPLES

Embodiments of the invention will now be explained in detail by examples and comparative examples, with the understanding that these examples and comparative examples are not limitative in any way on the invention.

Example 1

[Preparation of Activated Carbon]
[Activated Carbon 1]

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 1.

A laser diffraction particle size distribution analyzer (SALD-2000J) by Shimadzu Corp. was used to measure the mean particle diameter of the activated carbon 1, which was found to be 4.2 μm. Also, as a result of measuring the pore distribution of activated carbon 1 using a pore distribution measuring apparatus by Yuasa Ionics Co., Ltd. (AUTOSORB-1 AS-1-MP), the BET specific surface area was 2,360 m$^2$/g, the mesopore volume ($V_1$) was 0.52 cc/g, the micropore volume ($V_2$) was 0.88 cc/g and $V_1/V_2$=0.59.

[Activated Carbon 2]

A phenol resin was placed in a firing furnace and subjected to carbonization at 600° C. for 2 hours under a nitrogen atmosphere, and was then pulverized with a ball mill and sorted, to obtain a carbide having a mean particle diameter of 7.0 μm. The obtained carbide was mixed with KOH at a weight ratio of 1:5, and the mixture was placed in a firing furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2.

A laser diffraction particle size distribution analyzer (SALD-2000J) by Shimadzu Corp. was used to measure the mean particle diameter of the activated carbon 2, which was found to be 7.1 μm. Also, as a result of measuring the pore distribution of activated carbon 2 using a pore distribution measuring apparatus by Yuasa Ionics Co., Ltd. (AUTOSORB-1 AS-1-MP), the BET specific surface area was 3,627 m$^2$/g, the mesopore volume ($V_1$) was 1.50 cc/g, the micropore volume ($V_2$) was 2.28 cc/g and $V_1/V_2$=0.66.

[Activated Carbon 3]

A phenol resin was placed in a firing furnace and subjected to carbonization at 600° C. for 2 hours under a nitrogen atmosphere, and was then pulverized with a ball mill and sorted, to obtain a carbide having a mean particle diameter of 17.0 m. The obtained carbide was mixed with KOH at a weight ratio of 1:5, and the mixture was placed in a firing furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 3.

A laser diffraction particle size distribution analyzer (SALD-2000J) by Shimadzu Corp. was used to measure the mean particle diameter of the activated carbon 3, which was found to be 17.0 μm. Also, as a result of measuring the pore distribution of activated carbon 2 using a pore distribution measuring apparatus by Yuasa Ionics Co., Ltd. (AUTOSORB-1 AS-1-MP), the BET specific surface area was 3,111 m$^2$/g, the mesopore volume ($V_1$) was 1.24 cc/g, the micropore volume ($V_2$) was 2.02 cc/g and $V_1/V_2$=0.62.

[Preparation of Positive Electrode Precursor]

Activated carbon 1 obtained above was used as the positive electrode active material to produce a positive electrode precursor.

After mixing 42.5 parts by weight of activated carbon 1, 45.0 parts by weight of lithium carbonate having a mean particle diameter of 2.0 μm, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,700 mPa·s and the TI value was 3.5. The degree of dispersion of the obtained coating solution was measured using a fineness gauge by Yoshimitsu Seiki Co. Ltd. As a result, the granularity was 35 μm. The coating solution was coated onto one or both sides of an aluminum foil with a thickness of 15 μm and without through-holes, using a die coater by Toray Engineering Co., Ltd. under conditions with a coating speed of 1 m/s, and dried at a drying temperature of 100° C. to obtain a positive electrode precursor (hereunder also referred to as "single-sided positive electrode precursor" and "double-sided positive electrode precursor", respectively). The obtained positive electrode precursor was pressed using a roll press under conditions with a pressure of 4 kN/cm and a pressed portion surface temperature of 25° C.

[Preparation of Negative Electrode]
[Preparation Example for Negative Electrode 1]

A 150 g portion of commercially available coconut shell activated carbon having a mean particle diameter of 3.0 μm and a BET specific surface area of 1,780 m$^2$/g was placed into a stainless steel mesh basket and set on a stainless steel vat containing 270 g of coal pitch 1 (softening point: 50° C.), both were set in an electric furnace (furnace inner usable dimension: 300 mm×300 mm×300 mm), and thermal reaction was carried out to obtain composite carbon material 1. The heat treatment was carried out under a nitrogen atmosphere, with temperature increase to 600° C. over a period of 8 hours, and 4 hours of holding at the same temperature. This was followed by natural cooling to 60° C., after which the composite carbon material 1 was removed out of the furnace.

The mean particle diameter and BET specific surface area of the obtained composite carbon material 1 were measured by the same methods as described above. As a result, the mean particle diameter was 3.2 μm and the BET specific surface area was 262 m$^2$/g. The weight ratio of coal pitch-derived carbonaceous material with respect to activated carbon was 78%.

Composite carbon material 1 was then used as a negative electrode active material to produce a negative electrode.

After mixing 85 parts by weight of composite carbon material 1, 10 parts by weight of acetylene black, 5 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm and without through-holes, using a die coater by Toray Engineering Co., Ltd. under conditions with a coating speed of 1 m/s, and dried at a drying temperature of 85° C. to obtain negative electrode 1 (hereunder also referred to as "double-sided negative electrode"). The obtained negative electrode 1 was pressed using a roll press under conditions with a pressure of 4 kN/cm and a pressed portion surface temperature of 25° C. The film thickness of the negative electrode active material layer of the obtained negative electrode 1 was measured at 10 arbitrary locations of negative electrode 1, using a Linear Gauge Sensor GS-551 by Ono Sokki Co., Ltd. The thickness of the copper foil was subtracted from the mean value of the measured film thickness, to determine the film thickness of the negative electrode active material layer of negative electrode 1. The film thickness of the negative electrode active material layers of negative electrode 1 was 40 μm per side.

[Preparation Example for Negative Electrodes 2 and 3]

Negative electrode active materials were prepared and evaluated in the same manner as the preparation example for negative electrode 1, except that the preparation was with the base materials and their parts by weight, the coal-based pitches and their parts by weight, and the heat treatment temperatures shown in Table 1. Also, negative electrodes were prepared and evaluated in the same manner as the preparation example for negative electrode 1, except that preparation was using the negative electrode active materials obtained as described above, with the coating solutions listed in Table 1. The results are shown in Table 1.

TABLE 1

| | | Negative electrode active material | | | | | | |
|---|---|---|---|---|---|---|---|---|
| | | Starting material | | Heat | Weight ratio of | | BET |
| | | Base material | | Pitch 1 | treatment | carbona- | Mean | specific |
| Name | | Type | Amount (parts by weight) | Amount (parts by weight) | temperature (° C.) | ceous material (%) | particle diameter (μm) | surface area (m²/g) |
| Negative electrode 1 | Composite carbon material 1 | Coconut shell activated carbon | 150 | 270 | 600 | 78 | 3.2 | 262 |
| Negative electrode 2 | Composite carbon material 2 | Carbon nano-particles | 150 | 150 | 1000 | 32 | 6.8 | 303 |
| Negative electrode 3 | Composite carbon material 3 | Artificial graphite 1 | 150 | 15 | 1000 | 2 | 4.9 | 6.1 |

| | Coating solution | | | | | Negative electrode active |
|---|---|---|---|---|---|---|
| | Solid content (parts by weight) | | | | | |
| | Negative electrode active material | Acetylene black | PVdF | Property Viscosity ηb (mp · s) | Adjusted TI value | material layer film thickness per one side (μm) |
| Negative electrode 1 | 85 | 10 | 5 | 2,789 | 4.3 | 40 |
| Negative electrode 2 | 80 | 2 | 18 | 2,456 | 3.6 | 40 |
| Negative electrode 3 | 80 | 8 | 12 | 2,798 | 2.7 | 25 |

The starting materials in Table 1 are the following.
Coconut shell activated carbon: mean particle diameter=3.0 μm, BET specific surface area=1,780 m²/g
Carbon nanoparticles: mean particle diameter=5.2 μm, BET specific surface area=859 m²/g, primary particle size=20 nm
Artificial graphite 1: mean particle diameter=4.8 μm, BET specific surface area=3.1 m²/g
Pitch 1: coal-based pitch with softening point of 50° C.

[Preparation of Nonaqueous Electrolytic Solution]

As an organic solvent there was used a mixed solvent of ethylene carbonate (EC):methyl ethyl carbonate (EMC)=33:67 (volume ratio), each electrolyte salt was dissolved so that the concentration ratio of $LiN(SO_2F)_2$ and $LiPF_6$ was 25:75 (molar ratio) with respect to the total nonaqueous electrolytic solution and the total concentration of $LiN(SO_2F)_2$ and $LiPF_6$ was 1.2 mol/L, and the obtained solution was used as a nonaqueous electrolytic solution.

The concentrations of $LiN(SO_2F)_2$ and $LiPF_6$ in the prepared nonaqueous electrolytic solution were 0.3 mol/L and 0.9 mol/L, respectively.

[Production of Nonaqueous Lithium Power Storage Element]

The obtained positive electrode precursor and negative electrode 1 were used to produce a plurality of nonaqueous lithium power storage elements under the conditions described below.

[Assembly]

The obtained double-sided negative electrode and single-sided and double-sided positive electrode precursors were cut to 10 cm×10 cm (100 cm²). Using a single-sided positive electrode precursor for the uppermost side and lowermost side, 21 double-sided negative electrodes and 20 double-sided positive electrode precursors were stacked, sandwiching microporous film separators each with a thickness of 15 μm between the negative electrodes 1 and positive electrode precursors. Next, a negative electrode terminal and positive electrode terminal were connected to the negative electrodes 1 and positive electrode precursors, respectively, by ultrasonic welding to obtain an electrode laminated body. The electrode laminated body was housed in a casing composed of an aluminum laminate package material, and the external bodies 3 at the electrode terminal section and bottom section were heat sealed under conditions with a temperature of 180° C., a seal time of 20 sec and a seal pressure of 1.0 MPa. The sealed body was vacuum dried under conditions with a temperature of 80° C., a pressure of 50 Pa and a drying time of 60 hr.

[Filling, Impregnation and Sealing Step]

Approximately 80 g of the nonaqueous electrolytic solution was injected into the electrode laminated body housed in the aluminum laminate package material, in a dry air environment at atmospheric pressure, a temperature of 25° C. and a dew point of no higher than −40° C. Next, the aluminum laminate package material housing the electrode laminated body was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution by this procedure.

Next, the electrode laminated body housed in the aluminum laminate package material and impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and fabricate a nonaqueous lithium power storage element.

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 25° C. with a current value of 50 mA until reaching a voltage of 4.5 V, followed by constant-voltage charge at 4.5 V continued for 48 hours, for lithium doping of the negative electrode 1.

[Aging Step]

The lithium-doped nonaqueous lithium power storage element was subjected to a constant-current/constant-voltage charge step, with constant-current discharge in a 25° C. environment at 150 mA until reaching a voltage of 1.8 V, followed by constant-current charge at 150 mA until reaching a voltage of 4.0 V, and further constant-current discharge at 4.0 V for 5 hours. The nonaqueous lithium power storage element was then stored in a 55° C. environment for 48 hours.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

[Evaluation of Nonaqueous Lithium Power Storage Elements]

One of the obtained nonaqueous lithium power storage elements was subjected to [Electrostatic capacitance and Ra·F measurement] and [High-load charge/discharge cycle test], as described below. The remaining nonaqueous lithium power storage element was used for [Solid $^7$Li-NMR measurement of positive electrode] and [Measurement of mean particle diameter of lithium compound in positive electrode] and [Quantitation of lithium compound], as described below.

[Electrostatic Capacitance and Ra·F Measurement]

Each of the obtained nonaqueous lithium power storage elements was used in the method described above in a thermostatic bath set to 25° C., using a charge/discharge apparatus (5 V, 360 A) by Fujitsu Telecom Networks, Ltd., to calculate the electrostatic capacitance F and the internal resistance Ra at 25° C., and the energy density $E/V_1$ and Ra·F were obtained. The results are shown in Table 2.

[High-Load Charge/Discharge Cycle Test]

Each of the obtained nonaqueous lithium power storage elements was used in the method described above in a thermostatic bath set to 25° C., using a charge/discharge apparatus (5 V, 360 A) by Fujitsu Telecom Networks, Ltd., for a high-load charge/discharge cycle test, the internal resistance Rb after the high-load charge/discharge cycle test was measured, and Rb/Ra was obtained. The results are shown in Table 2.

[Solid 7Li-NMR Measurement of Positive Electrode]

The positive electrode of the obtained nonaqueous lithium power storage element was used for solid $^7$Li-NMR measurement of the positive electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 2 hours.

The positive electrode active material layer was then sampled under an argon atmosphere. The nonaqueous lithium power storage element was disassembled under an argon atmosphere, and the positive electrode was removed. Next, the obtained positive electrode was immersed in diethyl carbonate for 2 minutes or longer to remove the lithium salt. After immersion once more in diethyl carbonate under the same conditions, it was air-dried.

The positive electrode active material layer was then sampled from the positive electrode.

The obtained positive electrode active material layer was used as a sample for solid $^7$Li-NMR measurement. Measurement was performed by the single pulse method, using an ECA700 ($^7$Li-NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. The observation range was −400 ppm to 400 ppm, and the number of points was 4,096. Measurement was performed with repeated latency of 10 seconds and 3,000 seconds, using the same measuring conditions other than the repeated latency, such as the same number of scans and receiver gain, and an NMR spectrum was obtained. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 45° pulse, without rotation of the sample.

The value of b/a was calculated by the method described above, from the solid $^7$Li-NMR spectrum of the positive electrode active material layer obtained by the method described above. The results are shown in Table 2.

[Measurement of Mean Particle Diameter of Lithium Compound in Positive Electrode]

The obtained nonaqueous lithium power storage element was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

A small 1 cm×1 cm piece was cut out from the positive electrode sample, and an SM-09020CP by JEOL Ltd. was used to create a cross-section perpendicular to the in-plane direction of the positive electrode sample using argon gas, under conditions with an acceleration voltage of 4 kV and a beam diameter of 500 μm. The surface was then coated with gold by sputtering in a vacuum of 10 Pa. Next, the positive electrode surface was measured by SEM and EDX with atmospheric exposure, under the conditions described below.

(SEM-EDX measuring conditions)
- Measuring apparatus: FE-SEM S-4700 Electrolytic emission scanning electron microscope by Hitachi High-Technologies Corp.
- Acceleration voltage: 10 kV
- Emission current: 10 μA
- Measurement magnification: 2,000x
- Electron beam incident angle: 90°
- X-ray take-off angle: 30°
- Dead time: 15%
- Mapping elements: C, O, F
- Measurement pixel count 256×256 pixels
- Measuring time: 60 sec
- Number of scans: 50
- The luminance and contrast were adjusted so that the brightness had no pixel reaching the maximum luminance, and the mean value of the brightness fell within the range of 40% to 60% of luminance.

(SEM-EDX Analysis)

The images obtained from SEM and EDX of the measured positive electrode cross-section were subjected to image analysis by the method described above using image analysis software (ImageJ), to calculate the mean particle diameter $X_1$ of the lithium compound and the mean particle diameter $Y_1$ of the positive electrode active material. The results are shown in Table 2.

[Quantitation of Lithium Compound]

A positive electrode sample cut out to a size of 5 cm×5 cm was immersed in methanol, and the vessel was capped and allowed to stand for 3 days in an environment of 25° C. The positive electrode was then removed out and vacuum dried for 10 hours under conditions of 120° C., 5 kPa. The methanol solution after washing was measured by GC/MS under conditions with a predrawn calibration curve, and a diethyl carbonate abundance of less than 1% was confirmed. After then measuring the positive electrode weight $M_0$, the positive electrode sample was impregnated with distilled water, and the vessel was capped and allowed to stand for 3 days in an environment of 45° C. The positive electrode sample was then removed out and vacuum dried for 12 hours under conditions of 150° C., 3 kPa. The distilled water after washing was measured by GC/MS under conditions with a predrawn calibration curve, and a methanol abundance of less than 1% was confirmed. The positive electrode weight $M_1$ was then measured, a spatula, brush or bristles were used to remove the active material layer on the positive electrode power collector, and the weight $M_2$ of the positive electrode power collector was measured. The obtained $M_0$, $M_1$ and $M_2$ values were used to determine the content Z (wt %) of the lithium compound in the positive electrode, by the method described above. The results are shown in Table 2.

Examples 2 to 17 and Comparative Examples 1 to 4

Positive electrode precursors were prepared in the same manner as Example 1, except that the positive electrode active materials, the lithium compounds and their mean particle diameters, and the parts by weight of the positive electrode active materials and lithium compounds were as shown in Table 2. Nonaqueous lithium power storage elements were prepared and evaluated in the same manner as Example 1, except that these positive electrode precursors were used and combined with the negative electrodes listed in Table 2. The results are shown in Table 2.

Comparative Example 5

[Production of Positive Electrode Precursor]

After mixing 87.5 parts by weight of activated carbon 2, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. A positive electrode precursor was obtained in the same manner as Example 1, except for using the coating solution obtained above.

[Preparation and Evaluation of Nonaqueous Lithium Power Storage Element]

Assembly, filling, impregnation and sealing of a nonaqueous lithium power storage element were carried out in the same manner as Example 1, except for using the obtained positive electrode precursor, and a negative electrode comprising a metal lithium foil corresponding to 211 mAh/g per unit weight of the negative electrode active material, attached to the negative electrode active material layer surface of the negative electrode 3.

Next, as the lithium doping step, the obtained nonaqueous lithium power storage element was stored for 72 hours in a thermostatic bath with an environmental temperature of 45° C., for ionization of the metal lithium and doping in the negative electrode 3. The obtained nonaqueous lithium power storage element was then subjected to an aging step and degassing step in the same manner as Example 1, to produce a nonaqueous lithium power storage element, which was evaluated. The results are shown in Table 2.

TABLE 2

| | Positive electrode precursor | | | | | | |
|---|---|---|---|---|---|---|---|
| | Positive electrode active material | Lithium compound | Mean particle diameter of lithium compound (μm) | Positive electrode active material (parts by weight) | Lithium compound (parts by weight) | Negative electrode | Positive electrode $X_1$ (μm) |
| Example 1 | Activated carbon 1 | Lithium carbonate | 2.0 | 42.5 | 45 | Neg. electrode 1 | 1.2 |
| Example 2 | Activated carbon 1 | Lithium carbonate | 2.0 | 42.5 | 45 | Neg. electrode 2 | 0.9 |
| Example 3 | Activated carbon 2 | Lithium carbonate | 1.0 | 67.5 | 20 | Neg. electrode 2 | 0.5 |
| Example 4 | Activated carbon 2 | Lithium carbonate | 4.0 | 42.5 | 45 | Neg. electrode 2 | 2.3 |
| Example 5 | Activated carbon 2 | Lithium carbonate | 6.0 | 32.5 | 55 | Neg. electrode 2 | 5.1 |
| Example 6 | Activated carbon 2 | Lithium carbonate | 1.0 | 67.5 | 20 | Neg. electrode 3 | 0.2 |
| Example 7 | Activated carbon 2 | Lithium carbonate | 2.0 | 64.5 | 23 | Neg. electrode 3 | 0.8 |
| Example 8 | Activated carbon 2 | Lithium carbonate | 2.0 | 62.5 | 25 | Neg. electrode 3 | 1.2 |
| Example 9 | Activated carbon 2 | Lithium carbonate | 4.0 | 42.5 | 45 | Neg. electrode 3 | 2.5 |
| Example 10 | Activated carbon 2 | Lithium oxide | 4.0 | 42.5 | 45 | Neg. electrode 3 | 1.9 |
| Example 11 | Activated carbon 2 | Lithium hydroxide | 4.0 | 42.5 | 45 | Neg. electrode 3 | 3.0 |
| Example 12 | Activated carbon 2 | Lithium carbonate | 6.0 | 35.5 | 52 | Neg. electrode 3 | 3.5 |
| Example 13 | Activated carbon 2 | Lithium carbonate | 9.0 | 30.5 | 57 | Neg. electrode 3 | 5.2 |
| Example 14 | Activated carbon 2 | Lithium carbonate | 9.5 | 27.5 | 60 | Neg. electrode 3 | 6.7 |
| Example 15 | Activated carbon 3 | Lithium carbonate | 1.0 | 67.5 | 20 | Neg. electrode 3 | 0.3 |
| Example 16 | Activated carbon 3 | Lithium carbonate | 6.0 | 49.5 | 38 | Neg. electrode 3 | 4.3 |
| Example 17 | Activated carbon 3 | Lithium carbonate | 10.0 | 32.5 | 55 | Neg. electrode 3 | 7.9 |
| Comp. Example 1 | Activated carbon 2 | Lithium carbonate | 0.3 | 72.5 | 15 | Neg. electrode 2 | 0.07 |
| Comp. Example 2 | Activated carbon 2 | Lithium carbonate | 12.5 | 17.5 | 70 | Neg. electrode 2 | 10.3 |
| Comp. Example 3 | Activated carbon 2 | Lithium carbonate | 0.3 | 72.5 | 15 | Neg. electrode 3 | 0.07 |
| Comp. Example 4 | Activated carbon 2 | Lithium carbonate | 12.5 | 17.5 | 70 | Neg. electrode 3 | 11.2 |
| Comp. Example 5 | Activated carbon 2 | None | — | 87.5 | 0 | Neg. electrode 3 | — |

| | Positive electrode | | Solid $^7$Li-NMR | Properties of nonaqueous lithium power storage element | | |
|---|---|---|---|---|---|---|
| | $Y_1$ (μm) | Z (wt %) | b/a | $E/V_1$ (Wh/L) | Ra · F (ΩF) | Rd/Ra |
| Example 1 | 4.0 | 17.7 | 1.82 | 16 | 1.32 | 1.08 |
| Example 2 | 3.9 | 19.8 | 1.92 | 19 | 1.02 | 1.05 |
| Example 3 | 6.9 | 1.2 | 1.05 | 24 | 0.69 | 1.72 |
| Example 4 | 6.8 | 19.0 | 1.88 | 21 | 0.85 | 1.15 |
| Example 5 | 7.1 | 43.1 | 3.72 | 20 | 1.02 | 1.10 |
| Example 6 | 7.1 | 1.6 | 1.07 | 31 | 1.49 | 1.68 |
| Example 7 | 6.7 | 2.6 | 1.12 | 31 | 1.55 | 1.25 |
| Example 8 | 7.1 | 3.5 | 1.16 | 30 | 1.62 | 1.19 |
| Example 9 | 6.9 | 20.0 | 1.93 | 26 | 1.74 | 1.13 |
| Example 10 | 6.9 | 18.8 | 1.78 | 26 | 1.82 | 1.32 |
| Example 11 | 7.0 | 21.3 | 2.10 | 26 | 1.79 | 1.10 |
| Example 12 | 7.0 | 38.1 | 2.77 | 24 | 1.86 | 1.27 |
| Example 13 | 6.9 | 42.3 | 3.59 | 22 | 1.92 | 1.31 |
| Example 14 | 6.8 | 49.3 | 5.54 | 21 | 2.79 | 1.89 |
| Example 15 | 16.7 | 1.3 | 1.06 | 43 | 1.98 | 1.82 |
| Example 16 | 16.9 | 16.8 | 1.78 | 38 | 2.21 | 1.19 |
| Example 17 | 16.7 | 44.2 | 3.88 | 32 | 2.67 | 1.33 |
| Comp. Example 1 | 7.1 | 0.2 | 1.01 | 21 | 0.69 | 3.01 |
| Comp. Example 2 | 7.0 | 56.7 | 5.88 | 17 | 3.11 | 2.35 |
| Comp. Example 3 | 6.9 | 0.5 | 1.02 | 31 | 1.48 | 2.85 |
| Comp. Example 4 | 7.0 | 57.2 | 5.69 | 21 | 3.29 | 2.05 |
| Comp. Example 5 | 7.1 | 0.0 | 1.00 | 31 | 1.47 | 3.21 |

From Examples 1 to 17 and Comparative Examples 1 to 5 it is seen that by adjusting b/a to be in the range of 1.04≤b/a≤5.56, it is possible to obtain both low resistance (i.e. a high input/output characteristic) and a high high-load charge/discharge cycle characteristic.

Example 18

[Preparation of Positive Electrode Precursor]
After mixing 67.5 parts by weight of activated carbon 1 obtained in Example 1, 20.0 parts by weight of lithium carbonate having a mean particle diameter of 2.0 μm, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,820 mPa·s and the TI value was 3.2. The degree of dispersion of the obtained coating solution was measured using a fineness gauge by Yoshimitsu Seiki Co. As a result, the granularity was 35 μm. The coating solution was coated onto one or both sides of an aluminum foil with a thickness of 15 μm and without through-holes, using a die coater by Toray Engineering Co., Ltd. under conditions with a coating speed of 1 m/s, and dried at a drying temperature of 100° C. to obtain a positive electrode precursor (hereunder also referred to as "single-sided positive electrode precursor" and "double-sided positive electrode precursor", respectively). The obtained positive electrode precursor was pressed using a roll press under conditions with a pressure of 4 kN/cm and a pressed portion surface temperature of 25° C.

[Production of Nonaqueous Lithium Power Storage Element]

A plurality of nonaqueous lithium power storage elements were produced in the same manner as Example 1, except for using the positive electrode precursor obtained above and the negative electrodes 1 listed in Table 1, under the conditions described below under [Lithium doping step] and [Aging step].

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 25° C. with a current value of 50 mA until reaching a voltage of 4.6 V, followed by constant-voltage charge at 4.6 V continued for 72 hours, for lithium doping of the negative electrode 1.

[Aging Step]

The lithium-doped nonaqueous lithium power storage element was subjected to a constant-current/constant-voltage charge step, with constant-current discharge in a 45° C. environment at 100 mA until reaching a voltage of 2.0 V, followed by constant-current charge at 100 mA until reaching a voltage of 4.2 V, and further constant-current discharge at 4.2 V for 72 hours.

[Evaluation of Nonaqueous Lithium Power Storage Elements]

One of the obtained nonaqueous lithium power storage elements was subjected to [Electrostatic capacitance and Ra·F measurement] and [High-load charge/discharge cycle test], as described above. The results are shown in Table 3.

The remaining nonaqueous lithium power storage element was used to carry out [Lithium amount in positive electrode] and [Quantitation of compounds of formulas (1) to (3) in positive electrode active material layer], below.

[Lithium Amount in Positive Electrode]

The positive electrode of the obtained nonaqueous lithium power storage element was used for solid $^7$Li-NMR measurement of the positive electrode active material layer.

First, the nonaqueous lithium power storage element fabricated as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 2 hours.

The positive electrode active material layer was then sampled under an argon atmosphere. The nonaqueous lithium power storage element was disassembled under an argon atmosphere, and the positive electrode was removed. Next, the obtained positive electrode was immersed in diethyl carbonate for 2 minutes or longer to remove the lithium salt. After immersion once more in diethyl carbonate under the same conditions, it was air-dried. The positive electrode active material layer was then sampled from the positive electrode, and weighed.

The obtained positive electrode active material layer was used as a sample for solid $^7$Li-NMR measurement. Measurement was performed by the single pulse method, using an ECA700 ($^7$Li-NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 45° pulse, without rotation of the sample. During the measurement, a sufficient repeated latency was taken between measurements, and each measurement was performed with the repeated latency set to 3,000 seconds.

The lithium amount was calculated by the method described above, from the solid $^7$Li-NMR spectrum of the positive electrode active material layer obtained by the method described above. The results are shown in Table 3.

[Quantitation of Compounds of Formulas (1) to (3) in Positive Electrode Active Material Layer]

After adjusting the nonaqueous lithium power storage element to 2.9 V, the nonaqueous lithium power storage element was disassembled in an argon (Ar) box set in a room at 23° C. and controlled to a dew point of no higher than −90° C. and an oxygen concentration of no greater than 1 ppm, and the positive electrode body was removed. The removed positive electrode body was immersed and rinsed in dimethyl carbonate (DMC), and then vacuum dried in a side box while maintaining a state of non-exposure to air.

The dried positive electrode was transferred from the side box to an Ar box while maintaining a state of not being exposed to air, and was immersed and extracted in heavy water to obtain a positive electrode liquid extract. Analysis of the liquid extract was by (i) IC and (ii) $^1$H-NMR, and the abundance per unit weight of the positive electrode active material layer (mol/g) for each compound accumulated on the positive electrode body was determined by the following formula 1:

$$\text{Abundance per unit weight (mol/g)}=A\times B\div C \quad (1)$$

from the concentration of each compound in the positive electrode liquid extract A (mol/ml), the volume of heavy water used for extraction B (ml) and the weight of active material of the positive electrode active material layer used for extraction C (g).

The active material weight in the positive electrode active material layer used for extraction was determined by the following method. The mixture (positive electrode active material layer) was peeled off from the power collector of the positive electrode remaining after heavy water extraction, and the peeled mixture was rinsed with water and vacuum dried. The mixture obtained by vacuum drying was washed with NMP or DMF. Next, the obtained positive electrode active material layer was again vacuum dried, and weighed to determine the weight of the positive electrode active material layer used for extraction.

The positive electrode liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and $^1$H NMR measurement was performed by the double tube method. By the 7.1 ppm (m, 2H) signal of 1,2,4,5-tetrafluorobenzene the integral of each observed compound was calculated and normalized.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and $^1$H NMR measurement was performed by the double tube method. In the same manner as above, by the 7.1 ppm (m, 2H) signal of 1,2,4,5-tetrafluorobenzene the integral of the 2.6 ppm (s, 6H) signal of dimethyl sulfoxide was calculated and normalized. The concentration A of each compound in the positive electrode liquid extract was determined based on the relationship between the dimethyl sulfoxide concentration used and the integral.

Assignment for the $^1$H NMR spectrum was as follows.
[For XOCH$_2$CH$_2$OX]
CH$_2$ in XOCH$_2$CH$_2$OX: 3.7 ppm (s, 4H)
CH$_3$OX: 3.3 ppm (s, 3H)
CH$_3$ in CH$_3$CH$_2$OX: 1.2 ppm (t, 3H)
CH$_2$O in CH$_3$CH$_2$OX: 3.7 ppm (q, 2H)

As mentioned above, the signal for CH$_2$ in XOCH$_2$CH$_2$OX (3.7 ppm) overlaps with the signal of CH$_2$O in CH$_3$CH$_2$OX (3.7 ppm), and therefore the amount of XOCH$_2$CH$_2$OX was calculated by excluding the portion corresponding to CH$_2$O in CH$_3$CH$_2$OX calculated from the signal for CH$_3$ in CH$_3$CH$_2$OX (1.2 ppm).

Here, X is —(COO)$_n$Li or —(COO)$_n$R$^1$ (where n is 0 or 1, and R$^1$ is an alkyl group of 1 to 4 carbon atoms or a halogenated alkyl group of 1 to 4 carbon atoms).

The amount of each of the compounds of formulas (1) to (3) in the positive electrode active material layer was calculated from the concentration of each compound in the extract determined by the aforementioned analyses (i) and (ii), and also the volume of the heavy water used for extraction and the weight of the positive electrode active material layer used for extraction. The results are shown in Table 3.

Examples 19 to 35 and Comparative Examples 7 to 9

Positive electrode precursors were produced in the same manner as Example 18, except that the positive electrode active materials and lithium compounds were as shown in Table 3. Nonaqueous lithium power storage elements were produced and evaluated in the same manner as Example 18, except that these positive electrode precursors were used and combined with the negative electrodes listed in Table 3, and the conditions for the aging step were as listed in Table 3. The results are shown in Table 3.

Comparative Example 6

[Preparation of Positive Electrode Precursor]
After mixing 87.5 parts by weight of activated carbon 2 obtained in Example 1, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. A positive electrode precursor was obtained in the same manner as Example 18, except for using the coating solution obtained above.

[Production and Evaluation of Nonaqueous Lithium Power Storage Element]
Assembly, filling, impregnation and sealing of a nonaqueous lithium power storage element were carried out in the same manner as Example 18, except for using the obtained positive electrode precursor, and a negative electrode comprising a metal lithium foil corresponding to 1,150 mAh/g per unit weight of the negative electrode active material, attached to the negative electrode active material layer surface of the negative electrode 2.

Next, as the lithium doping step, the obtained nonaqueous lithium power storage element was stored for 72 hours in a thermostatic bath with an environmental temperature of 45° C., for ionization of the metal lithium and doping in the negative electrode 2. A nonaqueous lithium power storage element was then produced and evaluated in the same manner as Example 18, except that the aging step for the obtained nonaqueous lithium power storage element was carried out under the conditions listed in Table 3. The results are shown in Table 3.

Comparative Example 8

A nonaqueous lithium power storage element was produced and evaluated in the same manner as Comparative Example 6, except for using a negative electrode comprising a metal lithium foil corresponding to 211 mAh/g per unit weight of the negative electrode active material, attached to the negative electrode active material layer surface of negative electrode 3. The results are shown in Table 3.

The results are summarized in Table 3 below.

TABLE 3

| | Positive electrode precursor | | | Aging step | | | Lithium amount (mmol/g) | Total amount of compounds of formulas (1) to (3) (×10⁻⁴ mol/g) | Properties of nonaqueous lithium power storage element | | |
|---|---|---|---|---|---|---|---|---|---|---|---|
| | Positive electrode active material | Lithium compound | Negative electrode | Temperature (°C) | Voltage (V) | Time (hr) | | | $E/V_1$ (Wh/L) | Ra·F (ΩF) | Rb/Ra |
| Example 18 | Activated carbon 1 | Lithium carbonate | Negative electrode 1 | 45 | 4.2 | 72 | 10.6 | 141.7 | 17 | 1.02 | 1.20 |
| Example 19 | Activated carbon 1 | Lithium carbonate | Negative electrode 2 | 45 | 4.2 | 72 | 11.1 | 149.3 | 20 | 0.92 | 1.16 |
| Example 20 | Activated carbon 2 | Lithium carbonate | Negative electrode 2 | 0 | 4.2 | 10 | 1.1 | 2.10 | 23 | 0.69 | 1.72 |
| Example 21 | Activated carbon 2 | Lithium carbonate | Negative electrode 2 | 45 | 4.2 | 10 | 1.3 | 17.2 | 23 | 0.73 | 1.55 |
| Example 22 | Activated carbon 2 | Lithium carbonate | Negative electrode 2 | 75 | 4.2 | 10 | 1.4 | 58.2 | 23 | 0.79 | 1.52 |
| Example 23 | Activated carbon 2 | Lithium carbonate | Negative electrode 2 | 0 | 4.2 | 72 | 11.5 | 72.1 | 23 | 0.82 | 1.35 |
| Example 24 | Activated carbon 2 | Lithium carbonate | Negative electrode 2 | 45 | 4.2 | 72 | 11.8 | 156.6 | 23 | 0.85 | 1.15 |
| Example 25 | Activated carbon 2 | Lithium carbonate | Negative electrode 2 | 75 | 4.2 | 72 | 12.0 | 255.2 | 23 | 0.89 | 1.21 |
| Example 26 | Activated carbon 2 | Lithium carbonate | Negative electrode 2 | 0 | 4.2 | 110 | 28.8 | 201.2 | 23 | 1.09 | 1.24 |
| Example 27 | Activated carbon 2 | Lithium carbonate | Negative electrode 2 | 45 | 4.2 | 110 | 28.8 | 296.3 | 23 | 1.27 | 1.41 |
| Example 28 | Activated carbon 2 | Lithium carbonate | Negative electrode 3 | 45 | 4.2 | 10 | 1.3 | 14.5 | 31 | 1.49 | 1.76 |
| Example 29 | Activated carbon 2 | Lithium carbonate | Negative electrode 3 | 45 | 4.2 | 24 | 3.2 | 40.4 | 31 | 1.52 | 1.65 |
| Example 30 | Activated carbon 2 | Lithium carbonate | Negative electrode 3 | 45 | 4.2 | 48 | 5.5 | 73.6 | 31 | 1.59 | 1.36 |
| Example 31 | Activated carbon 2 | Lithium carbonate | Negative electrode 3 | 45 | 4.2 | 72 | 11.5 | 136.1 | 31 | 1.74 | 1.12 |
| Example 32 | Activated carbon 2 | Lithium oxide | Negative electrode 3 | 45 | 4.2 | 72 | 12.1 | 141.9 | 31 | 1.81 | 1.18 |
| Example 33 | Activated carbon 2 | Lithium hydroxide | Negative electrode 3 | 45 | 4.2 | 72 | 10.9 | 122.2 | 31 | 1.75 | 1.15 |
| Example 34 | Activated carbon 2 | Lithium carbonate | Negative electrode 3 | 45 | 4.2 | 96 | 22.0 | 261.9 | 31 | 1.88 | 1.25 |
| Example 35 | Activated carbon 2 | Lithium carbonate | Negative electrode 3 | 45 | 4.2 | 120 | 27.8 | 292.0 | 31 | 2.23 | 1.36 |
| Comp. Example 6 | Activated carbon 2 | None | Negative electrode 2 | 0 | 4.2 | 10 | 0.4 | 0.9 | 23 | 0.68 | 2.74 |
| Comp. Example 7 | Activated carbon 2 | Lithium carbonate | Negative electrode 2 | 55 | 4.5 | 120 | 32.3 | 362.1 | 23 | 1.47 | 2.08 |
| Comp. Example 8 | Activated carbon 2 | None | Negative electrode 3 | 0 | 4.2 | 10 | 0.7 | 1.5 | 31 | 1.50 | 2.57 |
| Comp. Example 9 | Activated carbon 2 | Lithium carbonate | Negative electrode 3 | 55 | 4.5 | 120 | 33.1 | 341.2 | 31 | 3.11 | 2.10 |

From Examples 18 to 35 and Comparative Examples 6 to 9, it is seen that by adjusting the lithium amount, calculated by the peak area from −40 ppm to 40 ppm in the solid $^7$Li-NMR spectrum of the positive electrode active material layer, to 1 mmol/g to 30 mmol/g, it is possible to obtain both low resistance (that is, a high input/output characteristic) and a high high-load charge/discharge cycle characteristic.

Example 36

[Preparation of Positive Electrode Precursor]

After mixing 57.5 parts by weight of activated carbon 1 obtained in Example 1, 30.0 parts by weight of lithium carbonate having a mean particle diameter of 1.8 μm, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd., and as a result the viscosity (ηb) was 2,590 mPa·s and the TI value was 2.8. The degree of dispersion of the obtained coating solution was measured using a fineness gauge by Yoshimitsu Seiki Co. The granularity was 35 μm. The coating solution was coated onto one or both sides of an aluminum foil with a thickness of 15 μm and without through-holes, using a die coater by Toray Engineering Co., Ltd. under conditions with a coating speed of 1 m/s, and dried at a drying temperature of 100° C. to obtain a positive electrode precursor (hereunder referred to as "single-sided positive electrode precursor" and "double-sided positive electrode precursor", respectively). The obtained positive electrode precursor was pressed using a roll press under conditions with a pressure of 4 kN/cm and a pressed portion surface temperature of 25° C.

[Preparation of Negative Electrode]

[Preparation Example for Negative Electrode 4]

Artificial graphite 2 having a mean particle diameter of 9.7 μm and a BET specific surface area of 1.2 m²/g, used in an amount of 150 g, was placed into a stainless steel mesh basket and set on a stainless steel vat containing 15 g of coal pitch 2 (softening point: 65° C.), and both were set in an electric furnace (furnace inner usable dimension: 300 mm×300 mm×300 mm). This was increased in temperature to 1,250° C. for 8 hours under a nitrogen atmosphere, and kept at the same temperature for 4 hours for thermal reaction to obtain composite carbon material 4. The obtained composite carbon material 4 was cooled to 60° C. by natural cooling, and then removed out from the electric furnace.

The mean particle diameter and BET specific surface area of the obtained composite carbon material 4 were measured by the same methods as described above. The results are shown in Table 4.

Composite carbon material 4 was then used as a negative electrode active material to produce negative electrode 4.

After mixing 80 parts by weight of composite carbon material 4, 8 parts by weight of acetylene black, 12 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 15 m/s, to obtain a coating solution. The viscosity (ηb) and TI value of the obtained coating solution were measured using a TVE-35H E-type viscometer by Toki Sangyo Co., Ltd., and as a result the viscosity (ηb) was 2,674 mPa·s and the TI value was 2.6. The coating solution was coated onto both sides of an electrolytic copper foil with a thickness of 10 μm and without through-holes, using a die coater by Toray Engineering Co., Ltd. under conditions with a coating speed of 1 m/s, and dried at a drying temperature of 85° C. to obtain negative electrode 4 (hereunder also referred to as "double-sided negative electrode"). The obtained negative electrode 4 was pressed using a roll press. The film thickness of the obtained negative electrode 4 was measured at 10 arbitrary locations of negative electrode 4, using a Linear Gauge Sensor GS-551 by Ono Sokki Co., Ltd. The thickness of the copper foil was subtracted from the mean value of the measured film thickness, to determine the film thickness of the negative electrode active material layer of negative electrode 4. The film thickness of the negative electrode active material layer of negative electrode 4 was 20 μm per side.

[Preparation Example for Negative Electrodes 5 to 13]

Negative electrode active materials were produced and evaluated in the same manner as the preparation example for negative electrode 4, except that the base materials and their parts by weight, the coal-based pitches and their parts by weight, and the heat treatment temperatures were adjusted as shown in Table 4. Also, negative electrodes 5 to 13 were produced and evaluated in the same manner as the preparation example for negative electrode 4, except that the negative electrode active materials listed in Table 4 were used, and the coating solutions were adjusted to the coating solution compositions listed in Table 4. The results are shown in Table 4.

TABLE 4

| | Negative electrode active material | | | | | | | | Coating solution | | | | Negative electrode active material layer |
|---|---|---|---|---|---|---|---|---|---|---|---|---|---|
| | | Starting material | | | Heat treat- ment temper- ature (° C.) | Weight ratio of carbona- ceous material (weight %) | Mean particle diam- eter (μm) | BET Specif- ic surface area (m²/g) | Negative electrode active material (parts by weight) | Conductive filler | | PVdF (parts by weight) | film thickness per one side (μm) |
| | Name | Base material | | Pitch 2 | | | | | | | | | |
| | | Type | Amount (parts by weight) | Amount (parts by weight) | | | | | | Type | Amount (parts by weight) | | |
| Negative electrode 4 | Composite carbon material 4 | Artificial graphite 2 | 150 | 15 | 1250 | 2 | 9.8 | 1.5 | 80 | Acetylene black | 8 | 12 | 20 |
| Negative electrode 5 | Composite carbon material 4 | Artificial graphite 2 | 150 | 15 | 1250 | 2 | 9.8 | 1.5 | 80 | Ketchen black | 8 | 12 | 20 |
| Negative electrode 6 | Composite carbon material 5 | Artificial graphite 3 | 150 | 15 | 1250 | 2 | 6.2 | 7.3 | 80 | Acetylene black | 8 | 12 | 20 |
| Negative electrode 7 | Composite carbon material 5 | Artificial graphite 3 | 150 | 15 | 1250 | 2 | 6.2 | 7.3 | 80 | Ketchen black | 8 | 12 | 20 |
| Negative electrode 8 | Composite carbon material 6 | Artificial graphite 4 | 150 | 50 | 1250 | 21 | 2.2 | 30.2 | 80 | Ketchen black | 8 | 12 | 20 |
| Negative electrode 9 | Composite carbon material 7 | Natural graphite 1 | 150 | 15 | 1250 | 2 | 8.0 | 2.4 | 80 | Acetylene black | 8 | 12 | 20 |
| Negative electrode 10 | Composite carbon material 8 | Natural graphite 2 | 150 | 15 | 1250 | 2 | 3.2 | 7.9 | 80 | Acetylene black | 8 | 12 | 20 |
| Negative electrode 11 | Composite carbon material 9 | Natural graphite 3 | 150 | 50 | 1250 | 22 | 1.5 | 45.2 | 80 | Acetylene black | 8 | 12 | 20 |
| Negative electrode 12 | Composite carbon material 10 | High area-to- weight ratio graphite 1 | 150 | 30 | 1250 | 15 | 5.8 | 19.5 | 80 | Acetylene black | 8 | 12 | 20 |
| Negative electrode 13 | Composite carbon material 11 | High area-to- weight ratio graphite 2 | 150 | 30 | 1250 | 17 | 5.2 | 49.3 | 80 | Acetylene black | 8 | 12 | 20 |

The starting materials in Table 4 are the following.
Artificial graphite 2: mean particle diameter=9.7 μm, BET specific surface area=1.2 m$^2$/g
Artificial graphite 3: mean particle diameter=6.1 μm, BET specific surface area=6.6 m$^2$/g
Artificial graphite 4: mean particle diameter=2.1 μm, BET specific surface area=13.7 m$^2$/g
Natural graphite 1: mean particle diameter=7.9 μm, BET specific surface area=2.0 m$^2$/g
Natural graphite 2: mean particle diameter=3.1 μm, BET specific surface area=6.9 m$^2$/g
Natural graphite 3: mean particle diameter=1.3 μm, BET specific surface area=16.7 m$^2$/g
High specific surface area graphite 1: mean particle diameter=5.5 μm, BET specific surface area=27.7 m$^2$/g
High specific surface area graphite 2: mean particle diameter=4.9 μm, BET specific surface area=58.9 m$^2$/g
Pitch 2: coal-based pitch with softening point of 65° C.

[Production of Nonaqueous Lithium Power Storage Element]

A plurality of nonaqueous lithium power storage elements were produced in the same manner as Example 1, except for using the positive electrode precursor obtained above and negative electrode 4, under the conditions described below under [Lithium doping step] and [Aging step].

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 50° C. with a current value of 150 mA until reaching a voltage of 4.5 V, followed by constant-voltage charge at 4.5 V continued for 12 hours, for lithium doping of the negative electrode 4.

[Aging Step]

The lithium-doped nonaqueous lithium power storage element was subjected to a constant-current/constant-voltage charge step, with constant-current discharge in a 25° C. environment at 50 mA until reaching a voltage of 2.2 V, followed by constant-current charge at 50 mA until reaching a voltage of 4.0 V, and further constant-current charge at 4.0 V for 30 hours.

[Evaluation of Nonaqueous Lithium Power Storage Elements]

One of the obtained nonaqueous lithium power storage elements was subjected to [Electrostatic capacitance and Ra·F measurement] and [High-load charge/discharge cycle test], as described above. The results are shown in Table 5.

The remaining nonaqueous lithium power storage element was used for [Solid $^7$Li-NMR measurement of negative electrode], [Analysis of negative electrode active material layer of negative electrode after use], [Solid $^7$Li-NMR measurement of positive electrode] described below and [Measurement of mean particle diameter of lithium compound in positive electrode] described above.

[Solid $^7$Li-NMR Measurement of Negative Electrode]

Negative electrode 4 of the nonaqueous lithium power storage element obtained above was used for solid $^7$Li-NMR measurement of the negative electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode active material layer was then sampled under an argon atmosphere. The nonaqueous lithium power storage element was disassembled under an argon atmosphere, and the negative electrode 4 was removed. Next, the obtained negative electrode 4 was immersed in diethyl carbonate for 2 minutes or longer to remove the lithium salt. After immersion once more in diethyl carbonate under the same conditions, it was air-dried. The negative electrode active material layer was then sampled from negative electrode 4, and weighed.

The obtained negative electrode active material layer was used as a sample for solid $^7$Li-NMR measurement. Measurement was performed by the single pulse method, using an ECA700 ($^7$Li-NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 45° pulse, without rotation of the sample.

In the solid $^7$Li-NMR spectrum of the negative electrode active material layer obtained by the method described above, the position of the maximum peak in the spectral range of −10 ppm to 35 ppm was 16 ppm. Also, the amount of lithium per unit weight of the negative electrode active material layer that had intercalated lithium ions was calculated by the method described above, from the solid $^7$Li-NMR spectrum of the obtained negative electrode active material layer. The results are shown in Table 5.

[Analysis of Negative Electrode Active Material Layer of Negative Electrode after Use]

Negative electrode 4 of the nonaqueous lithium power storage element obtained as described above was used to measure the BET specific surface area per unit volume of the negative electrode active material layer of the negative electrode after use, and the mean pore size of the negative electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 4 was then sampled under an argon atmosphere. The nonaqueous lithium power storage element was disassembled under an argon atmosphere, and the negative electrode 4 was removed. Next, the obtained negative electrode 4 was immersed in diethyl carbonate for 2 minutes or longer to remove the nonaqueous electrolytic solution and lithium salt, and was air-dried. The obtained negative electrode 4 was then immersed in a mixed solvent comprising methanol and isopropanol for 15 hours to inactivate the lithium ion intercalated in the negative electrode active material, and was air-dried. Next, the obtained negative electrode 4 was vacuum dried for 12 hours using a vacuum dryer under conditions with a temperature of 170° C., to obtain a measuring sample. The obtained measuring sample was then used to measure the BET specific surface area per unit volume of the negative electrode active material layer of the negative electrode after use and the mean pore size of the negative electrode active material layer, by the methods described above, using a pore distribution measuring apparatus by Yuasa Ionics Co., Ltd. (AUTOSORB-1 AS-1-MP), with nitrogen as the adsorbate. The results are shown in Table 5.

[Solid $^7$Li-NMR Measurement of Positive Electrode]

The positive electrode of the obtained nonaqueous lithium power storage element was used for solid $^7$Li-NMR measurement of the positive electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The positive electrode active material layer was then sampled under an argon atmosphere. The nonaqueous lithium power storage element was disassembled under an argon atmosphere, and the positive electrode was removed. Next, the obtained positive electrode was immersed in diethyl carbonate for 2 minutes or longer to remove the nonaqueous electrolytic solution and lithium salt. After immersion once more in diethyl carbonate under the same conditions, it was air-dried.

The positive electrode active material layer was then sampled from the positive electrode.

The obtained positive electrode active material layer was used as a sample for solid $^7$Li-NMR measurement. Measurement was performed by the single pulse method, using an ECA700 ($^7$Li-NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. The observation range was −400 ppm to 400 ppm, and the number of points was 4,096. Measurement was performed with repeated latency of 10 seconds and 3,000 seconds, using the same measuring conditions other than the repeated latency, such as the same number of scans and receiver gain, and an NMR spectrum was obtained. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 45° pulse, without rotation of the sample.

The value of b/a was calculated by the method described above, from the solid $^7$Li-NMR spectrum of the positive electrode active material layer obtained by the method described above. The results are shown in Table 5.

Examples 37 to 59 and Comparative Examples 10 and 11

Positive electrode precursors were produced in the same manner as Example 36, except that the positive electrode active materials, the lithium compounds and their mean particle diameters, and the parts by weight of the positive electrode active materials and lithium compounds were as shown in Table 5. Nonaqueous lithium power storage elements were produced and evaluated in the same manner as Example 36, except that these positive electrode precursors were used and combined with the negative electrodes listed in Table 5, and the conditions for the lithium doping step were as listed in Table 5. The results are shown in Table 5.

The results are summarized in Table 5 below.

TABLE 5

| | Positive electrode precursor | | | | | Lithium doping step | | | Negative electrode | | | | Positive electrode | | Properties of non-aqueous lithium-type power storage element | | |
|---|---|---|---|---|---|---|---|---|---|---|---|---|---|---|---|---|---|
| | Positive electrode active material | Lithium compound | Mean particle diameter of lithium compound (μm) | Positive electrode active material (parts by weight) | Lithium compound (parts by weight) | Temperature (°C) | Voltage (V) | Time (hr) | Name | Solid $Li^7$-NMR Maximum peak position in spectral range of -10 ppm to -35 ppm (ppm) | Lithium amount in negative electrode active material layer (mmol/g) | BET specific surface area of negative electrode active material layer per unit volume (m²/cc) | Mean pore size of negative electrode active material layer (nm) | Solid $Li^7$-NMR b/a | Mean particle diameter of lithium compound (μm) | $E/V_1$ (Wh/L) | $Ra \cdot F$ (ΩF) | $Rb/Ra$ |
|---|---|---|---|---|---|---|---|---|---|---|---|---|---|---|---|---|---|---|
| Example 36 | Activated carbon 1 | $Li_2CO_3$ | 1.8 | 57.5 | 30.0 | 50 | 4.5 | 12 | Neg. electrode 4 | 16 | 0.92 | 1.0 | 2.3 | 1.52 | 1.6 | 33 | 1.96 | 1.64 |
| Example 37 | Activated carbon 2 | $Li_2CO_3$ | 1.8 | 57.5 | 30.0 | 50 | 4.5 | 12 | Neg. electrode 4 | 18 | 1.24 | 1.2 | 2.5 | 1.72 | 1.6 | 36 | 1.82 | 1.39 |
| Example 38 | Activated carbon 2 | $Li_2CO_3$ | 1.8 | 57.5 | 30.0 | 50 | 4.5 | 12 | Neg. electrode 5 | 18 | 1.63 | 3.7 | 3.7 | 1.70 | 1.6 | 36 | 1.54 | 1.19 |
| Example 39 | Activated carbon 2 | $Li_2CO_3$ | 1.8 | 57.5 | 30.0 | 50 | 4.5 | 12 | Neg. electrode 6 | 11 | 2.30 | 8.5 | 8.3 | 1.68 | 1.7 | 35 | 1.18 | 1.07 |
| Example 40 | Activated carbon 2 | $Li_2CO_3$ | 1.8 | 57.5 | 30.0 | 50 | 4.5 | 12 | Neg. electrode 7 | 11 | 2.79 | 13.6 | 14.5 | 1.66 | 1.7 | 34 | 1.21 | 1.09 |
| Example 41 | Activated carbon 2 | $Li_2CO_3$ | 1.8 | 57.5 | 30.0 | 50 | 4.5 | 12 | Neg. electrode 8 | 9 | 5.93 | 41.5 | 4.0 | 1.65 | 1.7 | 35 | 1.22 | 1.12 |
| Example 42 | Activated carbon 2 | $Li_2CO_3$ | 1.8 | 57.5 | 30.0 | 50 | 4.5 | 12 | Neg. electrode 9 | 22 | 1.51 | 2.1 | 2.3 | 1.61 | 1.7 | 36 | 1.62 | 1.15 |
| Example 43 | Activated carbon 2 | $Li_2CO_3$ | 1.8 | 57.5 | 30.0 | 50 | 4.5 | 12 | Neg. electrode 10 | 14 | 2.48 | 7.5 | 5.8 | 1.82 | 1.7 | 36 | 1.20 | 1.06 |
| Example 44 | Activated carbon 2 | $Li_2CO_3$ | 1.8 | 57.5 | 30.0 | 50 | 4.5 | 12 | Neg. electrode 11 | 8 | 7.33 | 42.8 | 3.4 | 1.79 | 1.7 | 36 | 1.36 | 1.39 |
| Example 45 | Activated carbon 2 | $Li_2CO_3$ | 1.8 | 57.5 | 30.0 | 50 | 4.5 | 12 | Neg. electrode 12 | 10 | 6.72 | 19.3 | 15.5 | 1.74 | 1.5 | 34 | 1.29 | 1.20 |
| Example 46 | Activated carbon 2 | $Li_2CO_3$ | 1.8 | 57.5 | 30.0 | 50 | 4.5 | 12 | Neg. electrode 13 | 7 | 7.30 | 47.3 | 19.7 | 1.68 | 1.5 | 33 | 1.42 | 1.43 |
| Example 47 | Activated carbon 2 | $Li_2CO_3$ | 1.1 | 72.5 | 15.0 | 50 | 4.5 | 12 | Neg. electrode 6 | 8 | 0.21 | 9.3 | 8.4 | 1.06 | 0.9 | 35 | 2.89 | 1.95 |
| Example 48 | Activated carbon 2 | $Li_2CO_3$ | 1.8 | 67.5 | 20.0 | 25 | 4.4 | 12 | Neg. electrode 6 | 9 | 0.73 | 9.2 | 8.4 | 1.17 | 1.7 | 35 | 2.23 | 1.56 |
| Example 49 | Activated carbon 2 | $Li_2CO_3$ | 1.8 | 42.5 | 45.0 | 50 | 4.5 | 35 | Neg. electrode 6 | 21 | 7.67 | 8.1 | 8.1 | 3.55 | 1.6 | 35 | 1.47 | 1.25 |
| Example 50 | Activated carbon 2 | $Li_2CO_3$ | 1.8 | 67.5 | 20.0 | 25 | 4.4 | 10 | Neg. electrode 6 | 11 | 0.51 | 8.2 | 6.2 | 1.24 | 1.7 | 36 | 2.44 | 1.50 |
| Example 51 | Activated carbon 2 | $Li_2CO_3$ | 1.8 | 42.5 | 45.0 | 50 | 4.5 | 24 | Neg. electrode 10 | 21 | 7.22 | 7.2 | 5.6 | 3.65 | 1.6 | 36 | 1.42 | 1.27 |
| Example 52 | Activated carbon 2 | $Li_2CO_3$ | 1.8 | 27.5 | 60.0 | 50 | 4.6 | 48 | Neg. electrode 10 | 24 | 8.30 | 7.1 | 5.5 | 5.03 | 1.6 | 36 | 1.68 | 1.30 |
| Example 53 | Activated carbon 2 | $Li_2CO_3$ | 1.1 | 72.5 | 15.0 | 50 | 4.5 | 12 | Neg. electrode 12 | 5 | 0.88 | 21.2 | 15.9 | 1.08 | 0.6 | 34 | 2.01 | 1.87 |
| Example 54 | Activated carbon 2 | $Li_2CO_3$ | 1.8 | 42.5 | 45.0 | 50 | 4.5 | 35 | Neg. electrode 12 | 13 | 7.83 | 18.9 | 15.2 | 3.46 | 1.6 | 34 | 1.53 | 1.33 |
| Example 55 | Activated carbon 2 | $Li_2CO_3$ | 1.8 | 27.5 | 60.0 | 50 | 4.6 | 72 | Neg. electrode 12 | 18 | 9.46 | 18.2 | 14.8 | 4.76 | 1.5 | 34 | 2.47 | 1.42 |
| Example 56 | Activated carbon 2 | $Li_2CO_3$ | 6.0 | 57.5 | 30.0 | 50 | 4.5 | 12 | Neg. electrode 6 | 12 | 3.64 | 8.5 | 8.3 | 2.98 | 5.8 | 35 | 1.53 | 1.07 |
| Example 57 | Activated carbon 2 | $Li_2CO_3$ | 9.4 | 57.5 | 30.0 | 50 | 4.5 | 12 | Neg. electrode 6 | 13 | 4.21 | 8.5 | 8.3 | 3.78 | 9.3 | 35 | 1.79 | 1.05 |
| Example 58 | Activated carbon 2 | $Li_2O$ | 2.0 | 57.5 | 30.0 | 50 | 4.5 | 12 | Neg. electrode 6 | 10 | 2.11 | 8.5 | 8.3 | 1.69 | 1.9 | 35 | 1.28 | 1.15 |
| Example 59 | Activated carbon 2 | $LiOH$ | 2.1 | 57.5 | 30.0 | 50 | 4.5 | 12 | Neg. electrode 6 | 10 | 2.00 | 8.5 | 8.3 | 1.75 | 2.0 | 35 | 1.34 | 1.13 |
| Comp. Example 10 | Activated carbon 2 | $Li_2CO_3$ | 0.6 | 77.5 | 10.0 | 25 | 4.4 | 8 | Neg. electrode 6 | 3 | 0.06 | 9.3 | 8.4 | 1.01 | 0.4 | 35 | 3.68 | 2.53 |
| Comp. Example 11 | Activated carbon 2 | $Li_2CO_3$ | 0.6 | 77.5 | 10.0 | 25 | 4.4 | 8 | Neg. electrode 10 | 6 | 0.08 | 8.2 | 6.2 | 1.02 | 0.4 | 36 | 3.15 | 2.25 |

From Examples 36 to 59 and Comparative Examples 10 and 11 it is seen that by adding a graphite-based carbon material as a negative electrode active material to the negative electrode, having a maximum peak between 4 ppm to 30 ppm in the spectral range from −10 ppm to 35 ppm in the solid $^7$Li-NMR spectrum of the negative electrode active material layer, and adjusting the lithium amount to a specified range, as calculated by the peak area from 4 ppm to 30 ppm, it is possible for a nonaqueous lithium power storage element using the negative electrode to exhibit low resistance (i. e., a high input/output characteristic) and a high high-load charge/discharge cycle characteristic.

Example 60

[Preparation of Positive Electrode Precursor]

After mixing 57.5 parts by weight of activated carbon 1 obtained in Example 1, 30.0 parts by weight of lithium carbonate having a mean particle diameter of 2.3 µm, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,321 mPa·s and the TI value was 2.0. The degree of dispersion of the obtained coating solution was measured using a fineness gauge by Yoshimitsu Seiki Co. As a result, the granularity was 35 µm. The coating solution was coated onto one or both sides of an aluminum foil with a thickness of 15 µm and without through-holes, using a die coater by Toray Engineering Co., Ltd. under conditions with a coating speed of 1 m/s, and dried at a drying temperature of 100° C. to obtain a positive electrode precursor (hereunder referred to as "single-sided positive electrode precursor" and "double-sided positive electrode precursor", respectively). The obtained positive electrode precursor was pressed using a roll press under conditions with a pressure of 4 kN/cm and a pressed portion surface temperature of 25° C.

[Preparation of Negative Electrode]

[Preparation Example for Negative Electrode 14]

Artificial graphite 5 having a mean particle diameter of 0.7 µm and a BET specific surface area of 15.2 m$^2$/g, used in an amount of 150 g, was placed into a stainless steel mesh basket and set on a stainless steel vat containing 30 g of coal pitch 3 (softening point: 135° C.), and both were set in an electric furnace (furnace inner usable dimension: 300 mm×300 mm×300 mm). This was increased in temperature to 1,200° C. for 8 hours under a nitrogen atmosphere, and kept at the same temperature for 4 hours for thermal reaction to obtain composite carbon material 12. The obtained composite carbon material 12 was cooled to 60° C. by natural cooling, and then removed out from the electric furnace.

The mean particle diameter and BET specific surface area of the obtained composite carbon material 12 were measured by the same methods as described above. The results are shown in Table 6.

Composite carbon material 12 was then used as a negative electrode active material to produce negative electrode 14.

After mixing 80 parts by weight of composite carbon material 12, 8 parts by weight of acetylene black, 12 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,274 mPa·s and the TI value was 4.2. The coating solution was coated onto both sides of an electrolytic copper foil with a thickness of 10 µm and without through-holes, using a die coater by Toray Engineering Co., Ltd. under conditions with a coating speed of 1 m/s, and dried at a drying temperature of 85° C. to obtain negative electrode 14 (hereunder also referred to as "double-sided negative electrode"). The obtained negative electrode 14 was pressed using a roll press under conditions with a pressure of 4 kN/cm, a pressed portion surface temperature of 25° C., and a gap of 30 µm between the press rolls. The film thickness of the obtained negative electrode 14 was measured at 10 arbitrary locations of negative electrode 14, using a Linear Gauge Sensor GS-551 by Ono Sokki Co., Ltd. The thickness of the copper foil was subtracted from the mean value of the measured film thickness, to determine the film thickness of the negative electrode active material layer of negative electrode 14. As a result, the film thickness of the negative electrode active material layer of negative electrode 14 was 20 µm for each side.

[Preparation Example for Negative Electrodes 15 to 32]

Negative electrode active materials were produced and evaluated in the same manner as the preparation example for negative electrode 14, except that the base materials and their parts by weight, the coal-based pitches and their parts by weight, and the heat treatment temperatures were adjusted as shown in Table 6. Also, negative electrodes were produced and evaluated in the same manner as the preparation example for negative electrode 14, except that preparation was using the negative electrode active materials obtained as described above, with the coating solutions listed in Table 6, and pressing of the formed negative electrodes was under the pressing conditions listed in Table 6. The results are shown in Table 6.

TABLE 6

| | Negative electrode active material | | | | | | | | Pressing conditions | | | Negative electrode active material layer film thickness per side (μm) |
|---|---|---|---|---|---|---|---|---|---|---|---|---|
| | Starting material | | | | Heat treatment temperature (° C.) | Weight ratio of carbonaceous material (weight %) | Mean particle diameter $r_a$ (μm) | BET specific surface area (m²/g) | Pressure (kN/cm) | Surface temperature of pressing section (° C.) | Gap between press rolls (μm) | |
| Name | Base material | | Pitch 3 | | | | | | | | | |
| | Name | Type | Amount (parts by weight) | Amount (parts by weight) | | | | | | | | |
| Negative electrode 14 | Composite carbon material 12 | Artificial graphite 5 | 150 | 30 | 1200 | 7 | 1.2 | 11.3 | 4 | 25 | 30 | 20 |
| Negative electrode 15 | Composite carbon material 12 | Artificial graphite 5 | 150 | 30 | 1200 | 7 | 1.2 | 11.3 | 2 | 25 | 30 | 20 |
| Negative electrode 16 | Composite carbon material 13 | Artificial graphite 6 | 150 | 15 | 1200 | 2 | 4.9 | 7.4 | 6 | 140 | 30 | 20 |
| Negative electrode 17 | Composite carbon material 13 | Artificial graphite 6 | 150 | 15 | 1200 | 2 | 4.9 | 7.4 | 5 | 140 | 30 | 20 |
| Negative electrode 18 | Composite carbon material 13 | Artificial graphite 6 | 150 | 15 | 1200 | 2 | 4.9 | 7.4 | 5 | 25 | 30 | 20 |
| Negative electrode 19 | Composite carbon material 13 | Artificial graphite 6 | 150 | 15 | 1200 | 2 | 4.9 | 7.4 | 4 | 25 | 30 | 20 |
| Negative electrode 20 | Composite carbon material 14 | Artificial graphite 7 | 150 | 15 | 1200 | 2 | 9.8 | 1.2 | 5 | 140 | 30 | 20 |
| Negative electrode 21 | Composite carbon material 14 | Artificial graphite 7 | 150 | 15 | 1200 | 2 | 9.8 | 1.2 | 4 | 140 | 30 | 20 |
| Negative electrode 22 | Composite carbon material 14 | Artificial graphite 7 | 150 | 15 | 1200 | 2 | 9.8 | 1.2 | 4 | 25 | 30 | 20 |
| Negative electrode 23 | Composite carbon material 14 | Artificial graphite 7 | 150 | 15 | 1200 | 2 | 9.8 | 1.2 | 2 | 25 | 30 | 20 |
| Negative electrode 24 | Composite carbon material 15 | Artificial graphite 5 | 150 | 15 | 1200 | 2 | 0.9 | 14.5 | 4 | 25 | 30 | 20 |
| Negative electrode 25 | Composite carbon material 16 | Natural graphite 4 | 150 | 15 | 1200 | 2 | 5.8 | 8.2 | 6 | 140 | 30 | 20 |
| Negative electrode 26 | Composite carbon material 16 | Natural graphite 4 | 150 | 15 | 1200 | 2 | 5.8 | 8.2 | 5 | 140 | 30 | 20 |
| Negative electrode 27 | Composite carbon material 16 | Natural graphite 4 | 150 | 15 | 1200 | 2 | 5.8 | 8.2 | 5 | 25 | 30 | 20 |
| Negative electrode 28 | Composite carbon material 16 | Natural graphite 4 | 150 | 15 | 1200 | 2 | 5.8 | 8.2 | 1 | 25 | 45 | 20 |
| Negative electrode 29 | Composite carbon material 17 | Natural graphite 5 | 150 | 15 | 1200 | 3 | 9.3 | 1.7 | 1 | 24 | 30 | 20 |
| Negative electrode 30 | Composite carbon material 18 | High area-to-weight ratio graphite 3 | 150 | 50 | 1200 | 17 | 2.7 | 48.2 | 4 | 140 | 30 | 20 |
| Negative electrode 31 | Composite carbon material 19 | High area-to-weight ratio graphite 4 | 150 | 50 | 1200 | 16 | 5.5 | 37.4 | 4 | 140 | 30 | 20 |
| Negative electrode 32 | Composite carbon material 20 | High area-to-weight ratio graphite 5 | 150 | 50 | 1200 | 16 | 9.6 | 21.5 | 5 | 25 | 30 | 20 |

The starting materials in Table 6 are the following.
Artificial graphite 5: mean particle diameter=0.7 μm, BET specific surface area=15.2 m²/g
Artificial graphite 6: mean particle diameter=4.8 μm, BET specific surface area=6.3 m²/g
Artificial graphite 7: mean particle diameter=9.8 μm, BET specific surface area=0.8 m²/g
Natural graphite 4: mean particle diameter=5.8 μm, BET specific surface area=7.4 m²/g
Natural graphite 5: mean particle diameter=9.2 μm, BET specific surface area=1.1 m²/g
High specific surface area graphite 3: mean particle diameter=2.4 μm, BET specific surface area=62.2 m²/g
High specific surface area graphite 4: mean particle diameter=5.4 μm, BET specific surface area=45.7 m²/g
High specific surface area graphite 5: mean particle diameter=9.6 μm, BET specific surface area=29.4 m²/g
Pitch 3: coal-based pitch with softening point of 135° C.

[Production of Nonaqueous Lithium Power Storage Element]

A plurality of nonaqueous lithium power storage elements were produced in the same manner as Example 1, except for using the positive electrode precursor obtained above and negative electrode 14, under the conditions described below under [Lithium doping step] and [Aging step].

[Lithium Doping Step]

The obtained nonaqueous lithium power storage element was subjected to initial charging by a method of constant-current charging using a charge/discharge apparatus (TOSCAT-3100U) by Toyo System Co., Ltd., in a 55° C. environment with a current value of 100 mA until reaching a voltage of 4.5 V, followed by constant-voltage charge at 4.5 V continued for 24 hours, for lithium doping of the negative electrode 14.

[Aging Step]

The lithium-doped nonaqueous lithium power storage element was subjected to a constant-current/constant-voltage charge step, with constant-current discharge in a 25° C. environment at 100 mA until reaching a voltage of 2.0 V, followed by constant-current charge at 300 mA until reaching a voltage of 4.4 V, and further constant-current charge at 4.4 V for 20 hours.

[Evaluation of Nonaqueous Lithium Power Storage Elements]

One of the obtained nonaqueous lithium power storage elements was subjected to [Electrostatic capacitance and Ra·F measurement] and [High-load charge-discharge cycle test], as described above. The results are shown in Table 7.

The remaining nonaqueous lithium power storage element was used for [Measurement of mean distance between centers of gravity of voids in cross-section of negative electrode active material layer of negative electrode after use] described below, and for [Measurement of mean particle diameter of lithium compound in positive electrode], [Analysis of negative electrode active material layer of negative electrode after use] and [Solid $^7$Li-NMR measurement of positive electrode], in the same manner as Example 36.

[Measurement of Mean Distance Between Centers of Gravity of Voids in Cross-Section of Negative Electrode Active Material Layer of Negative Electrode after Use]

Negative electrode 14 of the nonaqueous lithium power storage element obtained as described above was used to measure the mean distance between the centers of gravity of the voids of a cross-section of the negative electrode active material layer of the negative electrode after use.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 14 was then sampled under an argon atmosphere. The nonaqueous lithium power storage element was disassembled under an argon atmosphere, and the negative electrode 14 was removed. Next, the obtained negative electrode 14 was immersed in diethyl carbonate for 2 minutes or longer to remove the nonaqueous electrolytic solution and lithium salt, and was air-dried. The obtained negative electrode 14 was then immersed in a mixed solvent comprising methanol and isopropanol for 15 hours to inactivate the lithium ion intercalated in the negative electrode active material, and was air-dried. Next, the obtained negative electrode 14 was vacuum dried for 12 hours using a vacuum dryer under conditions with a temperature of 170° C., to obtain a measuring sample.

The obtained measuring sample was subjected to BIB processing with an argon ion beam using a cross-section polisher by JEOL Ltd. by the method described above, under conditions with an acceleration voltage of 4 kV, to form a cross-section of the negative electrode active material layer of negative electrode 14.

Next, a scanning electron microscope (SU8220) by Hitachi High-Technologies Corp. was used to obtain an SEM image of the obtained cross-section of the negative electrode active material layer, under the following conditions.

Acceleration voltage: 1 kV
Emission current: 10 µA
Measurement magnification: 3,000x
Detector: Lower detector
Working distance: 8.2 mm An IP-1000 by Asahi Kasei Corp. (software: A-Zou Kun) was used for image analysis of the SEM image of the obtained cross-section of the negative electrode active material layer. A rectangular region comprising only the cross-section of the negative electrode active material layer of negative electrode 1 (20 µm thickness direction×50 µm widthwise direction of the negative electrode active material layer) was extracted from the obtained SEM image (8 bit), and a median filter was used to remove the trace noise in the image.

The extracted rectangular region was then binarized by the method described above, and the mean distance between the centers of gravity of the voids in the cross-section of the negative electrode active material layer of negative electrode 14 was calculated. The results are shown in Table 7.

Examples 61 to 86

Positive electrode precursors were produced in the same manner as Example 60, except that the positive electrode active materials, the lithium compounds and their mean particle diameters, and the parts by weight of the positive electrode active materials and lithium compounds were as shown in Table 7. Nonaqueous lithium power storage elements were produced and evaluated in the same manner as Example 60, except that these positive electrode precursors were used and combined with the negative electrodes listed in Table 7. The results are shown in Table 7 and Table 8 below.

Comparative Example 12

[Production of Positive Electrode Precursor]

After mixing 87.5 parts by weight of activated carbon 2 obtained in Example 1, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. A positive electrode precursor was obtained in the same manner as Example 60, except for using the coating solution obtained above.

[Preparation and Evaluation of Nonaqueous Lithium Power Storage Element]

Assembly, filling, impregnation and sealing of a nonaqueous lithium power storage element were carried out in the same manner as Example 60, except for using the obtained positive electrode precursor, and the negative electrode comprising a metal lithium foil corresponding to 280 mAh/g per unit weight of the negative electrode active material, attached to the front side of the first negative electrode active material layer of the negative electrode listed in Table 7.

Next, for lithium doping, the obtained nonaqueous lithium power storage element was stored for 30 hours in a thermostatic bath with an environmental temperature of 45° C., for ionization of the metal lithium and doping in the negative electrode listed in Table 7. The obtained nonaqueous lithium power storage element was then subjected to aging and degassing in the same manner as Example 60, to produce a nonaqueous lithium power storage element, which was evaluated. The results are shown in Table 7.

The results are summarized in Table 7 below.

TABLE 7

| | Positive electrode precursor | | | | Negative electrode | | | | | Positive electrode | | Properties of nonaqueous lithium-type power storage element | | |
|---|---|---|---|---|---|---|---|---|---|---|---|---|---|---|
| | Positive electrode active material | Lithium compound | Positive electrode active material (parts by weight) | Lithium compound (parts by weight) | Negative electrode | Mean distance between centers of gravity of voids in cross-section of negative electrode active material layer $r_p$ (μm) | $r_p/r_a$ | BET specific solace area of negative electrode active material layer per unit volume (m²/cc) | Mean pore size of negative electrode active material layer (nm) | Solid $^7$Li-NMR b/a | Mean particle diameter of lithium compound (μm) | E/V₁ (Wh/L) | Ra·F (ΩF) | Rb/Ra |
|---|---|---|---|---|---|---|---|---|---|---|---|---|---|---|
| | | | Mean particle diameter of lithium compound (μm) | | | | | | | | | | | |
| Example 60 | Activated carbon 1 | Li₂CO₃ | 2.3 | 57.5 | 30.0 | Negative electrode 14 | 1.1 | 0.92 | 12.5 | 10.5 | 1.53 | 2.1 | 32 | 2.59 | 1.87 |
| Example 61 | Activated carbon 2 | Li₂CO₃ | 2.3 | 57.5 | 30.0 | Negative electrode 14 | 1.0 | 0.83 | 12.3 | 10.5 | 1.61 | 2.2 | 33 | 2.69 | 1.92 |
| Example 62 | Activated carbon 2 | Li₂CO₃ | 2.3 | 57.5 | 30.0 | Negative electrode 15 | 1.3 | 1.08 | 12.8 | 10.4 | 1.59 | 2.2 | 32 | 2.01 | 1.60 |
| Example 63 | Activated carbon 2 | Li₂CO₃ | 2.3 | 57.5 | 30.0 | Negative electrode 16 | 1.7 | 0.35 | 7.1 | 8.1 | 1.72 | 2.2 | 36 | 1.55 | 1.38 |
| Example 64 | Activated carbon 2 | Li₂CO₃ | 2.3 | 57.5 | 30.0 | Negative electrode 17 | 2.1 | 0.43 | 7.4 | 8.2 | 1.70 | 2.1 | 35 | 1.19 | 1.10 |
| Example 65 | Activated carbon 2 | Li₂CO₃ | 2.3 | 57.5 | 30.0 | Negative electrode 18 | 3.5 | 0.71 | 8.1 | 8.2 | 1.68 | 2.2 | 34 | 1.21 | 1.13 |
| Example 66 | Activated carbon 2 | Li₂CO₃ | 2.3 | 57.5 | 30.0 | Negative electrode 19 | 4.8 | 0.98 | 9.3 | 8.3 | 1.66 | 2.1 | 34 | 1.45 | 1.21 |
| Example 67 | Activated carbon 2 | Li₂CO₃ | 2.3 | 57.5 | 30.0 | Negative electrode 20 | 5.2 | 0.53 | 1.0 | 3.0 | 1.79 | 2.1 | 38 | 1.58 | 1.28 |
| Example 68 | Activated carbon 2 | Li₂CO₃ | 2.3 | 57.5 | 30.0 | Negative electrode 21 | 6.3 | 0.64 | 1.2 | 3.2 | 1.77 | 2.1 | 37 | 1.87 | 1.43 |
| Example 69 | Activated carbon 2 | Li₂CO₃ | 2.3 | 57.5 | 30.0 | Negative electrode 22 | 8.4 | 0.86 | 1.6 | 3.3 | 1.76 | 2.2 | 37 | 2.45 | 1.72 |
| Example 70 | Activated carbon 2 | Li₂CO₃ | 2.3 | 57.5 | 30.0 | Negative electrode 23 | 9.8 | 1.00 | 2.1 | 3.5 | 1.68 | 2.1 | 36 | 2.88 | 1.93 |
| Example 71 | Activated carbon 2 | Li₂CO₃ | 2.3 | 57.5 | 30.0 | Negative electrode 25 | 1.2 | 0.21 | 4.3 | 7.3 | 1.82 | 2.2 | 37 | 2.45 | 1.76 |
| Example 72 | Activated carbon 2 | Li₂CO₃ | 2.3 | 57.5 | 30.0 | Negative electrode 26 | 2.3 | 0.40 | 6.8 | 8.3 | 1.77 | 2.2 | 35 | 1.15 | 1.09 |
| Example 73 | Activated carbon 2 | Li₂CO₃ | 2.3 | 57.5 | 30.0 | Negative electrode 27 | 4.6 | 0.79 | 8.4 | 8.5 | 1.75 | 2.1 | 34 | 1.40 | 1.24 |
| Example 74 | Activated carbon 2 | Li₂CO₃ | 2.3 | 57.5 | 30.0 | Negative electrode 28 | 7.1 | 1.22 | 9.2 | 9.0 | 1.72 | 2.2 | 32 | 2.05 | 1.58 |
| Example 75 | Activated carbon 2 | Li₂CO₃ | 2.3 | 57.5 | 30.0 | Negative electrode 29 | 9.5 | 1.02 | 1.2 | 2.1 | 1.93 | 2.1 | 37 | 2.78 | 1.87 |
| Example 76 | Activated carbon 2 | Li₂CO₃ | 2.3 | 57.5 | 30.0 | Negative electrode 30 | 1.6 | 0.59 | 43.5 | 18.4 | 1.77 | 1.7 | 32 | 2.21 | 1.53 |
| Example 77 | Activated carbon 2 | Li₂CO₃ | 2.3 | 57.5 | 30.0 | Negative electrode 31 | 2.2 | 0.40 | 33.2 | 16.3 | 2.06 | 1.8 | 34 | 1.55 | 1.22 |
| Example 78 | Activated carbon 2 | Li₂CO₃ | 2.3 | 57.5 | 30.0 | Negative electrode 32 | 8.5 | 0.89 | 22.3 | 15.4 | 2.10 | 1.8 | 31 | 2.89 | 1.89 |
| Example 79 | Activated carbon 2 | Li₂CO₃ | 2.3 | 67.5 | 20.0 | Negative electrode 17 | 2.2 | 0.45 | 8.3 | 8.3 | 2.14 | 2.1 | 35 | 1.08 | 1.85 |
| Example 80 | Activated carbon 2 | Li₂CO₃ | 2.3 | 42.5 | 45.0 | Negative electrode 17 | 2.1 | 0.43 | 7.0 | 7.8 | 1.07 | 2.1 | 35 | 1.43 | 1.14 |
| Example 81 | Activated carbon 2 | Li₂CO₃ | 2.3 | 27.5 | 60.0 | Negative electrode 17 | 2.0 | 0.41 | 6.4 | 7.5 | 3.59 | 2.1 | 35 | 2.05 | 1.31 |
| Example 82 | Activated carbon 2 | Li₂CO₃ | 0.4 | 57.5 | 30.0 | Negative electrode 17 | 2.2 | 0.45 | 8.4 | 8.5 | 5.50 | 0.2 | 35 | 1.12 | 1.79 |
| Example 83 | Activated carbon 2 | Li₂CO₃ | 6.4 | 57.5 | 30.0 | Negative electrode 17 | 2.0 | 0.41 | 7.2 | 7.7 | 1.12 | 6.2 | 35 | 1.35 | 1.12 |
| Example 84 | Activated carbon 2 | Li₂CO₃ | 9.0 | 57.5 | 30.0 | Negative electrode 17 | 2.0 | 0.41 | 6.8 | 7.5 | 3.35 | 8.7 | 35 | 1.52 | 1.16 |
| Example 85 | Activated carbon 2 | Li₂O | 2.3 | 57.5 | 30.0 | Negative electrode 17 | 2.1 | 0.43 | 7.4 | 8.1 | 3.69 | 2.1 | 35 | 1.22 | 1.15 |
| Example 86 | Activated carbon 2 | LiOH | 2.3 | 57.5 | 30.0 | Negative electrode 17 | 2.1 | 0.43 | 7.4 | 8.0 | 1.82 | 2.2 | 35 | 1.20 | 1.14 |
| Comp. Example 12 | Activated carbon 2 | None | — | 87.5 | 0.0 | Negative electrode 24 | 0.8 | 0.89 | 17.9 | 11.7 | 1.00 | — | 33 | 3.04 | 2.45 |

From Examples 60 to 86 and Comparative Example 12 it is seen that by adding a lithium compound other than the positive electrode active material to the positive electrode and adjusting the mean distance between the centers of gravity of the voids obtained by SEM of a cross-section of the negative electrode active material layer to within a specific range in the nonaqueous lithium power storage element, it is possible to exhibit low resistance (that is, a high input/output characteristic) and a high high-load charge/discharge cycle characteristic.

Reference Example 1

Negative electrode 17, before being incorporated in a nonaqueous lithium power storage element, was used for [Measurement of mean distance between centers of gravity of voids of cross-section of the negative electrode active material layer of negative electrode before use].
[Measurement of Mean Distance Between Centers of Gravity of Voids of Cross-Section of the Negative Electrode Active Material Layer of Negative Electrode Before Use]

The negative electrode 17 before incorporation into a nonaqueous lithium power storage element was used as a measuring sample for formation of a cross-section of the negative electrode active material layer and SEM observation, in the same manner as Example 60. The obtained SEM image was used for image analysis in the same manner as Example 60, and the mean distance between the centers of gravity of the voids of the cross-section of the negative electrode active material layer of negative electrode 17 was calculated. The results are shown in Table 8.

Reference Example 2

A nonaqueous lithium power storage element was produced in the same manner as Example 64, and was used for [Measurement of mean distance between centers of gravity of voids in cross-section of negative electrode active material layer of negative electrode after use], by the method described below.
[Measurement of Mean Distance Between Centers of Gravity of Voids in Cross-Section of Negative Electrode Active Material Layer of Negative Electrode after Use]

Negative electrode 17 of the nonaqueous lithium power storage element obtained as described above was used to measure the mean distance between the centers of gravity of the voids of a cross-section of the negative electrode active material layer of the negative electrode after use.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 17 was then sampled under an argon atmosphere. The nonaqueous lithium power storage element was disassembled under an argon atmosphere, and the negative electrode 17 was removed. Next, the obtained negative electrode 17 was immersed in diethyl carbonate for 2 minutes or longer to remove the nonaqueous electrolytic solution and lithium salt, and was air-dried. The obtained negative electrode 17 was then used as the working electrode and metal lithium as the counter electrode and reference electrode, and these were immersed in the nonaqueous electrolytic solution prepared in Example 60 under an argon atmosphere, to fabricate an electrochemical cell. Using a charge/discharge apparatus (TOSCAT-3000U) by Toyo System Co., Ltd., the obtained electrochemical cell was subjected to constant-current charge at a current of 10 mA until reaching a voltage of 2.5 V (i.e., until the negative electrode potential of the negative electrode 17 (vs. Li/Li$^+$) reached 2.5 V), followed by constant-current/constant-voltage charge with application of a constant voltage of 2.5 V for 15 hours. The charging referred to here is the procedure of releasing lithium ions from the negative electrode 17. Next, the negative electrode 17 was removed from the electrochemical cell under an argon atmosphere, and immersed in diethyl carbonate for 2 minutes or longer to remove the nonaqueous electrolytic solution and lithium salt, and then air-dried. Next, the obtained negative electrode 17 was vacuum dried for 12 hours using a vacuum dryer under conditions with a temperature of 170° C., to obtain a measuring sample.

The obtained measuring sample was used for formation of a cross-section of the negative electrode active material layer and SEM observation in the same manner as Example 60. The obtained SEM image was used for image analysis in the same manner as Example 60, and the mean distance between the centers of gravity of the voids of the cross-section of the negative electrode active material layer of negative electrode 17 was calculated. The results are shown in Table 8.

TABLE 8

| | Negative electrode | | |
|---|---|---|---|
| Name | | Mean distance between centers of gravity of voids in cross-section of negative electrode active material layer $r_p$ (μm) | $r_p/r_a$ |
| Example 64 | Negative electrode 17 | 2.1 | 0.43 |
| Reference Example 1 | Negative electrode 17 | 2.2 | 0.45 |
| Reference Example 2 | Negative electrode 17 | 2.1 | 0.43 |

From Example 64 and Reference Examples 1 and 2 it is seen that similar results are obtained whether before or after being incorporated into a nonaqueous lithium power storage element, and regardless of differences in the pretreatment method for the measuring sample in [Measurement of mean distance between centers of gravity of voids in cross-section of negative electrode active material layer of negative electrode after use].

INDUSTRIAL APPLICABILITY

A nonaqueous lithium power storage element using a negative electrode of the invention may be suitably used, for example, in the field of hybrid drive systems for automobiles, in which automobile internal combustion engines, fuel cells or motors are used in combination, and in assist applications for instantaneous electric power peaks, for example.

The invention claimed is:
1. A nonaqueous lithium power storage element comprising a positive electrode, a negative electrode, a separator and a lithium ion-containing nonaqueous electrolytic solution, wherein
the negative electrode has a negative electrode power collector, and a negative electrode active material layer containing a negative electrode active material, provided on one or both sides of the negative electrode power collector, the positive electrode has a positive electrode power collector, and a positive electrode active material layer containing a positive electrode active material, provided on one or both sides of the positive electrode power collector, in the solid $^7$Li-NMR spectrum of the positive electrode active material layer, the relationship $1.04 \leq b/a \leq 5.56$ is satisfied, where "a" is the peak area from −40 ppm to 40 ppm obtained by measuring with a repeated latency of 10 seconds, and "b" is the peak area from −40 ppm to 40 ppm obtained by measuring with a repeated latency of 3,000 seconds, the positive electrode active material layer contains a lithium compound other than the positive electrode active material, the positive electrode active material is an activated carbon, and the lithium compound is at least one selected from the group consisting of lithium carbonate, lithium oxide and lithium hydroxide.

2. The nonaqueous lithium power storage element according to claim 1, wherein the amount of lithium in the positive electrode, as calculated by the peak area from −40 ppm to 40 ppm in the solid $^7$Li-NMR spectrum of the positive electrode active material layer, is 1 mmol/g to 30 mmol/g per unit weight of the positive electrode active material layer.

3. The nonaqueous lithium power storage element according to claim 2, wherein the positive electrode contains one or more compounds selected from the group consisting of compounds represented by the following formulas (1) to (3):

$$LiX^1\text{—}OR^1O\text{—}X^2Li \qquad (1)$$

wherein, in formula (1), $R^1$ is an alkylene group of 1 to 4 carbon atoms or a halogenated alkylene group of 1 to 4 carbon atoms, and $X^1$ and $X^2$ respectively and independently represent $\text{—}(COO)_n$ (where n is 0 or 1), $$LiX^1\text{—}OR^1O\text{—}X^2R^2 \qquad (2)$$

wherein, in formula (2), $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent $\text{—}(COO)_n$ (where n is 0 or 1), and $$R^2X^1\text{—}OR^1O\text{—}X^2R^3 \qquad (3)$$

wherein, in formula (3), $R^1$ is an alkylene group of 1 to 4 carbon atoms or a halogenated alkylene group of 1 to 4 carbon atoms, $R^2$ and $R^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent $\text{—}(COO)_n$ (where n is 0 or 1), in an amount of $1.60 \times 10^{-4}$ mol/g to $300 \times 10^{-4}$ mol/g per unit weight of the positive electrode active material layer.

4. The nonaqueous lithium power storage element according to claim 1, wherein the mean particle diameter $X_1$ of the lithium compound is 0.1 μm to 10 μm.

5. The nonaqueous lithium power storage element according to claim 4, wherein $2~\mu m \leq Y_1 \leq 20~\mu m$ and $X_1 < Y_1$ are satisfied, where $Y_1$ is the mean particle diameter of the positive electrode active material, and the content ratio of the lithium compound in the positive electrode is 1 weight % to 50 weight % based on the total weight of the positive electrode active material layer.

6. The nonaqueous lithium power storage element according to claim 1, wherein the content ratio of the lithium compound in the positive electrode is 1 weight % to 20 weight % based on the total weight of the positive electrode active material layer.

7. The nonaqueous lithium power storage element according to claim 1, wherein the mean distance between the centers of gravity of voids of the negative electrode active material layer, as obtained by SEM of a cross-section of the negative electrode active material layer, is 1 μm to 10 μm.

8. The nonaqueous lithium power storage element according to claim 7, wherein $r_p/r_a$ is 0.10 to 1.10, where $r_p$ is the mean distance between the centers of gravity of the voids and $r_a$ is the mean particle diameter of the negative electrode active material.

9. The nonaqueous lithium power storage element according to claim 1, wherein the negative electrode active material contains a graphite-based carbon material, the negative electrode active material layer intercalates lithium ion, and in the solid $^7$Li-NMR spectrum of the negative electrode active material layer, in the spectral range of −10 ppm to 35 ppm, the maximum value of the peaks is between 4 ppm to 30 ppm, and the amount of lithium as calculated by the peak area from 4 ppm to 30 ppm is 0.10 mmol/g to 10.0 mmol/g per unit weight of the negative electrode active material layer.

10. The nonaqueous lithium power storage element according to claim 1, wherein the BET specific surface area per unit volume of the negative electrode active material layer is 1 m$^2$/cc to 50 m$^2$/cc.

11. The nonaqueous lithium power storage element according to claim 1, wherein the mean pore size of the negative electrode active material layer is 2 nm to 20 nm.

12. The nonaqueous lithium power storage element according to claim 1, wherein the mean particle diameter of the negative electrode active material is 1 μm to 10 μm.

13. The nonaqueous lithium power storage element according to claim 1, wherein the negative electrode active material contains a composite carbon material comprising a graphite material and a carbonaceous material.

14. The nonaqueous lithium power storage element according to claim 1, wherein the doping amount of lithium ion in the negative electrode active material is 50 mAh/g to 700 mAh/g per unit weight of the negative electrode active material.

15. The nonaqueous lithium power storage element according to claim 1, wherein the BET specific surface area of the negative electrode active material is 1 m$^2$/g to 50 m$^2$/g.

16. The nonaqueous lithium power storage element according to claim 1, wherein the doping amount of lithium ion in the negative electrode active material is 530 mAh/g to 2,500 mAh/g per unit weight of the negative electrode active material.

17. The nonaqueous lithium power storage element according to claim 1, wherein the BET specific surface area of the negative electrode active material is 100 m$^2$/g to 1,500 m$^2$/g.

18. The nonaqueous lithium power storage element according to claim 1, wherein the activated carbon satisfies $0.3 < V_1 \leq 0.8$ and $0.5 \leq V_2 \leq 1.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m²/g to 3,000 m²/g, as measured by the BET method.

19. The nonaqueous lithium power storage element according to claim 1, wherein the activated carbon satisfies $0.8 < V_1 \leq 2.5$ and $0.8 < V_2$ 3.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 2,300 m²/g to 4,000 m²/g, as measured by the BET method.

20. The nonaqueous lithium power storage element according to claim 1, wherein the positive electrode power collector and the negative electrode power collector are metal foils without through-holes.

21. The nonaqueous lithium power storage element according to claim 1, wherein the following (a) and (b) are satisfied for the nonaqueous lithium power storage element:
   (a) the product of Ra and F, Ra·F, is 0.3 to 3.0,
   (b) E/V is 15 to 50,
where Ra (Ω) is the initial internal resistance, F (F) is the electrostatic capacitance, E (Wh) is the electrical energy and V (L) is the volume of the power storage element.

22. The nonaqueous lithium power storage element according to claim 1, wherein, for charge/discharge cycling of the nonaqueous lithium power storage element conducted 60,000 times at an environmental temperature of 25° C. and a rate of 300C, in a cell voltage range from 2.2 V to 3.8 V, Rb/Ra is 0.9 to 2.0, where Rb (Ω) is the internal resistance after the charge/discharge cycling and Ra (Ω) is the internal resistance before the charge/discharge cycling.

23. A power storage module containing the nonaqueous lithium power storage element according to claim 1.

24. A power regenerating system containing the nonaqueous lithium power storage element according to claim 1.

25. A power load-leveling system containing the nonaqueous lithium power storage element according to claim 1.

26. An uninterruptable power source system containing the nonaqueous lithium power storage element according to claim 1.

27. A non-contact power supply system containing the nonaqueous lithium power storage element according to claim 1.

28. An energy harvesting system containing the nonaqueous lithium power storage element according to claim 1.

29. A power storage system containing the nonaqueous lithium power storage element according to claim 1.

30. The nonaqueous lithium power storage element according to claim 1, wherein the positive electrode active material layer further contains a conductive filler, binder or dispersion stabilizer.

31. The nonaqueous lithium power storage element according to claim 1, wherein the positive electrode power collector is an aluminum foil.

* * * * *